United States Patent
Egilmez et al.

(10) Patent No.: US 11,184,617 B2
(45) Date of Patent: Nov. 23, 2021

(54) TRANSFORM UNIT DESIGN FOR VIDEO CODING

(71) Applicant: QUALCOMM Incorporated, San Diego, CA (US)

(72) Inventors: Hilmi Enes Egilmez, San Diego, CA (US); Amir Said, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/025,529

(22) Filed: Sep. 18, 2020

(65) Prior Publication Data

US 2021/0092381 A1    Mar. 25, 2021

Related U.S. Application Data

(60) Provisional application No. 62/902,862, filed on Sep. 19, 2019, provisional application No. 62/904,494, (Continued)

(51) Int. Cl.
*H04N 19/129* (2014.01)
*H04N 19/159* (2014.01)
*H04N 19/176* (2014.01)

(52) U.S. Cl.
CPC ......... *H04N 19/129* (2014.11); *H04N 19/159* (2014.11); *H04N 19/176* (2014.11)

(58) Field of Classification Search
CPC .... H04N 19/176; H04N 19/70; H04N 19/136; H04N 19/33; H04N 19/60; H04N 19/186;
(Continued)

(56) References Cited

U.S. PATENT DOCUMENTS 10,306,229 B2    5/2019 Zhao et al.
10,349,085 B2    7/2019 Said et al.
(Continued)

FOREIGN PATENT DOCUMENTS

WO    2019117639 A1    6/2019

OTHER PUBLICATIONS

Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010-v1, pp. 1-6.
(Continued)

*Primary Examiner* — Nam D Pham
(74) *Attorney, Agent, or Firm* — Shumaker & Sieffert, P.A.

(57) ABSTRACT

An example device for decoding video data includes a memory configured to store the video data and one or more processors coupled to the memory. The one or more processors are configured to reorganize 2-D dequantized coefficients according to a first ordering. The one or more processors are configured to apply an inverse low-frequency non-separable transform (LFNST) to the reorganized 2-D dequantized coefficients to create inverse transformed coefficients. The one or more processors are configured to reorganize the inverse transformed coefficients according to a second ordering, the second ordering being based on an array including values, wherein each value in the array corresponds to a position in a 2-D block and the values in the array denote indices of the 2-D block in a defined order. The one or more processors are configured to decode the video data based on the second ordered inverse transformed coefficients.

30 Claims, 23 Drawing Sheets

Related U.S. Application Data filed on Sep. 23, 2019, provisional application No. 62/951,837, filed on Dec. 20, 2019.

(58) Field of Classification Search
CPC ...... H04N 19/159; H04N 19/18; H04N 19/61; H04N 19/122
See application file for complete search history.

(56) References Cited

U.S. PATENT DOCUMENTS

| | | | |
|---|---|---|---|
| 10,448,053 | B2 | 10/2019 | Said et al. |
| 10,491,922 | B2 | 11/2019 | Zhao et al. |
| 10,863,199 | B2 | 12/2020 | Said et al. |
| 2017/0238013 | A1 | 8/2017 | Said et al. |
| 2018/0020218 | A1 | 1/2018 | Zhao et al. |
| 2019/0297351 | A1 | 9/2019 | Said et al. |
| 2019/0373261 | A1 | 12/2019 | Egilmez et al. |
| 2020/0366935 | A1 | 11/2020 | Salehifar et al. |
| 2020/0366937 | A1 | 11/2020 | Egilmez et al. |
| 2021/0076070 | A1* | 3/2021 | Jung .................. H04N 19/132 |

OTHER PUBLICATIONS

Bross B., et al., "Versatile Video Coding (Draft 10)", JVET-S2001-vA, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 550 Pages.

Bross B., et al., "Versatile Video Coding (Draft 6)", 127. MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVEI-O2001-v8 zip JVET-O2001-v8.docx [retrieved on Jul. 15, 2019].

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.

Chen J., et al., "Algorithm Description of Joint Exploration Test Model 7 (JEM7)", JVET-G1001-V1, Joint Video Exploration Team (JVET) of ITU-T SG 16 WP3 and ISO/IEC JTC 1/SC 29/WG 11, 7th Meeting, Jul. 13, 2017-Jul. 21, 2017, Torino, Aug. 19, 2017 (Aug. 19, 2017), XP030150980, 51 Pages, pp. i-iv, Retrieved from the Internet URL: http://phenix.int-evry.fr/jvet/doc_end_user/documents/7_Torino/wg11/JVET-G0001-v1.zip, p. 20.

Egilmez H.E., "CE6-related: On LFNST Support Patterns", Joint Video Experts Team (JVET) of ITU-T SG 16 WP 3 and ISO/IEC JTC 1/SC 29/WG 11, JVET-P0566-V2, 16th Meeting: Geneva, CH, Oct. 1-11, 2019, pp. 1-5.

Fraunhofer HHI., "Transform Coding Using the Residual Quadtree (RQT)", retrieved from: http://www.hhi.fraunhofer.de/fields-of-competence/image-processing/research-groups/image-video-coding/hevc-high-efficiency-video-coding/transform-coding-using-the-residual-quadtree-rqt.html, Mar. 6, 2017, pp. 1-4.

Han J., et al., "Towards Jointly Optimal Spatial Prediction and Adaptive Transform in Video/Image Coding", IEEE International Conference on Acoustics, Speech and Signal Processing (ICASSP), Mar. 2010, pp. 726-729.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Jain A.K., "A Sinusoidal Family of Unitary Transforms", IEEE Transactions on Pattern Analysis and Machine Intelligence, IEEE Service Center, vol. PAMI-1, No. 4, Oct. 1, 1979, XP011242370, pp. 356-365, ISSN: 0162-8828.

Koo (Lge) M., et al., "CE6: Reduced Secondary Transform (RST) (CE6-3.1)", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0193, Mar. 27, 2019 (Mar. 27, 2019), XP030256927, pp. 1-19, Retrieved from the Internet: URL: http://phenix.int-evry.fr/jvet/doc_end_user/documents/14_Geneva/wg11/JVET-N0193-v5.zip JVET-N0193 r3.docx, [retrieved on Mar. 27, 2019].

Martucci S.A., et al., "Symmetric Convolution and the Discrete Sine and Cosine Transforms", IEEE Transactions on Signal Processing, IEEE Signal Processing Society, vol. 42, No. 5, May 1, 1994, XP000863873, pp. 1038-1051.

Said A., et al., "CE6: Summary Report on Transforms and Transform Signaling", JVET-M0026, Joint Video Experts Team (JVET) of ITU-T SG 16 WP 3 and ISO/IEC JTC 1/SC 29/WG 11, 13th Meeting, Marrakech, MA, Jan. 9-18, 2019, pp. 1-19.

Said A., et al., "Description of Core Experiment 6 (CE6): Transforms and Transform Signalling", Joint Video Experts Team (JVET) of ITU-T SG 16 WP 3 and ISO/IEC JTC 1/SC 29/WG 11, JVET-L1026-v3, 12th Meeting: Macao, CN, Oct. 3-12, 2018, pp. 1-14.

Wien M., "High Efficiency Video Coding", Coding Tools and Specification, Springer-Verlag, Berlin, 2015, 30 Pages.

Zhao X., et al., "CE6: Summary Report on Transforms and Transform Signaling", JVET-N0026-v1, Joint Video Experts Team (JVET) of ITU-T SG 16 WP 3 and ISO/IEC JTC 1/SC 29/WG 11, 14th Meeting, Geneva, CH, Mar. 19-27, 2019, pp. 1-15.

Zhao X., et al., "CE6: Summary Report on Transforms and Transform Signalling" JVET-O0026-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-8.

Zhao X., et al., "Enhanced Multiple Transform for Video Coding", Data Compression Conference, Mar. 30, 2016, XP033027689, DOI: 10.1109/DCC.2016.9 [retrieved on Dec. 15, 2016], pp. 73-82.

Zhou T., et al., "CE6-2.3a: Simplification with New LFNST Transform Basis", Joint Video Experts Team (JVET) of ITU-T SG 16 WP 3 and ISO/IEC JTC 1/SC 29/WG 11, JVET-P0065, 16th Meeting: Geneva, CH, Oct. 2-12, 2019, pp. 1-5.

Chen J., et al., "Algorithm Description for Versatile Video Coding and Test Model 6 (VTM 6)", MPEG Meeting, Jul. 8, 2019-Jul. 12, 2019, 15th Meeting, Joint Video Experts Team (JVET) of ITU-T SG16 WP3 and ISO/IECJTC1/SC29/WG11, 127. No. m49914, JVET-O2002-v2, Gothenburg, SE, Jul. 3-12, 2019, XP030208573, pp. 1-89, Retrieved from the Internet:URL:http://phenix.int-evry.fr/mpeg/doc_end_user/documents/127_Gothenburg/wg11/m49914-JVET-O2002-v2-JVET-O2002-v2.zip.

U.S. Appl. No. 16/424,749, filed May 30, 2019, by Matthew Charles. US 2019-0371963 A1.

Huo J, et al., "Modification of LFNST for MIP Coded Block", 17. JVET Meeting, Jan. 7, 2020-Jan. 17, 2020, Brussels (The Joint Video Exploration Team of ISO/IEC JTC1/SC29/WG11 and ITU-TSG.16), No. JVET-Q0453, Jan. 9, 2020 (Jan. 9, 2020), XP030223568, pp. 1-6, Retrieved from the Internet: URL: http://phenix.int-evry.fr/jvet/doc_end_user/documents/17_Brussels/wg11/JVET-Q0453-v2.zip JVET-Q0453-v2/JVET-Q0453-v2.docx [retrieved on Jan. 9, 2020].

International Search Report and Written Opinion—PCT/US2020/051683—ISA/EPO—dated Feb. 5, 2021.

Koo (Lge) M, et al., "CE6: Reduced Secondary Transform (RST) (Test 6.5.1)", 13th JVET Meeting, Jan. 9, 2019-Jan. 18, 2019, Marrakech (The Joint Video Exploration Team of ISO/IEC JTC1/SC29/WG11 and ITU-TSG.16 WP 3), No. JVET-M0292, Jan. 12, 2019 (Jan. 12, 2019), XP030201760, pp. 1-14, Retrieved from the Internet: URL:http://phenix.int-evry.fr/jvet/doc_end_user/documents/13_Marrakech/wg11/JVET-M0292-v5.zip RST M0292.pptx [retrieved on Jan. 12, 2019].

Koo M., et al., "Description of SDR Video Coding Technology Proposal by LG Electronics", 10. JVET Meeting, Apr. 10, 2018-Apr. 20, 2018; San Diego (The Joint Video Explorationteam of ISO/IEC JTC1/SC29/WG11 and ITU-TSG.16), URL:http://phenix.int-evry.fr/jvet/, No. JVET-J0017-v2, Apr. 11, 2018 (Apr. 11, 2018), XP030151178, 71 Pages.

Koo M, et al., "Low Frequency Non-Separable Transform (LFNST)", 2019 Picture Coding Symposium (PCS), IEEE, Nov. 12, 2019 (Nov.

(56) References Cited

OTHER PUBLICATIONS 12, 2019), XP033688143, 5 Pages, DOI: 10.1109/PCS48520.2019.
8954507 [retrieved on Jan. 8, 2020].

* cited by examiner

Table 1. Results of the example of FIG. 13 over VTM-6.0 under CTC

| | All Intra | | | | |
| --- | --- | --- | --- | --- | --- |
| | Over VTM-6.0 | | | | |
| | Y | U | V | EncT | DecT |
| Class A1 | 0.09% | 0.22% | 0.37% | 100% | 100% |
| Class A2 | 0.00% | 0.14% | 0.08% | 101% | 101% |
| Class B | 0.01% | 0.12% | 0.11% | 100% | 100% |
| Class C | 0.07% | 0.11% | 0.01% | 101% | 102% |
| Class E | 0.05% | 0.10% | 0.08% | 101% | 101% |
| Overall | 0.01% | 0.09% | 0.12% | 101% | 101% |
| Class D | 0.04% | 0.10% | 0.03% | 100% | 100% |
| Class F | 0.09% | 0.04% | 0.02% | 100% | 99% |

| | Random Access | | | | |
| --- | --- | --- | --- | --- | --- |
| | Over VTM-6.0 | | | | |
| | Y | U | V | EncT | DecT |
| Class A1 | 0.08% | 0.11% | 0.18% | 100% | 100% |
| Class A2 | 0.04% | 0.13% | 0.03% | 101% | 102% |
| Class B | 0.02% | 0.07% | -0.02% | 100% | 100% |
| Class C | 0.04% | 0.01% | 0.13% | 101% | 102% |
| Class E | | | | | |
| Overall | 0.00% | 0.07% | 0.07% | 101% | 101% |
| Class D | 0.07% | 0.22% | -0.05% | 100% | 100% |
| Class F | 0.01% | 0.00% | -0.02% | 100% | 100% |

FIG. 17

Table 2. Results of the example FIG. 14 over VTM-6.0 under CTC

| | All Intra | | | | |
|---|---|---|---|---|---|
| | Over VTM-6.0 | | | | |
| | Y | U | V | EncT | DecT |
| Class A1 | 0.10% | 0.13% | 0.18% | 100% | 100% |
| Class A2 | 0.06% | 0.10% | 0.00% | 101% | 101% |
| Class B | 0.07% | 0.12% | 0.10% | 100% | 99% |
| Class C | 0.12% | 0.09% | 0.04% | 101% | 105% |
| Class E | 0.12% | 0.02% | 0.01% | 101% | 101% |
| Overall | 0.09% | 0.06% | 0.07% | 101% | 101% |
| Class D | 0.09% | 0.01% | 0.08% | 101% | 100% |
| Class F | 0.09% | 0.06% | 0.14% | 100% | 100% |

| | Random Access | | | | |
|---|---|---|---|---|---|
| | Over VTM-6.0 | | | | |
| | Y | U | V | EncT | DecT |
| Class A1 | 0.04% | 0.08% | 0.13% | 100% | 100% |
| Class A2 | 0.00% | 0.09% | 0.06% | 101% | 102% |
| Class B | 0.05% | 0.06% | 0.12% | 100% | 101% |
| Class C | 0.06% | 0.02% | 0.12% | 102% | 103% |
| Class E | | | | | |
| Overall | 0.04% | 0.06% | 0.11% | 101% | 101% |
| Class D | 0.06% | 0.00% | 0.14% | 101% | 101% |
| Class F | 0.09% | 0.16% | 0.04% | 100% | 100% |

FIG. 18

Table 3. Results of the example of FIG. 13 without optimized 4x4 LFNST matrices over VTM-6.0 under CTC

| | All Intra | | | | |
| --- | --- | --- | --- | --- | --- |
| | Over VTM-6.0 | | | | |
| | Y | U | V | EncT | DecT |
| Class A1 | 0.09% | 0.28% | 0.31% | 100% | 103% |
| Class A2 | 0.02% | 0.02% | 0.02% | 101% | 100% |
| Class B | 0.02% | 0.13% | 0.12% | 100% | 99% |
| Class C | 0.01% | 0.04% | 0.10% | 100% | 101% |
| Class E | 0.02% | 0.15% | 0.08% | 101% | 100% |
| Overall | 0.03% | 0.10% | 0.12% | 100% | 100% |
| Class D | 0.00% | 0.10% | 0.02% | 100% | 99% |
| Class F | 0.01% | 0.04% | 0.10% | 100% | 101% |

| | Random Access | | | | |
| --- | --- | --- | --- | --- | --- |
| | Over VTM-6.0 | | | | |
| | Y | U | V | EncT | DecT |
| Class A1 | 0.06% | 0.22% | 0.27% | 101% | 100% |
| Class A2 | 0.03% | 0.17% | 0.17% | 101% | 101% |
| Class B | 0.01% | 0.15% | 0.02% | 100% | 100% |
| Class C | 0.02% | 0.06% | 0.05% | 101% | 102% |
| Class E | | | | | |
| Overall | 0.02% | 0.14% | 0.07% | 101% | 101% |
| Class D | 0.03% | 0.23% | 0.09% | 100% | 99% |
| Class F | 0.00% | 0.08% | 0.07% | 100% | 100% |

FIG. 19

Table 4. Results of the example of FIG. 14 without optimized 4x4 LFNST matrices over VTM-6.0 under CTC

|  | All Intra | | | | |
| --- | --- | --- | --- | --- | --- |
|  | Over VTM-6.0 | | | | |
|  | Y | U | V | EncT | DecT |
| Class A1 | 0.08% | 0.05% | 0.21% | 100% | 100% |
| Class A2 | 0.03% | 0.07% | 0.05% | 100% | 100% |
| Class B | 0.05% | 0.08% | 0.07% | 100% | 100% |
| Class C | 0.03% | 0.09% | 0.01% | 101% | 103% |
| Class E | 0.05% | 0.10% | 0.09% | 101% | 98% |
| Overall | 0.05% | 0.04% | 0.06% | 100% | 100% |
| Class D | 0.02% | 0.09% | 0.10% | 100% | 100% |
| Class F | 0.04% | 0.10% | 0.11% | 100% | 98% |

|  | Random Access | | | | |
| --- | --- | --- | --- | --- | --- |
|  | Over VTM-6.0 | | | | |
|  | Y | U | V | EncT | DecT |
| Class A1 | 0.04% | 0.07% | 0.12% | 100% | 100% |
| Class A2 | 0.02% | 0.07% | 0.01% | 100% | 100% |
| Class B | 0.03% | 0.12% | 0.05% | 100% | 101% |
| Class C | 0.01% | 0.08% | 0.09% | 100% | 101% |
| Class E |  |  |  |  |  |
| Overall | 0.02% | 0.09% | 0.06% | 100% | 100% |
| Class D | 0.04% | 0.27% | 0.03% | 100% | 100% |
| Class F | 0.01% | 0.06% | 0.06% | 100% | 100% |

FIG. 20

TRANSFORM UNIT DESIGN FOR VIDEO CODING

This application claims priority to U.S. Provisional Patent Application No. 62/902,862, entitled TRANSFORM UNIT DESIGN FOR VIDEO CODING and filed on Sep. 19, 2019, to U.S. Provisional Patent Application No. 62/904,494, entitled TRANSFORM UNIT DESIGN FOR VIDEO CODING and filed on Sep. 23, 2019, and to U.S. Provisional Patent Application No. 62/951,837, entitled TRANSFORM UNIT DESIGN FOR VIDEO CODING and filed on Dec. 20, 2019, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for optimized matrices and reorganization patterns/scans for 8×8 low-frequency non-separable transforms (LFNSTs) in video coding. Designs of LFNST, such as those disclosed in some video coding standards, may require a relatively large number of multiplications and a relatively large amount of memory when applied by a video coder. According to the techniques of this disclosure, an 8×8 LFNST may be simplified and coefficients may be reorganized to efficiently apply the 8×8 LFNST.

In one example, a method includes reorganizing, by one or more processors, 2-D dequantized coefficients according to a first ordering, applying, by the one or more processors, an inverse low-frequency non-separable transform (LFNST) to the reorganized 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST, reorganizing, by the one or more processors, the inverse transformed coefficients according to a second ordering, the second ordering being based on an array comprising values, wherein each value in the array corresponds to a position in a 2-D block and the values in the array denote indices of the 2-D block in a defined order, and decoding, by the one or more processors, the video data based on the second ordered inverse transformed coefficients.

In another example, a device includes a memory configured to store the video data, and one or more processors implemented in circuitry and communicatively coupled to the memory, the one or more processors being configured to: reorganize 2-D dequantized coefficients according to a first ordering; apply an inverse low-frequency non-separable transform (LFNST) to the reorganized 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST; reorganize the inverse transformed coefficients according to a second ordering, the second ordering being based on an array including values, wherein each value in the array corresponds to a position in a 2-D block and the values in the array denote indices of the 2-D block in a defined order; and decode the video data based on the second ordered inverse transformed coefficients.

In another example, a device includes means for reorganizing 2-D dequantized coefficients according to a first ordering, means for applying an inverse low-frequency non-separable transform (LFNST) to the reorganized 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST, means for reorganizing the inverse transformed coefficients according to a second ordering, the second ordering being based on an array including values, wherein each value in the array corresponds to a position in a 2-D block and the values in the array denote indices of the 2-D block in a defined order, and means for decoding the video data based on the second ordered inverse transformed coefficients.

In another example, a non-transitory computer-readable storage medium having instructions stored thereon which, when executed by one or more processors, cause the one or more processors to: reorganize 2-D dequantized coefficients according to a first ordering; apply an inverse low-frequency non-separable transform (LFNST) to the reorganized 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST; reorganize the inverse transformed coefficients according to a second ordering, the second ordering being based on an array including values, wherein each value in the array corresponds to a position in a 2-D block and the values in the array denote indices of the 2-D block in a defined order; and decode the video data based on the second ordered inverse transformed coefficients.

The details of one or more examples are set forth in the accompanying drawings and the description below. Other features, objects, and advantages will be apparent from the description, drawings, and claims.

BRIEF DESCRIPTION OF DRAWINGS

FIG. 7 is a conceptual diagram illustrating a 4×4 inverse LFNST used to reconstruct 16 intermediate coefficients from a list of 16 input coefficients.

FIG. 8 is a conceptual diagram illustrating an 8×8 inverse LFNST used to reconstruct 48 intermediate coefficients from a list of 16 input coefficeints.

FIG. 17 is a table illustrating test results of the example of FIG. 13 over VTM-6.0 under common test conditions (CTC).

FIG. 18 is a table illustrating test results of the example of FIG. 14 over VTM-6.0 under CTC.

FIG. 19 is a table illustrating test results of the example of FIG. 13 without optimized 4×4 LFNST matrices over VTM-6.0 under CTC.

FIG. 20 is a table illustrating test results of the example of FIG. 14 without optimized 4×4 LFNST matrices over VTM-6.0 under CTC.

DETAILED DESCRIPTION

Designs of low-frequency non-separable transforms (LFNST), such as those disclosed in some video coding standards, may require a relatively large number of multiplications and a relatively large amount of memory when applied by a video coder. These designs may also be relatively inefficient.

According to the techniques of this disclosure, an 8×8 LFNST may be simplified and coefficients may be reorganized to efficiently apply the 8×8 LFNST. The 8×8 LFNSTs and the reorganized coefficients of the current disclosure may reduce the number of multiplications required and reduce memory requirements as well. Additionally, the 8×8 LFNSTs and reorganized coefficients of the current disclosure may provide coding gains without increasing complexity when compared to other designs of LFNSTs.

Figure 1:
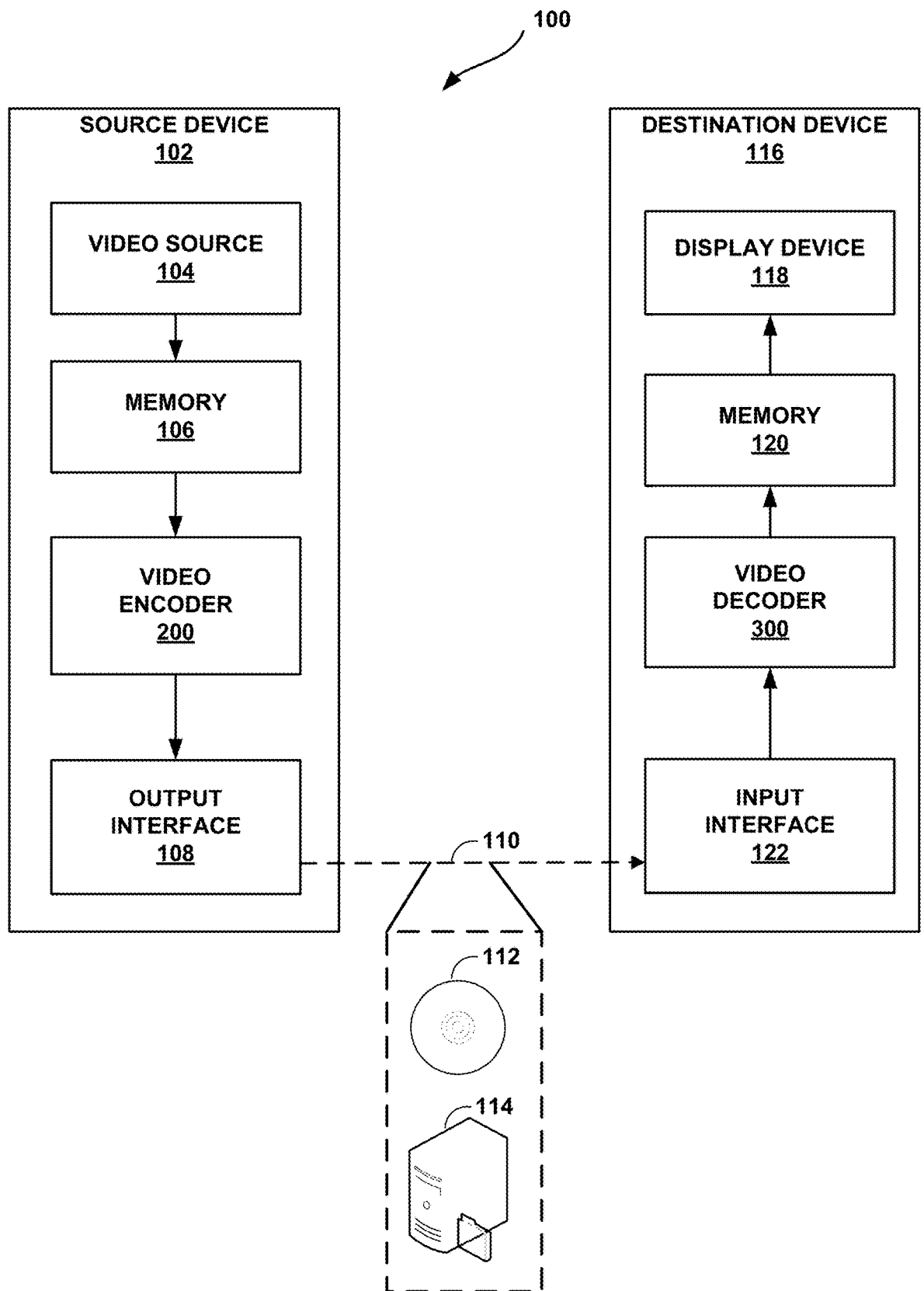
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for optimized matrices and reorganization patterns/scans for 8×8 LFNSTs for video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for optimized matrices and reorganization patterns/scans for 8×8 LFNSTs for video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"). A more recent draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 19th Meeting: by teleconference, 22 Jun.-1 Jul. 2020, JVET-S2001-vA (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a method of decoding video data includes reorganizing, by one or more processors, 2-D dequantized coefficients according to a first ordering; applying, by the one or more processors, an inverse low-frequency non-separable transform (LFNST) to the reorganized 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST; reorganizing, by the one or more processors, the inverse transformed coefficients according to a second ordering, the second ordering being based on an array comprising values, wherein each value in the array corresponds to a position in a 2-D block and the values in the array denote indices of the 2-D block in a defined order; and decoding, by the one or more processors, the video data based on the second ordered inverse transformed coefficients.

In accordance with the techniques of this disclosure, a device for decoding video data includes a memory configured to store the video data, and one or more processors implemented in circuitry and communicatively coupled to the memory, the one or more processors being configured to: reorganize 2-D dequantized coefficients according to a first ordering; apply an inverse low-frequency non-separable transform (LFNST) to the reorganized 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST; reorganize the inverse transformed coefficients according to a second ordering, the second ordering being based on an array including values, wherein each value in the array corresponds to a position in a 2-D block and the values in the array denote indices of the 2-D block in a defined order; and decode the video data based on the second ordered inverse transformed coefficients.

In accordance with the techniques of this disclosure, a device for decoding video data includes means for reorganizing 2-D dequantized coefficients according to a first ordering, means for applying an inverse low-frequency non-separable transform (LFNST) to the reorganized 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST, means for reorganizing the inverse transformed coefficients according to a second ordering, the second ordering being based on an array including values, wherein each value in the array corresponds to a position in a 2-D block and the values in the array denote indices of the 2-D block in a defined order, and means for decoding the video data based on the second ordered inverse transformed coefficients.

In accordance with the techniques of this disclosure, a non-transitory computer-readable storage medium having instructions stored thereon which, when executed by one or more processors, cause the one or more processors to: reorganize 2-D dequantized coefficients according to a first ordering; apply an inverse low-frequency non-separable transform (LFNST) to the reorganized 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST; reorganize the inverse transformed coefficients according to a second ordering, the second ordering being based on an array including values, wherein each value in the array corresponds to a position in a 2-D block and the values in the array denote indices of the 2-D block in a defined order; and decode the video data based on the second ordered inverse transformed coefficients.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
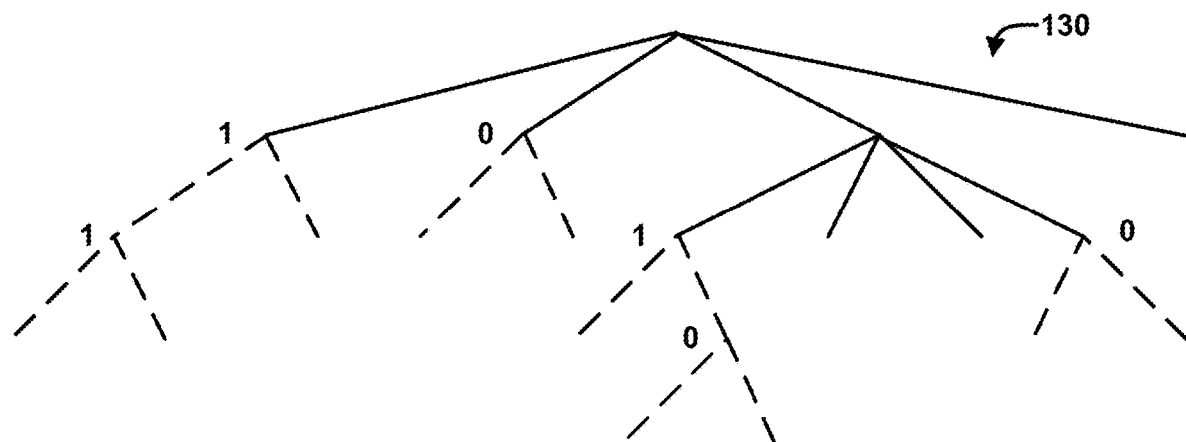
FIGS. 2A and 2B are conceptual diagrams illustrating an example quadtree binary tree (QTBT) structure, and a corresponding coding tree unit (CTU).
Figure 2B:
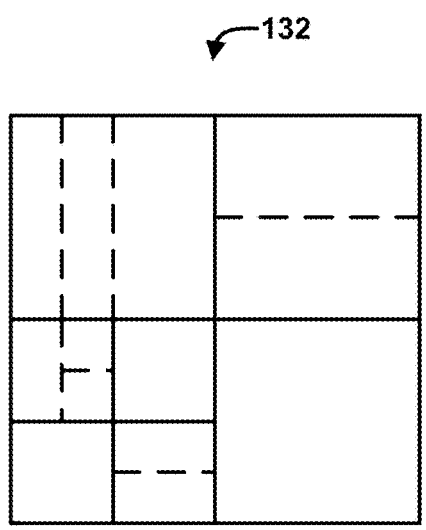

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
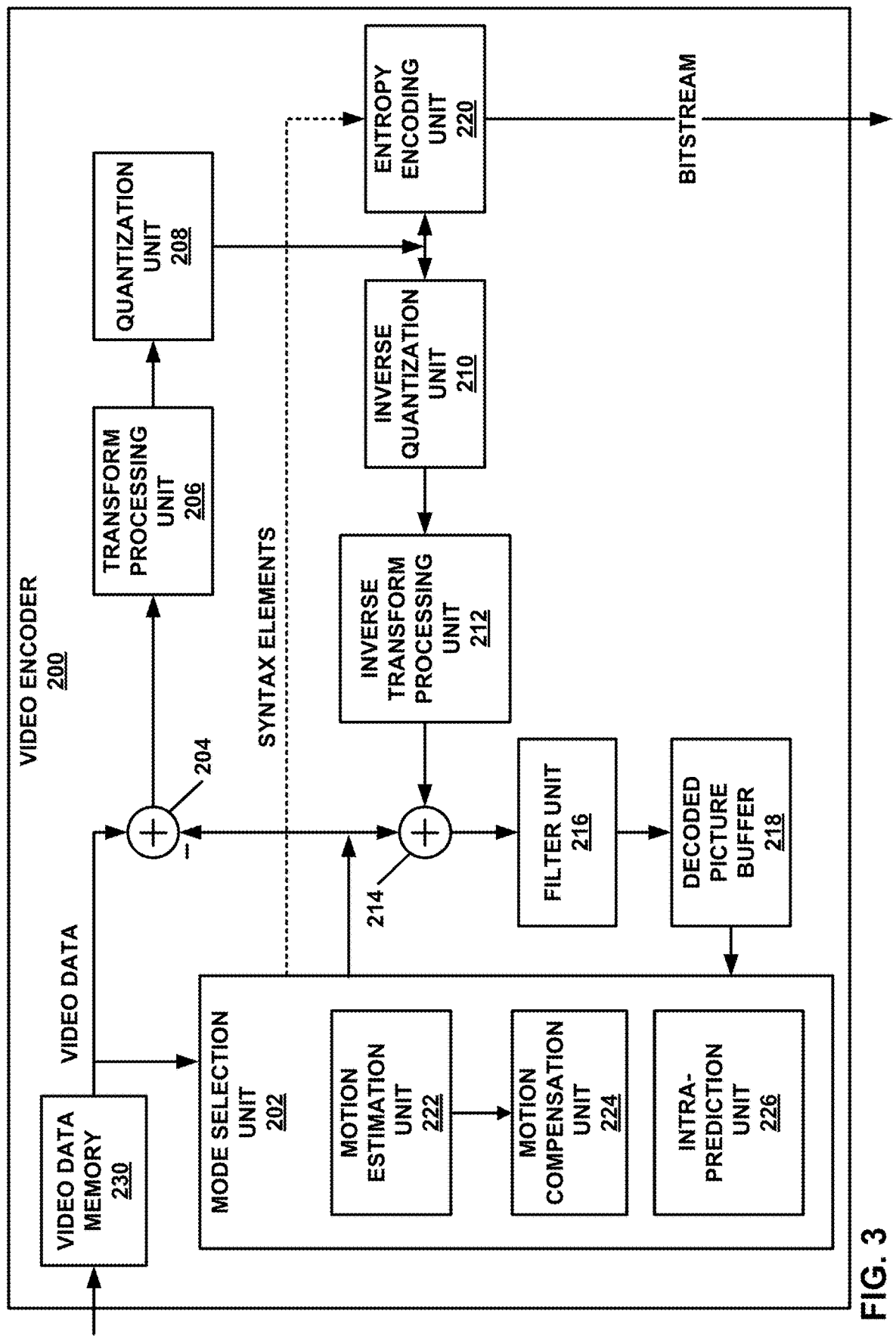
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a LFNST, a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

In some examples, transform processing unit 206 may reorganize primary transform coefficients according to an ordering. Transform processing unit 206 may also apply a LFNST to the reorganized primary transform coefficients to create LFNST coefficients.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Quantized transform coefficients that have been inverse quantized may be referred to herein as dequantized coefficients. For example, inverse transform processing unit 212 may reorganize 2-D dequantized coefficients according to a first ordering. Inverse transform processing unit 212 may also apply an inverse LFNST to the reorganized 2-D dequantized coefficients to create inverse transformed coefficients. Inverse transform processing unit 212 may also reorganize the inverse transformed coefficients according to second ordering. Inverse transform processing unit 212 may also decode the video data based on the second ordered inverse transformed coefficients. For example, inverse transform processing unit 212 may apply an inverse separable transform, such as an inverse DCT-2, to the reorganized inverse transformed coefficients.

Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to decode video data, for example, in a reconstruction loop. The one or more processors are configured to reorganize 2-D dequantized coefficients according to a first ordering, apply an inverse low-frequency non-separable transform (LFNST) to the reorganized 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST, reorganize the inverse transformed coefficients according to a second ordering, the second ordering being based on an array including values, wherein each value in the array corresponds to a position in a 2-D block and the values in the array denote indices of the 2-D block in a defined order, and decode the video data based on the second ordered inverse transformed coefficients.

Figure 4:
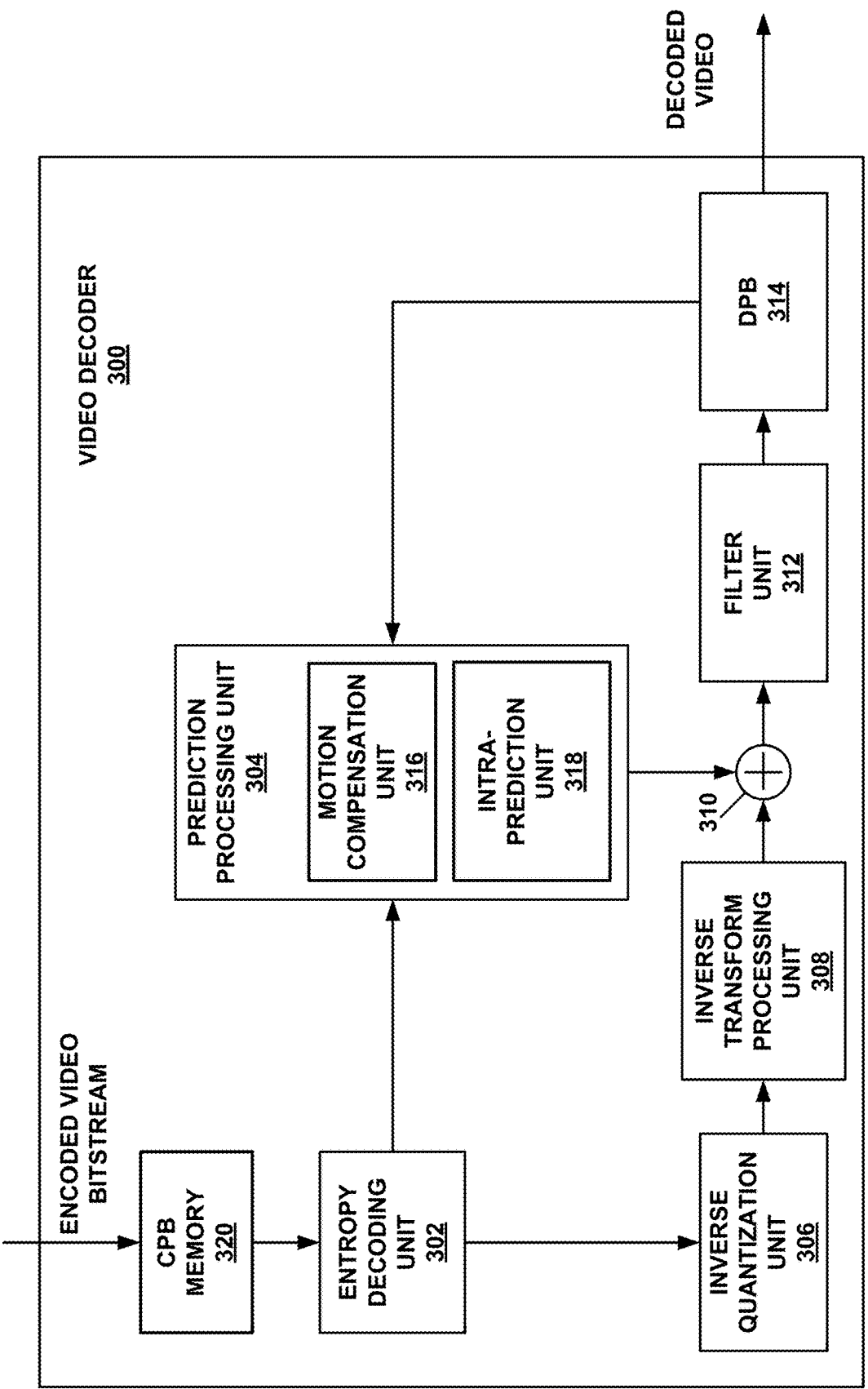
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse LFNST, an inverse DCT, an inverse integer transform, an inverse Karhunen-Loeve transform (KLT), an inverse rotational transform, an inverse directional transform, or another inverse transform to the transform coefficient block.

For example, inverse transform processing unit 308 may reorganize 2-D dequantized coefficients according to a first ordering. Inverse transform processing unit 308 may also apply an inverse LFNST to the reorganized 2-D dequantized coefficients to create inverse transformed coefficients. Inverse transform processing unit 308 may also reorganize the inverse transformed coefficients according to second ordering. Inverse transform processing unit 308 may also decode the video data based on the second ordered inverse transformed coefficients. For example, inverse transform processing unit 308 may apply an inverse separable transform, such as an inverse DCT-2, to the reorganized inverse transformed coefficients.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to reorganize 2-D dequantized coefficients according to a first ordering, apply an inverse low-frequency non-separable transform (LFNST) to the reorganized 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST, reorganize the inverse transformed coefficients according to second ordering, the second ordering being based on an array including values, wherein each value in the array corresponds to a position in a 2-D block and the values in the array denote indices of the 2-D block in a defined order, and decode the video data based on the second ordered inverse transformed coefficients.

This disclosure is related to transform coding. Transform coding is a fundamental element of modern video compression standards. See M. Wien, High Efficiency Video Coding: Coding Tools and Specification, Springer-Verlag, Berlin, 2015. This disclosure covers various low-frequency non-separable transform designs that may improve coding efficiency or simplify the design in video codes, including improving coding efficiency and simplicity relative to the design of VVC Draft 6. The techniques of this disclosure can be used in other advanced video codecs including extensions of HEVC and the next generation(s) of video coding standards. In implementations of video coding standards prior to HEVC, only a fixed separable transform is used where DCT-2 is used both vertically and horizontally. In implementations of HEVC, in addition to DCT-2, DST-7 is also employed for 4×4 blocks as a fixed separable transform. U.S. Pat. No. 10,306,229, entitled Enhanced Multiple Transforms for Prediction Residual, issued on May 28, 2019 and claiming priority to U.S. Provisional Patent Application 62/107,996 filed on Jan. 26, 2015; U.S. Publication No. 2018-0020218 A1 entitled Look-Up Table for Enhanced Multiple Transform, published on Jan. 18, 2018 and claiming priority to U.S. Provisional Patent Application No. 62/363,188 filed on Jul. 15, 2016; and U.S. Patent Publication No. 2019-0373261 A1 entitled Coding Adaptive Multiple Transform Information for Video Coding, filed on May 30, 2019 and claiming priority to U.S. Provisional Patent Application No. 62/679,570 filed on Jun. 1, 2018 describe multiple transform selection (MTS) methods. MTS was previously called Adaptive Multiple Transforms (AMT). An example of MTS in U.S. Patent Publication No. 2019-0373261 A1 has been adopted in the Joint Experimental Model (JEM-7.0) of the Joint Video Experts Team (JVET). See Joint Video Experts Team (JVET) of ITU-T SG 16 WP 3 and ISO/IEC JTC 1/SC 29/WG 11, JEM Software. Later, a simplified version of MTS was adopted in VVC.

Figure 5:
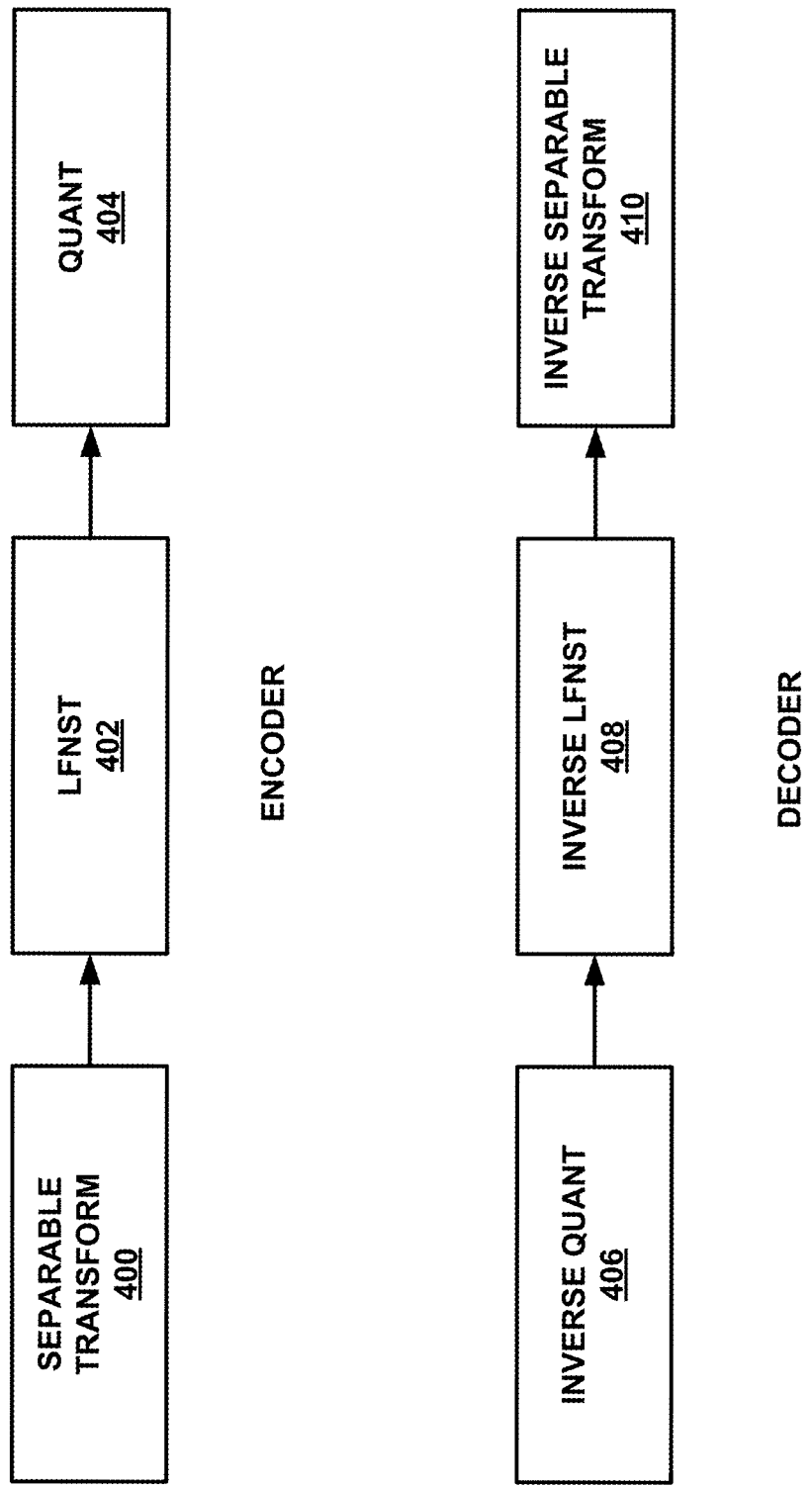
FIG. 5 is a conceptual diagram illustrating a low-frequency non-separable transform (LFNST) at an encoder and decoder where LFNST includes a stage between separable transformation and quantization in a codec.

FIG. 5 is a conceptual diagram illustrating a low-frequency non-separable transform (LFNST) at an encoder and decoder (e.g., video encoder 200 and video decoder 300) where LFNST includes a stage between separable transformation and quantization in the codec. In the example of FIG. 5, a video encoder, such as video encoder 200, may apply a separable transform 400. The video encoder may then apply an LFNST 402. The video encoder may then quantize the LFNST coefficients 404. A video decoder, such as video decoder 300, may inverse quantize the quantized coefficients 406. The video decoder may then apply an inverse LFNST 408. The video decoder may then apply an inverse separable transform 410.

The LFNST illustrated in FIG. 5 is used in JEM-7.0 to further improve the coding efficiency of MTS, where an implementation of LFNST is based on a Hypercube Givens Transform (HyGT) disclosed in U.S. Pat. No. 10,448,053, entitled Multi-Pass Non-Separable Transforms for Video Coding, issued on Oct. 15, 2019 and claiming the benefit of U.S. Provisional Patent Application Nos. 62/295,440 and 62/295,448 both filed on Feb. 15, 2016 (for alternative designs and further details, see U.S. Pat. No. 10,491,922, entitled Non-Separable Secondary Transform for Video Coding, issued on Nov. 26, 2019; U.S. Pat. No. 10,349,085, entitled Efficient Parameter Storage for Compact Multi-Pass Transforms, issued on Jul. 9, 2019, and claiming the benefit of U.S. Provisional Patent Application Nos. 62/295,456 and 62/295,448 both filed on Feb. 15, 2016, and U.S. Patent Publication No. 2019-0297351 A1, entitled Minimization of Transform Memory and Latency Via Parallel Factorizations, published on Sep. 26, 2019). LFNST was previously called non-separable secondary transform (NSST) or secondary transform where all the abbreviations are the same. Recently, LFNST has been adopted in Koo et al., "CE6: Reduced Secondary Transform (RST) (CE6-3.1)" Joint Video Experts Team (JVET) of ITU-T SG 16 WP 3 and ISO/IEC JTC 1/SC 29/WG 11, 14th Meeting: Geneva, CH, 19-27 Mar. 2019, JVET-N0193.

Figure 6:
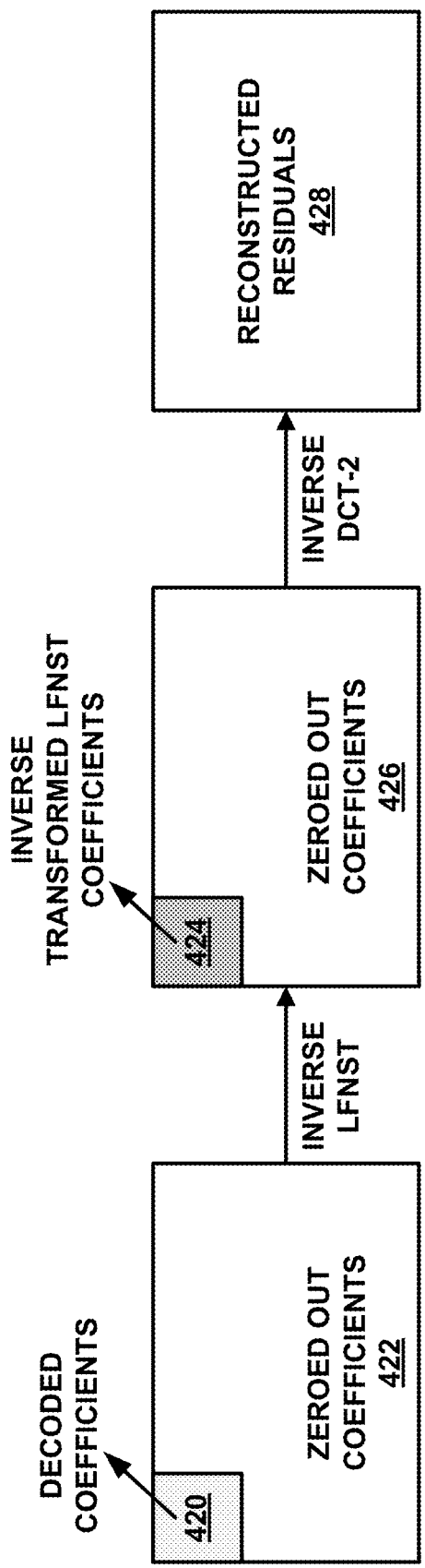
FIG. 6 is a conceptual diagram illustrating an inverse transform process with LFNST.

FIG. 6 is a conceptual diagram illustrating an example inverse transform process with LFNST. The inverse transformation with LFNST involves the following techniques illustrated in FIG. 6 and may be performed, for example, by inverse transform processing unit 212 of video encoder 200 and by inverse transform processing unit 308 of video decoder 300. The decoded transform coefficients in 2-D block 420 are used as input to the inverse LFNST by first converting 2-D block 420 into a 1-D list (or vector) of coefficients via pre-defined scanning/ordering. Zeroed out coefficients 422 are not used. Zeroed out coefficients may be coefficients whose values are set to zero based on their position within the 2-D block according to predefined rules. An inverse LFNST is applied to the 1-D list of input coefficients and the output coefficients are reorganized into 2-D block 424 via pre-defined scanning/ordering. Zeroed out coefficients 426 are not used. The inverse transformed LFNST coefficients are used as input to the separable inverse DCT-2 to obtain reconstructed residuals 428.

Figure 7:
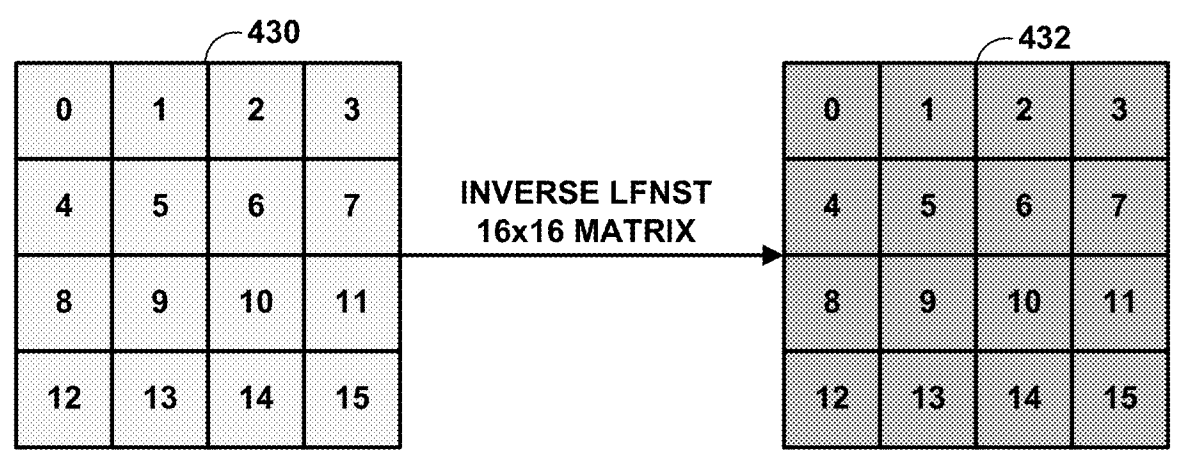
Figure 8:
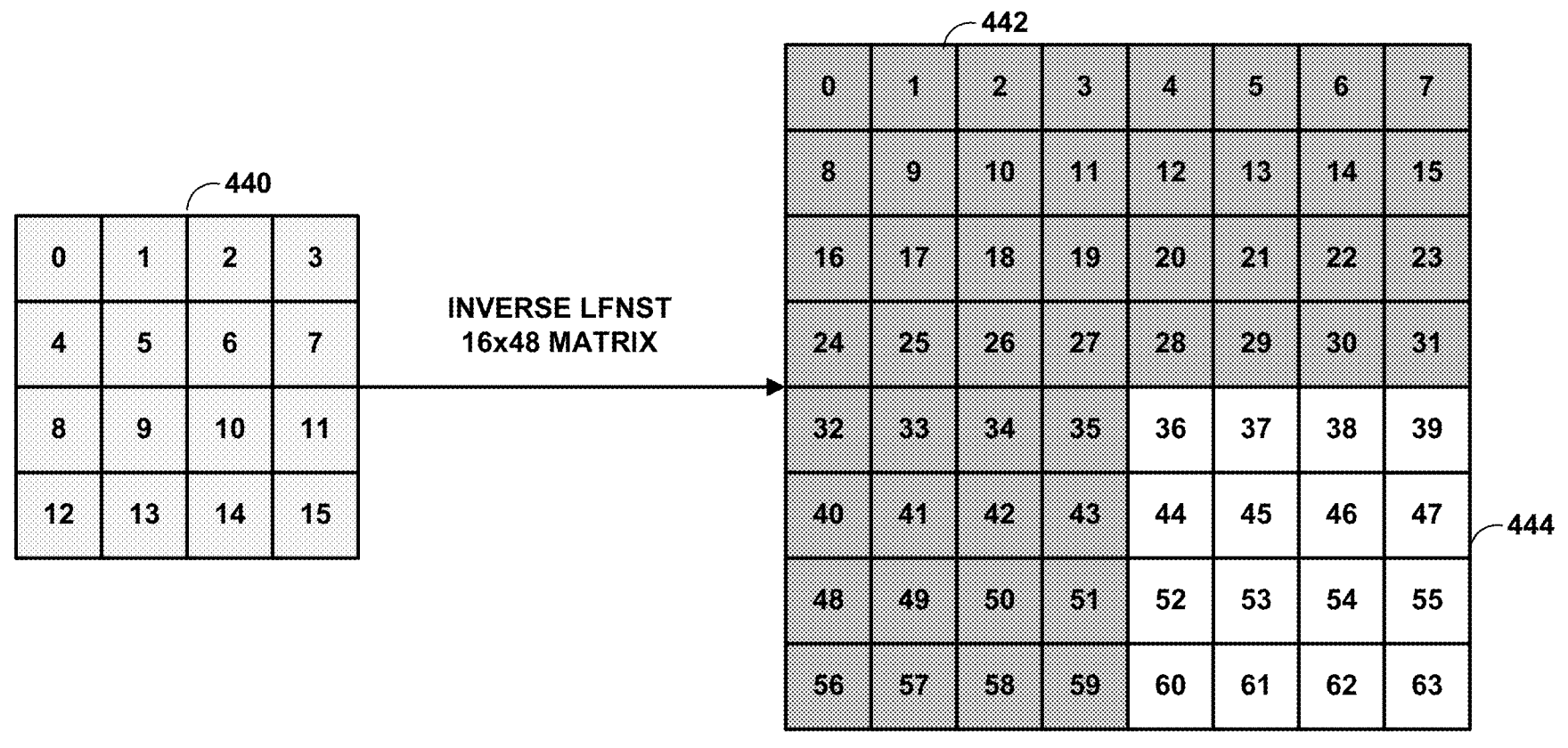

FIG. 7 is a conceptual diagram illustrating a 4×4 inverse LFNST used to reconstruct 16 intermediate coefficients from a list of 16 input coefficients. FIG. 8 is a conceptual diagram illustrating an 8×8 inverse LFNST used to reconstruct 48 intermediate coefficients from a list of 16 input coefficients. In VVC Draft 6, LFNST may be applied to 4×4 or 8×8 subblocks. In both cases, 16 decoded coefficients in a 4×4 subblock (some of which may be normatively zeroed-out) are input to an inverse LFNST. For 4×4 subblock 430, video decoder 300 may use a 16×16 inverse LFNST to construct 16 intermediate coefficients 432 before applying the separable inverse DCT-2 as shown in FIG. 7. For 8×8 subblock 440, video decoder 300 may use a 16×48 inverse LFNST to construct 48 intermediate coefficients 442 before the separable inverse DCT-2. as shown in FIG. 8. Note that 48 intermediate coefficients 442 are reorganized in an L-shaped pattern. The remaining coefficients 444 are zeroed out. An inverse LFNST process may be fully defined based on (i) a transform (e.g., LFNST) matrix and (ii) a reorganization pattern/scan for intermediate coefficients. One example of the details of the zero-out process in VVC Draft 6 are described in U.S. patent application Ser. No. 15/931,271, entitled Low-Frequency Non-Separable Transformation Signaling Based on Zero-Out Patterns for Video Coding, filed on May 13, 2020 and claiming priority to U.S. Provisional Patent Application 62/849,689, filed May 17, 2019.

For a 4×4 LFNST, one of the following two patterns/scans may be used by video encoder 200 and video decoder 300 depending on intra mode:

```
const int g_lfnstRGScan4x4  [16] =
{ // 0 1 2 3 4 5 6 7 8 9 10 11 12 13 14 15
    0, 1, 2, 3, 4, 5, 6, 7, 8, 9, 10, 11, 12, 13, 14, 15
};
const int g_lfnstRGTranScan4x4[16] =
{ // 0 1 2 3 4 5 6 7 8 9 10 11 12 13 14 15
    0, 4, 8,12, 1, 5, 9,13, 2, 6, 10, 14, 3, 7, 11, 15
};
``` where above two patterns/scans indicate the reordering of intermediate coefficients. For example, lfnstRGScan4×4 does not change the row-major reordering of coefficients. However, lfnstRGTranScan4×4 reorders by transposing the order of coefficients (e.g., coefficients at 1, 2, 3, 6, 7 and 11 are swapped with coefficients at 4, 8, 12, 9, 13 and 14, respectively). In some examples, lfnstRGScan4×4 may be used for intra modes indexed between 0 and 34, inclusive and lfnstRGTranScan4×4 may be used for intra modes indexed above 34.

For a 4×4 LFNST, the following eight 16×16 matrices of may be used according to VVC Draft 6.

```
const int8_t g_lfnst4x4[ 4 ][ 2 ][ 16 ][ 16 ] = {
  { //0
    {
      { 108, -44, -15, 1, -44, 19, 7, -1, -11, 6, 2, -1, 0, -1, -1, 0 },
      { -40, -97, 56, 12, -11, 29, -12, -3, 18, 18, -15, -3, -1, -3, 2, 1 },
      { 25, -31, -1, 7, 100, -16, -29, 1, -54, 21, 14, -4, -7, 2, 4, 0 },
      { -32, -39, -92, 51, -6, -16, 36, -8, 3, 22, 18, -15, 4, 1, -5, 2 },
      { 8, -9, 33, -8, -16, -102, 36, 23, -4, 38, -27, -5, 5, 16, -8, -6 },
      { -25, 5, 16, -3, -38, 14, 11, -3, -97, 7, 26, 1, 55, -10, -19, 3 },
      { 8, 9, 16, 1, 37, 36, 94, -38, -7, 3, -47, 11, -6, -13, -17, 10 },
      { 2, 34, -5, 1, -7, 24, -25, -3, 8, 99, -28, -29, 6, -43, 21, 11 },
      { -16, -27, -39, -109, 6, 10, 16, 24, 3, 19, 10, 24, -4, -7, -2, -3 },
      { -9, -10, -34, 4, -9, -5, -29, 5, -33, -26, -96, 33, 14, 4, 39,
        -14 },
      { -13, 1, 4, -9, -30, -17, -3, -64, -35, 11, 17, 19, -86, 6, 36, 14 },
      { 8, -7, -5, -15, 7, -30, -28, -87, 31, 4, 4, 33, 61, -5, -17, 22 },
      { -2, 13, -6, -4, -2, 28, -13, -14, -3, 37, -15, -3, -2, 107,
        -36, -24 },
      { 4, 9, 11, 31, 4, 9, 16, 19, 12, 33, 32, 94, 12, 0, 34, -45 },
      { 2, -2, 8, -16, 8, 5, 28, -17, 6, -7, 18, -45, 40, 36, 97, -8 },
      { 0, -2, 0, -10, -1, -7, -3, -35, -1, -7, -2, -32, -6, -33,
        -16, -112 },
    },
    {
      { 119, -30, -22, -3, -23, -2, 3, 2, -16, 3, 6, 0, -3, 2, 1, 0 },
      { -27, -101, 31, 17, -47, 2, 22, 3, 19, 30, -7, -9, 5, 3, -5, -1 },
      { 0, 58, 22, -15, -102, 2, 38, 2, 10, -13, -5, 4, 14, -1, -9, 0 },
      { 23, 4, 66, -11, 22, 89, -2, -26, 13, -8, -38, -1, -9, -20, -2, 8 },
      { -19, -5, -89, 2, -26, 76, -11, -17, 20, 13, 18, -4, 1, -15, 3, 5 },
      { -10, -1, -1, 6, 23, 25, 87, -7, -74, 4, 39, -5, 0, -1, -20, -1 },
      { -17, -28, 12, -8, -32, 14, -53, -6, -68, -67, 17, 29, 2, 6, 25, 4 },
      { 1, -24, -23, 1, 17, -7, 52, 9, 50, -92, -15, 27, -15, -10, -6, 3 },
      { -6, -17, -2, -111, 7, -17, 8, -42, 9, 18, 16, 25, -4, 2, -1, 11 },
      { 9, 5, 35, 0, 6, 21, -9, 34, 44, -3, 102, 11, -7, 13, 11, -20 },
      { 4, -5, -5, -10, 15, 19, -2, 6, 6, -12, -13, 6, 95, 69, -29, -24 },
      { -6, -4, -9, -39, 1, 22, 0, 102, -19, 19, -32, 30, -16, -14,
        -8, -23 },
      { 4, -4, 7, 8, 4, -13, -18, 5, 0, 0, 21, 22, 58, -88, -54, 28 },
      { -4, -7, 0, -24, -7, 0, -25, 3, -3, -30, 8, -76, -34, 4,
        -80, -26 },
      { 0, 6, 0, 30, -6, 1, -13, -23, 1, 20, -2, 80, -44, 37, -68, 1 },
      { 0, 0, -1, 5, -1, -7, 1, -34, -2, 3, -6, 19, 5, -38, 11, -115 },
    }
  },
  { //1
    {
      { -111, 39, 4, 3, 44, 11, -12, -1, 7, -16, -5, 2, 3, -1, 4, 2 },
      { -47, -27, 15, -1, -92, 43, 20, -2, 20, 39, -16, -5, 10, -5,
        -13, 2 },
      { -35, -23, 4, 4, -17, -72, 32, 6, -59, 18, 50, -6, 0, 40, 0, -13 },
      { 13, 93, -27, -4, -48, 13, -34, 4, -52, 11, 1, 10, 3, 16, -3, 1 },
      { -11, -27, 1, 2, -47, -4, -36, 10, -2, -85, 14, 29, -20, -2, 57, 4 },
      { 0, -35, 32, -2, 26, 60, -3, -17, -82, 1, -30, 0, -37, 21, 3, 12 },
```

```
      { -17, -46, -92, 14, 7, -10, -39, 29, -17, 27, -28, 17, 1, -15,
        -13, 17 },
      { 4, -10, -23, 4, 16, 58, -17, 26, 30, 21, 67, 2, -13, 59, 13, -40 },
      { 5, -20, 32, -5, 8, -3, -46, -7, -4, 2, -15, 24, 100, 44, 0, 5 },
      { -4, -1, 38, -18, -7, -42, -63, -6, 33, 34, -23, 15, -65, 33,
        -20, 2 },
      { -2, -10, 35, -19, 5, 8, -44, 14, -25, 25, 58, 17, 7, -84,
        -16, -18 },
      { 5, 13, 18, 34, 11, -4, 18, 18, 5, 58, -3, 42, -2, -10, 85, 38 },
      { -5, -7, -34, -83, 2, -1, -4, -73, 4, 20, 15, -12, 4, -3, 44, 12 },
      { 0, 4, -2, -60, 5, 9, 42, 34, 5, -14, 9, 80, -5, 13, -38, 37 },
      { -1, 2, 7, -57, 3, -7, 9, 68, -9, 6, -49, -20, 6, -4, 36, -64 },
      { -1, 0, -12, 23, 1, -4, 17, -53, -3, 4, -21, 72, -4, -8, -3, -83 },
    },
    {
      { 88, -55, 6, -3, -66, 27, 9, -2, 11, 11, -13, 1, -2, -7, 1, 2 },
      { -58, -20, 27, -2, -27, 75, -29, 0, 47, -42, -11, 11, -9, -3,
        19, -4 },
      { -51, 23, -22, 5, -63, 3, 37, -5, 1, 64, -35, -4, 29, -31, -11, 13 },
      { -27, -76, 49, -2, 40, 14, 9, -17, -56, 36, -25, 6, 14, 3, -6, 8 },
      { 19, -4, -36, 22, 52, 7, 36, -23, 28, -17, -64, 15, -5, -44, 48, 9 },
      { 29, 50, 13, -10, 1, 34, -59, 1, -51, 4, -16, 30, 52, -33, 24, -5 },
      { -12, -21, -74, 43, -13, 39, 18, -5, -58, -35, 27, -5, 19, 26,
        6, -5 },
      { 19, 38, -10, -5, 28, 66, 0, -5, -4, 19, -30, -26, -40, 28,
        -60, 37 },
      { -6, 27, 18, -5, -37, -18, 12, -25, -44, -10, -38, 37, -66,
        45, 40, -7 },
      { -13, -28, -45, -39, 0, -5, -39, 69, -23, 16, -12,
        -18, -50, -31, 24, 13 },
      { -1, 8, 24, -51, -15, -9, 44, 10, -28, -70, -12, -39, 24,
        -18, -4, 51 },
      { -8, -22, -17, 33, -18, -45, -57, -27, 0, -31,
        -30, 29, -2, -13, -53, 49 },
      { 1, 12, 32, 51, -8, 8, -2, -31, -22, 4, 46, -39, -49, -67, 14, 17 },
      { 4, 5, 24, 60, -5, -14, -23, 38, 9, 8, -34, -59, 24, 47, 42, 28 },
      { -1, -5, -20, -34, 4, 4, -15, -46, 18, 31, 42, 10, 10, 27, 49, 78 },
      { -3, -7, -22, -34, -5, -11, -36, -69, -1, -3, -25, -73, 5,
        4, 4, -49 },
    }
  },
  { //2
    {
      { -112, 47, -2, 2, -34, 13, 2, 0, 15, -7, 1, 0, 8, -3, -1, 0 },
      { 29, -7, 1, -1, -108, 40, 2, 0, -45, 13, 4, -1, 8, -5, 1, 0 },
      { -36, -87, 69, -10, -17, -33, 26, -2, 7, 14, -11, 2, 6, 8, -7, 0 },
      { 28, -5, 2, -2, -29, 13, -2, 0, 103, -36, -4, 1, 48, -16, -4, 1 },
      { -12, -24, 15, -3, 26, 80, -61, 9, 15, 54, -36, 2, 0, -4, 6, -2 },
      { 18, 53, 69, -74, 14, 24, 28, -30, -6, -7, -11, 12, -5, -7, -6, 8 },
      { 5, -1, 2, 0, -26, 6, 0, 1, 45, -9, -1, 0,-113, 28, 8, -1 },
      { -13, -32, 18, -2, 15, 34, -27, 7, -25, -80, 47, -1, -16,
        -50, 28, 2 },
      { -4, -13, -10, 19, 18, 46, 60, -48, 16, 33, 60, -48, 1, 0, 5, -2 },
      { 15, 33, 63, 89, 8, 15, 25, 40, -4, -8, -15, -8, -2, -6, -9, -7 },
      { -8, -24, -27, 15, 12, 41, 26, -29, -17, -50, -39, 27, 0, 35,
        -67, 26 },
      { -2, -6, -24, 13, -1, -8, 37, -22, 3, 18, -51, 22, -23, -95, 17,
        17 },
      { -3, -7, -16, -21, 10, 24, 46, 75, 8, 20, 38, 72, 1, 2, 1, 7 },
      { 2, 6, 10, -3, -5, -16, -31, 12, 7, 24, 41, -16, -16, -41, -89, 49 },
      { 4, 8, 21, 40, -4, -11, -28, -57, 5, 14, 31, 70, 7, 18, 32, 52 },
      { 0, 1, 4, 11, -2, -4, -13, -34, 3, 7, 20, 47, -6, -19, -42, -101 },
    },
    {
      { -99, 39, -1, 2, 65, -20, -5, 0, -15, -2, 5, -1, 0, 3, -1, 0 },
      { 58, 42, -33, 3, 33, -63, 23, -1, -55, 32, 3, -5, 21, -2, -8, 3 },
      { -15, 71, -44, 5, -58, -29, 25, 3, 62, -7, -4, -4, -19, 4, 0, 1 },
      { 46, 5, 4, -6, 71, -12, -15, 5, 52, -38, 13, -2, -63, 23, 3, -3 },
      { -14, -54, -29, 29, 25, -9, 61, -29, 27, 44, -48, 5, -27, -21,
        12, 7 },
      { -3, 3, 69, -42, -11, -50, -26, 26, 24, 63, -19, -5, -18, -22,
        12, 0 },
      { 17, 16, -2, 1, 38, 18, -12, 0, 62, 1, -14, 5, 89, -42, 8, -2 },
      { 15, 54, -8, 6, 6, 60, -26, -8, -30, 17, -38, 22, -43, -45, 42, -7 },
      { -6, -17, -55, -28, 9, 30, -8, 58, 4, 34, 41, -52, -16, -36,
        -20, 16 },
```

-continued

```
{ -2, -1, -9, -79, 7, 11, 48, 44, -13, -34, -55, 6, 12, 23, 20, -11 },
{ 7, 29, 14, -6, 12, 53, 10, -11, 14, 59, -15, -3, 5, 71, -54, 13 },
{ -5, -24, -53, 15, -3, -15, -61, 26, 6, 30, -16, 23, 13, 56,
  44, -35 },
{ 4, 8, 21, 52, -1, -1, -5, 29, -7, -17, -44, -84, 8, 20, 31, 39 },
{ -2, -11, -25, -4, -4, -21, -53, 2, -5, -26, -64, 19,
  -8, -19, -73, 39 },
{ -3, -5, -23, -57, -2, -4, -24, -75, 1, 3, 9, -25, 6, 15, 41, 61 },
{ 1, 1, 7, 18, 1, 2, 16, 47, 2, 5, 24, 67, 3, 9, 25, 88 },
}
},
{  //3
{
```

-continued

```
{ 12, 17, 17, 0, 32, 27, 21, 2, 67, 11, -6, -10, 89, -22, -12, 16 },
{ 2, -9, 8, 45, 7, -8, 27, 35, -9, -31, -17, -87, -23, -22, -19, 44 },
{ -1, -9, 28, -24, -1, -10, 49, -30, -8, -7, 40, 1, 4, 33, 65, 67 },
{ 5, -12, -24, -17, 13, -34, -32, -16, 14, -67, -7, 9, 7, -74,
  49, 1 },
{ 2, -6, 11, 45, 3, -10, 33, 55, 8, -5, 59, 4, 7, -4, 44, -66 },
{ -1, 1, -14, 36, -1, 2, -20, 69, 0, 0, -15, 72, 3, 4, 5, 65 },
}
}
};
```

For an 8×8 LFNST, video encoder 200 or video decoder 300 may use the following two patterns/scans depending on intra mode:

```
const int g_lfnstRGScan8x8   [48] =
{ // 0 1 2 3 4 5 6 7 8 9 10 11 12 13 14 15 16 17 18 19 20 21 22 23
24 25 26 27 28 29 30 31 32 33 34 35 36 37 38 39 40 41 42 43 44 45 46
47
    0, 1, 2, 3, 4, 5, 6, 7, 8, 9, 10, 11, 12, 13, 14, 15, 16, 17, 18, 19, 20, 21, 22,
23, 24, 25, 26, 27, 28, 29, 30, 31, 32, 33, 34, 35, 40, 41, 42, 43, 48, 49, 50, 51, 56, 57,
58, 59
};
const int g_lfnstRGTranScan8x8[48] =
{ // 0 1 2 3 4 5 6 7 8 9 10 11 12 13 14 15 16 17 18 19 20 21 22 23
24 25 26 27 28 29 30 31 32 33 34 35 36 37 38 39 40 41 42 43 44 45 46
47
    0, 8, 16, 24, 32, 40, 48, 56, 1, 9, 17, 25, 33, 41, 49, 57, 2, 10, 18, 26, 34, 42,
50, 58, 3, 11, 19, 27, 35, 43, 51, 59, 4, 12, 20, 28, 5, 13, 21, 29, 6, 14, 22, 30, 7, 15,
23, 31
};
``` where the above two patterns/scans indicate the reordering of intermediate coefficients. Specifically, lfnstRGScan8x8 reorganizes 48 intermediate coefficients in the L-shaped pattern (e.g., the 48th coefficient is mapped to location 59 in FIG. 8). The scan lfnstRGTranScan4×4 reorders the L-shaped pattern by transposing coefficients (e.g., the 48th coefficient is mapped to location 31 in FIG. 8). In some examples, lfnstRGScan4×4 may be used for intra modes indexed between 0 and 34, inclusive and lfnstRGTranScan4×4 may be used for intra modes indexed above 34.

For 8×8 LFNST, the following eight 16×48 matrices of are used in VVC Draft 6.

-continued

```
{ -114, 37, 3, 2, -22, -23, 14, 0, 21, -17, -5, 2, 5, 2, -4, -1 },
{ -19, -41, 19, -2, 85, -60, -11, 7, 17, 31, -34, 2, -11, 19, 2, -8 },
{ 36, -25, 18, -2, -42, -53, 35, 5, 46, -60, -25, 19, 8, 21,
  -33, -1 },
{ -27, -80, 44, -3, -58, 1, -29, 19, -41, 18, -12, -7, 12, -17,
  7, -6 },
{ -11, -21, 37, -10, 44, -4, 47, -12, -37, -41,
  58, 18, 10, -46, -16, 31 },
{ 15, 47, 10, -6, -16, -44, 42, 10, -80, 25, -40, 21, -23, -2,
  3, -14 },
{ 13, 25, 79, -39, -13, 10, 31, -4, 49, 45, 12, -8, 3, -1, 43, 7 },
{ 16, 11, -26, 13, -13, -74, -20, -1, 5, -6, 29, -47, 26, -49,
  54, 2 },
{ -8, -34, -26, 7, -26, -19, 29, -37, 1, 22, 46, -9, -81, 37,
  14, 20 },
{ -6, -30, -42, -12, -3, 5, 57, -52, -2, 37, -12, 6, 74, 10, 6, -15 },
{ 5, 9, -6, 42, -15, -18, -9, 26, 15, 58, 14, 43, 23, -10, -37, 75 },
{ -5, -23, -23, 36, 3, 22, 36, 40, 27, -4, -16, 56, -25, -46,
  56, -24 },
{ 1, 3, 23, 73, 8, 5, 34, 46, -12, 2, 35, -38, 26, 52, 2, -31 },
{ -3, -2, -21, -52, 1, -10, -17, 44, -19, -20, 30, 45, 27, 61,
  49, 21 },
{ -2, -7, -33, -56, -4, -6, 21, 63, 15, 31, 32, -22, -10, -26,
  -52, -38 },
{ -5, -12, -18, -12, 8, 22, 38, 36, -5, -15, -51, -63, -5, 0,
  15, 73 },
},
{
{ -102, 22, 7, 2, 66, -25, -6, -1, -15, 14, 1, -1, 2, -2, 1, 0 },
{ 12, 93, -27, -6, -27, -64, 36, 6, 13, 5, -23, 0, -2, 6, 5, -3 },
{ -59, -24, 17, 1, -62, -2, -3, 2, 83, -12, -17, -2, -24, 14, 7, -2 },
{ -33, 23, -36, 11, -21, 50, 35, -16, -23, -78, 16, 19, 22, 15,
  -30, -5 },
{ 0, -38, -81, 30, 27, 5, 51, -32, 24, 36, -16, 12, -24, -8, 9, 1 },
{ 28, 38, 8, -9, 62, 32, -13, 2, 51, -32, 15, 5, -66, 28, 0, -1 },
{ 11, -35, 21, -17, 30, -18, 31, 18, -11, -36, -80, 12, 16, 49, 1
  3, -32 },
{ -13, 23, 22, -36, -12, 64, 39, 25, -19, 23, -36, 9, -30, -58,
  33, -7 },
{ -9, -20, -55, -83, 3, -2, 1, 62, 8, 2, 27, -28, 7, 15, -11, 5 },
{ -6, 24, -38, 23, -8, 40, -49, 0, -7, 9, -25, -44, 23, 39, 70, -3 },
```

```
const int8_t g_lfnst8x8[ 4 ][ 2 ][ 16 ][ 48 ] = {
{ //0
{
{ -117, 28, 18, 2, 4, 1, 2, 1, 32, -18, -2, 0, -1, 0, 0, 0, 14, -1,
-3, 0, -1, 0, 0, 0, 2, 0, 0, 0, 0, 0, 0, 0, 3, 0, -1, 0, 1, 0,
0, 0, 1, 0, 0, 0, 1, 0, 0, 0 },
{ -29, -91, 47, 1, 9, 0, 3, 0, -54, 26, -8, 3, 0, 1, 0, 0, 33, 5, -9,
-1, -2, 0, -1, 0, -3, 3, 0, 0, 0, 0, 0, 0, 7, 2, -2, 0, -1, 1,
0, 0, 2, 1, -1, 0, 0, 0, 0, 0 },
{ -10, 62, -11, -8, -2, -2, -1, -1, -95, 3, 32, 0, 4, 0, 2, 0, 32, -30,
-4, 4, -1, 1, 0, 0, 6, 2, -5, 0, 0, 0, 0, 0, 6, -3, 0, 0, 2, 0,
-1, 0, 2, -1, 0, 0, 1, 0, 0, 0 },
{ -15, 15, -10, -2, 1, 0, 1, 0, 10, 112, -20, -17, -4, -4, -1, -2, -20,
-26, 31, 1, 0, 0, 0, 2, -16, -1, 6, 0, 1, 0, 0, 1, -4, 0, 0, 0,
-3, 0, 1, 0, -1, 0, 0, 0, -2, 0, 0 },
{ 32, 39, 92, -44, 4, -10, 1, -4, 26, 12, -15, 13, -5, 2, -2, 0, 29, -16,
-22, 8, 0, 1, 0, 1, -20, 6, 4, -3, 1, 0, 0, 0, 1, -4, -3, 2, -4,
1, 0, 0, 1, -1, -2, 1, -2, 0, 0, 0 },
{ -10, 1, 50, -15, 2, -3, 1, -1, -28, -15, 14, 6, 1, 1, 1, 0, -99, -4,
9, 5, 5, 2, 2, 1, 44, -10, -11, 1, -2, 0, -1, 0, -5, 4, -3, 0, 8, -1,
-2, 0, -2, 1, -1, 0, 4, 0, -1, 0 },
{ 1, -33, -11, -14, 7, -2, 2, 0, 29, -12, 37, -7, -4, 0, -1, 0, 6, -99,
3, 26, -1, 5, 0, 2, 2, 14, 30, -27, -2, 1, -1, 0, -1, -6, 6, 6, -3, 1,
3, -3, 0, -1, 1, 1, 0, 0, 1, -1, 0 },
```

{ 0, 6, −6, 21, −4, 2, 0, 0, −20, −24, −104, 30, 5, 5, 1, 2, −7, −46,
10, −14, 7, 0, 1, 0, 9, 21, 7, −6, −2, −1, 0, −1, 2, 2, 5, −2, 0,
3, 4, −1, 0, 0, 1, 0, 0, 1, 2, −1 },
{ −13, −13, −37, −101, 29, −11, 8, −3, −12, −15, −20, 2, −11, 5, −2, 1,
−12, 10, 26, 12, −6, 0, −1, 0, −32, −2, 11, 3, 3, −1, 1, 0, 11, −5, −1, 6,
−4, 2, 1, 0, 3, −1, 1, 2, −1, 0, 0, 0 },
{ 6, 1, −14, −36, 9, −3, 2, 0, 10, 9, −18, −1, −3, 1, 0, 0, 38, 26, −13,
−1, −5, −1, −1, 0, 102, 3, −14, −1, −5, −1, −2, 0, −29, 10, 10, 0, 10,
−4, −1, 1, −7, 1, 2, 1, 2, −1, 0, 0 },
{ −12, −2, −26, −12, −9, 2, −1, 1, −3, 30, 4, 34, −4, 0, −1, 0, −30, 3,
−92, 14, 19, 0, 3, 0, −11, 34, 21, −33, 1, −2, 0, −1, −9, −4, 18, 3, 2,
0, 0, −2, −1, −1, 3, 0, 0, 0, 0, −1 },
{ 0, −3, 0, −4, −15, 6, −3, 1, −7, −15, −28, −86, 19, −5, 4, −1, −5, −17,
−41, 42, −6, 2, −1, 1, −1, −40, 37, 13, −4, 2, −1, 1, −10, 13, −1, −4, 4,
−4, 3, 4, −2, 2, −1, −1, 1, −1, 1, 2 },
{ −1, 9, 13, 5, 14, −2, 2, −1, −8, 3, −4, −62, 4, 1, 1, 0, −12, 23,
16, −11, −17, 0, −1, 0, −11, 97, −3, −3, 0, −6, 0, −2, −21, −5, 23, 0, 2,
−2, −1, 6, −3, −3, 1, 0, 0, 0, 0, 2 },
{ 6, 2, −3, 2, 10, −1, 2, 0, 8, 3, −1, −20, 0, 1, 0, 0, −4, 4, −16,
0, −2, 0, 1, 0, 34, 23, 6, −7, −4, −2, −1, 0, 108, −5, −30, 6, −27, 10,
7, −2, 11, −3, −1, 1, −4, 1, 0, 1 },
{ 6, 9, −2, 35, 110, −22, 11, −4, −2, 0, −3, 1, −18, 12, −3, 2, −5, −4,
−22, 8, −25, 3, 0, 0, −3, −21, 2, −3, 9, −2, 1, 0, −7, 1, 3, −5, 3,
0, −1, 0, 0, 1, 0, −1, 1, 0, 0, 0 },
{ −1, 7, −2, 9, −11, 5, −1, 1, −7, 2, −22, 4, −13, 0, −1, 0, 0, 28,
0, 76, 4, −6, 0, −2, −13, 5, −76, −4, 33, −1, 3, 0, 9, 18, −3, −35, −4,
−1, 6, 1, 1, 2, 0, −3, −1, 0, 2, 0 },
},
{
{ −108, 48, 9, 1, 1, 1, 0, 0, 44, −6, −9, −1, −1, 0, −1, 0, 9, −9, −1,
1, 0, 0, 0, 0, 3, −1, 1, 0, 0, 0, 0, 0, 1, −1, 0, 0, 1, 0,
0, 0, 0, −1, 0, 0, 0, 0, 0, 0 },
{ 55, 66, −37, −5, −6, −1, −2, 0, 67, −30, −20, 4, −2, 0, −1, 0, −31,
−19, 14, 4, 1, 1, 0, −6, 3, 5, −2, 0, 0, 0, 0, −7, −1, 1, 0, −1, 1,
1, 0, −2, −1, 1, 0, 0, 0, 0, 0 },
{ 2, 86, −21, −13, −4, −2, −1, −1, −88, 5, 6, 4, 5, 1, 1, 0, 14, −5,
0, 3, 0, 0, 0, 0, 10, −5, −2, 0, −1, 0, 0, 0, 6, −5, 0, 1, 2, −1,
0, 0, 1, −1, 0, 0, 1, 0, 0, 0 },
{ −24, −21, −38, 19, 0, 4, −1, 2, −23, −89, 31, 20, 2, 3, 1, 1, −30, 26,
36, −8, −2, −2, 0, −1, 14, 18, −7, −9, −1, −1, 0, 0, 1, 3, −2, −1, 3,
2, −2, −1, 0, 1, 0, 0, 1, 1, −1, 0 },
{ 9, 20, 98, −26, −3, −5, 0, −2, −9, −26, 15, −16, 2, 0, 1, 0, −61, −3,
−2, 3, 7, 1, 1, 0, 12, 16, −6, −1, 0, −1, 0, 0, 2, 0, −8, 1, 3, 1,
−1, 1, 0, −1, −2, 0, 1, 0, −1, 0 },
{ −21, −7, −37, 10, 2, 2, −1, 1, −10, 69, −5, −7, −2, −2, 0, −1, −93, 2,
19, 0, 3, 0, 2, 0, 17, 4, 0, 0, −1, 0, 0, 0, 5, −4, −2, 0, 4, −2,
0, 1, 0, 0, 0, 0, 2, −1, 0, 0 },
{ −10, −25, 4, −17, 8, −2, 2, −1, −27, −17, −71, 25, 8, 2, 1, 1, −4, −66,
28, 36, −5, 3, 0, 1, −10, 20, 33, −13, −8, 0, 0, −1, 3, 6, −3, −7, −1,
3, 3, −1, 1, 0, −1, 0, 0, 1, 1, −1 },
{ 2, 5, 10, 64, −9, 4, −3, 1, −4, 8, 62, 3, −17, 1, −2, 0, −3, −75,
5, −14, 1, 4, 0, 1, −36, 3, 18, −4, 4, 0, 1, 0, 1, 14, −2, −8, −2,
1, −3, 0, 2, 2, −1, −2, 0, 1, −1, 0 },
{ −11, −15, −28, −97, 6, −1, 4, −1, 7, 3, 57, −15, 10, −2, 0, −1, −1,
−27, 13, 6, 1, −1, 0, 0, −34, −6, 0, 3, 4, 1, 2, 0, −2, 8, 1, 5, −2, 0,
−3, 1, 1, 1, 0, 2, −1, 0, −1, 0 },
{ 9, 13, 24, −6, 7, −2, 1, −1, 16, 39, 20, 47, −2, −2, −2, 0, 28, 23,
76, −5, −25, −3, −3, −1, 6, 36, −7, −39, −4, −1, 0, −1, 2, −4, −18, −3,
−1, −1, −2, −2, 1, −2, 2, 0, 0, 0, −1, −1 },
{ −7, 11, 12, 7, 2, −1, 0, −1, −14, −1, −24, 11, 2, 0, 0, 0, −20, 48,
11, −13, −5, −2, 0, −1, −105, −19, 17, 0, 6, 2, 3, 0, −14, 8, 8, 2, 1,
2, −1, −2, 3, 0, −1, 0, 0, 0, 0, 0 },
{ 0, 0, 7, −6, 23, −3, 3, −1, 5, 1, 18, 96, 13, −9, −1, −1, −21, −7, −42,
14, −24, −3, 0, 0, 11, −47, −7, 3, −5, 9, 1, 2, 0, −1, 19, −1, 1,
0, −1, −6, −1, 1, 2, 0, 1, 0, 0, −2 },
{ −2, −6, −1, −10, 0, 1, 1, 0, −7, −2, −28, 20, −15, 4, −3, 1, −2, −32,
−2, −66, 3, 7, 1, 2, −11, 13, −70, 5, 43, −2, 3, 0, 8, −14, −3, 43, −1,
2, 7, −1, 1, −2, 1, 3, −1, 1, 1, 0 },
{ −1, 6, −16, 0, 24, −3, 1, −1, 2, 6, 6, 16, 18, −7, 1, −1, −3, 11, −63,
9, 4, −5, 2, −1, −22, 94, −4, −6, −4, −4, 1, −2, 10, 23, −19, −5, 0,
−6, −4, 6, 3, −2, 1, 1, 0, −1, 0, 0 },
{ −5, −6, −3, −19, −104, 18, −4, 3, 0, 6, 0, 35, −41, 20, −2, 2, −2, 10,
−18, 16, 21, 3, −2, 0, −2, 11, 6, −10, 6, −3, −1, 0, −1, 5, −1, −6, −1,
−1, −1, −1, −1, 0, 0, 0, 0, 0, 0, −1 },
{ −1, −2, 0, 23, −9, 0, −2, 0, 1, 1, 8, −1, 29, 1, 1, 0, 3, −6, 13,
76, 30, −11, −1, −2, −26, −8, −69, 7, −9, −7, 3, −1, −10, −34, −25, 13,
−1, 0, 11, 5, 1, −1, 1, −2, 0, 2, 0 },
}
},
{ //1
{
{ 110, −49, −3, −4, −1, −1, 0, −1, −38, −1, 10, 0, 2, 0, 1, 0, −9, 13,
1, −2, 0, 0, 0, 0, −4, 2, −3, 0, 0, 0, 0, 0, −2, 2, 0, 0, 1, −1, 1,
0, 0, −1, 1, 0, 0, −1, 0, 0, 0 },
{ −43, −19, 17, −1, 3, 0, 1, 0, −98, 46, 14, −1, 2, 0, 1, 0, 26, 26,
−15, −3, −2, −1, −1, 0, 11, −7, −9, 2, 0, 0, 0, 0, 9, −3, −1, 2, 3, −3,
0, 0, 4, −1, 0, 0, 2, −1, 0, 0 },
{ −19, 17, −7, 3, −2, 1, −1, 0, −32, −59, 29, 3, 4, 0, 2, 0, −72, 43,
34, −9, 3, −2, 1, −1, 13, 36, −18, −10, 0, −2, 0, −1, 3, 0, −12, 3, 6,
1, −3, 2, 1, −1, −2, 0, 3, 1, −1, 1 },
{ −35, −103, 39, 1, 7, 0, 2, 0, 38, −13, 25, −6, 1, −1, 0, 0, −1, 7,
6, −7, 1, −1, 0, 0, −13, 14, 2, −4, 2, −1, 0, 0, −2, 11, −6, −2, −2,
4, −3, 0, 0, 3, −2, 0, −1, 1, −1, 0 },
{ 9, 5, −6, −1, −1, 0, −1, 0, 42, 4, 21, −11, 1, −3, 1, −1, 21, 70, −32,
−21, 0, −4, −1, −1, 34, −26, −57, 11, 4, 2, 0, 1, −4, −32, 5, 24, 1,
−6, 12, 4, −3, −2, 4, −2, 0, −1, 0, 0 },
{ −5, −5, −28, 9, −3, 2, −1, 1, −20, −78, 22, 16, 1, 3, 0, 1, 80, −6,
25, −5, −4, −1, −1, 0, 6, −24, 7, −9, 0, 0, 0, 0, −7, 3, 13, −4, −3,
5, 1, −5, −2, 3, 1, −2, −1, 2, −1, −2 },
{ 14, 17, 27, −12, 1, −3, 1, −1, 8, 19, −13, 4, −2, 1, −1, 0, 48, −1,
48, −15, −4, −2, −1, −1, 1, 60, −28, −42, 5, −6, 1, −2, 11, −11, −51, 11,
−2, −10, −2, 13, 2, −6, −4, 4, −2, −3, 2, 2 },
{ 7, 35, 17, −4, −1, 0, 0, 0, 3, 8, 54, −17, 1, −2, 1, −1, 10, 14, −11,
−34, 4, −4, 1, −1, −80, −7, −6, 2, 15, 0, 3, 0, −16, 46, 1, 3, 2,
7, −24, 0, 2, −2, −5, 8, 1, −1, −2, 2 },
{ −13, −27, −101, 24, −8, 6, −3, 2, 11, 43, 6, 28, −6, 3, −1, 1, −3, 14,
21, −12, −7, −2, −1, −1, −23, 10, −4, −12, 3, 0, 1, 0, 2, 9, −10, 0, 1,
−5, −4, 4, 2, −2, 2, 2, 0, −2, 1, 0 },
{ −11, −13, −3, −10, 3, −1, 1, 0, −19, −19, −37, 8, 4, 2, 0, 1, −12, −30,
3, −9, 5, 0, 1, 0, −56, −9, −47, 8, 21, 1, 4, 1, −11, −30, 10, 59, −2,
8, 41, 8, 2, 5, 6, −7, −1, 3, 5, −2 },
{ −4, −10, −24, −11, 3, −2, 0, −1, −6, −37, −45, −17, 8, −2, 2, −1, 17,
14, −58, 14, 15, 0, 2, 0, −10, 34, −7, 28, 4, −1, 1, 0, 23, 34, −31, 4,
10, −22, −30, 22, 4, −15, 9, 20, 2, −5, 9, 4 },
{ −2, 1, 13, −17, 3, −5, 1, −2, 3, 0, −55, 22, 6, 1, 1, 0, 8, 74,
21, 40, −14, 0, −2, 0, −36, −8, 11, −13, −23, 1, −3, 0, −36, 6, 16, −14,
2, 19, −4, −12, −1, 0, −7, −3, 0, 2, −2, −1 },
{ 3, 1, 5, −15, 1, −2, 1, −1, 7, 4, −7, 29, −1, 2, −1, 1, 8, 3, 12,
−14, −9, −1, −1, 0, 4, 29, −15, 31, 10, 4, 1, 1, 61, 22, 55, 14, 13,
3, −9, −65, 1, −11, −21, −7, 0, 0, −1, 3 },
{ −4, −8, −1, −50, 6, −4, 2, −2, −1, 5, −22, 20, 6, 1, 0, 0, −16, −15,
18, −29, −11, 2, −2, 1, 40, −45, −19, −22, 31, 2, 4, 1, −25, 41, 0, 12,
9, 7, −42, 12, −3, −14, 2, 28, 5, 1, 6, 2 },
{ 5, −1, 26, 102, −13, 12, −4, 4, −4, −2, −40, −7, −23, 3, −5, 1, −1, 5,
8, −23, 7, 2, 1, 1, 10, −11, −13, −3, 12, −3, 2, 0, −9, 23, 4, 9, 14,
9, −14, −4, 0, −12, −7, 6, 3, 0, 6, 3 },
{ −5, −6, −27, −22, −12, 0, −3, 0, −5, 8, −20, −83, 0, 0, 0, 0, 9, 7,
24, −20, 41, 3, 6, 1, 15, 20, 12, 11, 17, −9, 1, −2, −26, −1, 18, −1, −12,
32, 3, −18, −5, 10, −25, −5, −2, 1, −8, 10 },
},
{
{ 80, −49, 6, −4, 1, −1, 1, −1, −72, 36, 4, 0, 1, 0, 0, 0, 26, 0, −12,
2, −2, 1, −1, 0, −7, −9, 6, 1, 0, 0, 0, 0, 3, 5, −1, −2, −2, −2,
−1, 1, 1, 1, 0, 0, −1, −1, 0, 0 },
{ −72, −6, 17, 3, 0, 1, 0, −23, 58, −21, 2, −3, 1, −1, 0, 55, −46,
−1, 6, −2, 1, −1, 0, −22, 7, 17, −7, 2, −1, 1, 0, 9, 5, −12, 1, −3, −4,
4, 2, 4, 1, −2, −1, −1, −1, 1, 0 },
{ −50, 19, −15, 4, −1, 1, −1, −1, −58, −2, 30, −3, 4, −1, 2, 0, 6, 57, −34,
0, −2, 0, −1, 0, 34, −48, −2, 14, −4, 3, −1, 1, −10, 7, 21, −10, 6,
1, −11, 0, −1, −1, 4, 2, 3, 0, −2, −1 },
{ −33, −43, 28, −7, 4, −2, 2, −1, −38, 11, −8, 4, 1, 1, 0, 0, −55, 24,
26, −5, 2, −1, 1, 0, 15, 46, −40, −1, −1, 0, −1, 0, 17, −38, 1, 17, −3,
11, 15, −11, 3, −1, −10, 1, 0, 1, 3, 2 },
{ 10, 66, −21, −3, −3, 0, −1, 0, −53, −41, −2, 16, −1, 4, −1, 1, 36, −5,
41, −20, 3, −3, 1, −1, −30, 26, −32, −3, 7, −2, 2, −1, 15, −8, 1, 17, −1,
−2, 4, −8, 2, 0, −1, 3, 0, 0, 0, −1 },
{ 18, 14, 13, −9, 2, −2, 1, −1, 34, 32, −31, 12, −5, 2, −2, 1, 40, 4,
−4, −9, −3, −2, −1, −1, 27, −31, −43, 19, −2, 3, −1, 1, 7, −49, 52, 10,
−11, 22, 7, −26, −1, −6, −9, 6, −2, 2, 4, −2 },
{ 21, 66, −1, 9, −4, 2, −1, 1, −21, 41, −30, −10, 0, −2, 0, −1, −35, −17,
−3, 26, −6, 5, −2, 2, 56, 3, 18, −25, −1, −2, −1, −1, −15, −13, −27, 9, 9,
−6, 20, 5, −3, 2, −6, −9, 3, −3, 1, 5 },
{ 1, −6, −24, 17, −5, 3, −2, 1, 24, 10, 39, −21, 5, −4, 2, −1, 33, 32,
−30, 4, −3, −1, −1, 0, −4, 13, −16, −10, 0, −1, 0, 0, 24, −26, −37, 33,
5, −32, 55, −5, −7, 22, −14, −22, 1, −9, −3, 13 },
{ 9, 33, −24, 1, 4, 0, 1, 0, 6, 50, 26, 1, −10, 0, −2, 0, −27, 1, −28,
−21, 16, −5, 3, −2, −23, 36, −2, 40, −17, 4, −3, 1, 43, −13, 4, −41,
−19, −2, −24, 17, 11, −4, 8, 4, −3, −3, −3, −3 },

{ −7, −9, −32, 14, −3, 3, −1, 1, −23, −28, 0, −5, −1, 0, 0, 0, −36, −59,
−24, 14, 4, 2, 1, 1, −23, −26, 23, 26, −3, 5, 0, 2, 10, −26, 38, 7, −12,
11, 42, −22, −5, 20, −14, −15, −1, −2, 1, 6 },
{ 6, 30, 69, −18, 5, −4, 3, −1, −3, −11, −34, −16, 9, −4, 2, −1, −16, 35,
−35, 30, −9, 3, −2, 1, −57, −13, 6, 4, −5, 5, −1, 1, 28, 10, 4, 7, 0,
−15, 7, −10, −1, 7, −2, 2, 1, −3, 0, 0 },
{ 1, −8, 24, −3, 7, −2, 2, −1, −6, −51, −6, −4, −5, 0, −1, 0, 38, −1,
0, 25, 6, 2, 1, 1, 47, 20, 35, 1, −27, 1, −5, 0, 37, −37, −9, −47, −28,
5, 0, 18, 8, 6, 0, −8, −4, −3, −3, 1 },
{ 4, 10, 4, 17, −9, 4, −2, 1, 5, 14, 32, −15, 9, −3, 2, −1, 7, 13,
19, 15, −8, 1, −1, 0, 3, 25, 30, −18, 1, −2, 0, −1, 11, 24, 22, −11, −3,
37, −13, −58, −5, 12, −63, 26, 9, −15, 11, 8 },
{ −3, −9, −23, 10, −10, 3, −3, 1, −5, −14, −16, −27, 13, −5, 2, −1, −1,
−13, −30, 11, −5, 2, −1, 0, −5, −8, −22, −16, 10, 0, 1, 0, −29, −27, 6,
−27, −10, −30, 9, −3, −10, −7, 77, 9, −13, 45, −8 },
{ 2, 11, 22, 2, 9, −2, 2, 0, −6, −7, 20, −32, −3, −4, 0, −1, 13, −5, −28,
6, 18, −4, 3, −1, −26, 27, −14, 6, −20, 0, −2, 0, −76, −26, −4, −7,
12, 51, 5, 24, 7, −17, −16, −12, −5, 4, 2, 13 },
{ 2, −3, 8, 14, −5, 3, −1, 1, −2, −11, 5, −18, 8, −3, 2, −1, 12, −23, −19,
22, 2, 0, 1, 0, 23, 41, −7, 35, −10, 4, −1, 1, 5, 7, 23, 5, 69, −38, −8, −32,
−15, −31, 24, 11, 2, 18, 11, −15 },
}
},
{ //2
{
{ −121, 33, 4, 4, 1, 2, 0, 1, −1, −1, 1, 0, 0, 0, 0, 0, 24, −5, −1, −1, 0,
0, 0, 0, 5, −1, 0, 0, 0, 0, 0, 0, 3, −1, 0, 0, 0, 2, −1, 0, 0, 2, −1, 0, 0, 1, 0,
0, 0 },
{ 0, −2, 0, 0, 0, 0, 0, 0, 121, −23, −7, −3, −2, −1, −1, 0, 17, 1, −2,
0, 0, 0, 0, 0, −27, 4, 2, 0, 0, 0, 0, 0, −12, 2, 1, 0, −5, 1, 0, 0, −1, 0, 0,
0, −2, 0, 0, 0 },
{ −20, 19, −5, 2, −1, 1, 0, 0, 16, 3, −2, 0, 0, 0, 0, 0, −120, 14,
8, 1, 3, 1, 1, 0, −18, −2, 3, 0, 1, 0, 0, 0, 17, −3, −1, 0, 6, −1,
−1, 0, 2, 0, 0, 0, 2, 0, 0, 0 },
{ 32, 108, −43, 10, −9, 3, −3, 1, 4, 19, −7, 1, −1, 0, 0, 0, 11, −30,
9, −2, 1, −1, 0, 0, 0, −8, 2, 0, 0, 0, 0, 0, −7, −1, 2, 0, −3, −1,
1, 0, −2, −2, 1, 0, 0, 0, 0, 0 },
{ −3, 0, −1, 0, 0, 0, 0, 0, −29, 11, −2, 1, 0, 0, 0, 0, 12, 7, −1,
0, 0, 0, 0, 0, −117, 12, 9, 1, 3, 0, 1, 0, −32, −3, 3, 0, 12, −2, −1,
0, 7, 0, 0, 0, 1, 0, 0, 0 },
{ −4, −12, −3, 1, −1, 0, 0, 0, 19, 105, −31, 7, −6, 1, −2, 0, 9, 46,
−6, 0, 0, 0, 0, 0, 8, −29, 9, −3, 1, 0, 0, 0, −3, −19, 3, 0, −4, −6,
1, 0, 0, 0, 0, 0, −1, 0, 0, 0 },
{ 7, 1, 2, 0, 0, 0, 0, 0, 4, 3, −2, 0, 0, 0, 0, 0, 22, −8, 1,
−1, 0, 0, 0, 0, −28, −9, 4, 0, 1, 0, 0, 0, 117, −10, −8, 0, 32, 1,
−4, 0, 3, 1, −1, 0, −3, 1, 0, 0 },
{ −8, −31, 14, −4, 3, −1, 1, 0, 9, 43, 0, 1, −1, 0, 0, 0, −13, −105,
17, −2, 2, 0, 0, 0, −8, −25, −3, 0, 0, 0, 0, 0, −7, 32, −5, 1, −1,
4, 0, 0, 2, −1, 0, 0, 1, 0, −1, 0 },
{ −15, −43, −100, 23, −12, 6, −4, 2, −6, −17, −48, 10, −5, 2, −1, 1, 1,
−5, 19, −6, 3, −1, 1, 0, 2, 7, 15, −3, 1, −1, 0, 0, 4, 10, 5, −1, 0,
3, 1, 0, −2, 1, 2, 0, −1, 1, 1, 0 },
{ −3, 1, 2, 0, 0, 0, 0, 0, −6, 3, 1, 0, 0, 0, 0, 0, 3, −2,
0, 0, 0, 0, 0, 0, −20, 8, −2, 0, 0, 0, 0, 0, 30, 13, −3, 0, −116, 6,
10, 0, −35, −5, 4, 0, −3, −1, 0, 0 },
{ −1, −6, −3, 2, −1, 0, 0, 0, −6, −35, 9, 0, 2, 0, 0, 0, 1, −6, 11,
−2, 2, 0, 1, 0, −9, −100, 17, −1, 1, 0, 0, 0, −10, −63, 1, 2, −17, 3,
−4, 0, −1, 9, −1, 0, 3, 4, −1, 0 },
{ −5, −14, −48, 2, −5, 1, −2, 0, 10, 24, 99, −17, 10, −4, 3, −1, 4, 14,
32, 0, 2, 0, 1, 0, −4, 0, −39, 6, −4, 1, −1, 0, 2, −3, −4, 0, 2, −2,
−2, 0, 0, 0, −1, 0, 0, −1, −1, 0 },
{ −2, 0, 2, 0, 0, 0, 0, 0, −2, 0, 1, 0, 0, 0, 0, 0, −1, −1, 1,
−1, 0, 0, 0, 0, −1, −4, 2, 0, 0, 0, 0, 0, −8, −2, −1, 1, 30, 4, −4,
1, −102, 4, 8, −1, −69, −2, 6, −1 },
{ −2, −10, −4, 0, 0, 0, 0, 0, 3, 11, −1, −1, 0, 0, 0, 0, −6, −40,
−15, 6, −2, 1, 0, 0, 5, 57, −6, 2, 0, 0, 0, 0, 1, −95, 18, −6, −10,
−34, −2, 0, −4, 17, 1, −2, 0, 0, 2, 1, 0 },
{ −2, −3, −25, −2, −3, 0, −1, 0, −1, −3, −1, 4, −2, 2, 0, 1, −7, −8,
−97, 17, −9, 3, −3, 1, −8, −26, −61, −1, −3, −1, −1, −1, 2, 10, 24, −7, 5,
9, 19, −1, 0, 1, 4, 0, −2, 0, 1, 0 },
{ 4, −4, 28, 103, −42, 24, −9, 7, 1, 2, 4, 0, 3, −1, 0, 0, −1, 0, −9,
−42, 17, −9, 3, −2, −1, −1, −14, 6, −4, 2, −1, 0, −1, −2, −4, 4, 0,
3, 1, −1, 0, 0, 2, 0, −2, 2, 0, 0, 0 },
},
{
{ 87, −41, 3, −4, 1, −1, 0, −1, −73, 28, 2, 1, 1, 1, 0, 0, 30, −5,
−6, 1, −1, 0, 0, 0, −8, −3, 3, 0, 0, 0, 0, 0, 3, 2, −1, 0, 0, −2, −1,
0, 0, 0, 1, 1, 0, 0, −1, 0, 0, 0 },
{ −75, 4, 7, 0, 2, 0, 1, 0, −41, 36, −7, 3, −1, 1, 0, 0, 72, −29,
−2, 0, −1, 0, −1, 0, −37, 6, 7, −2, 1, 0, 0, 0, 12, 3, −4, 0, −3, −2,
1, 0, 4, 0, 0, 0, −1, 0, 0, 0 },
{ 26, −44, 22, −6, 4, −2, 1, −1, 77, 24, −22, 2, −4, 0, −1, 0, 7, −38,
10, 0, 1, 0, 0, 0, −51, 27, 4, −3, 2, −1, 1, 0, 31, −5, −8, 3, −14,
0, 5, −1, 6, 1, −3, 0, −4, −1, 1, 0 },
{ −39, −68, 37, −7, 6, −2, 2, 0, −9, 56, −21, 1, −2, 0, −1, 0, −45, 4,
−3, 6, −1, 2, 0, 1, 49, −13, 3, −3, −1, 0, 0, 0, −19, 2, 0, 0, 5,
1, 1, 0, −2, 0, −1, 0, 1, 0, 0, 0 },
{ 10, −20, 2, 0, 1, 0, 0, 0, 50, −1, 8, −5, 1, −1, 0, 0, 66, 17, −24,
4, −3, 1, −1, 0, 0, 13, −49, 15, 1, 0, 0, 0, 0, −53, 34, 6, −5, 30,
−7, −11, 3, −11, −2, 5, 1, 4, 2, −1, −1 },
{ −21, −45, 8, −2, 3, −1, 1, 0, −7, −30, 26, −8, 3, −1, 1, −1, −9, 69,
−33, 5, −2, 0, −1, 0, −44, −31, 10, 7, −2, 2, 0, 1, 49, 7, 2, −6, −23,
−3, −2, 2, 9, 4, 0, 0, −2, −1, −1, 0 },
{ −4, −2, −55, 28, −8, 5, −3, 2, −2, 37, 43, −19, 1, −2, 1, −1, −47, −34,
−27, 5, 4, −1, 1, 0, −39, −2, 27, 4, −2, 1, 0, 0, −11, 32, −8, −7, 27,
−12, −6, 6, −13, 0, 4, −3, 3, −1, −2, 1 },
{ 2, 19, 47, −23, 6, −4, 2, −1, −23, −22, −44, 17, −2, 2, −1, 0, −33, 3,
22, −2, −4, 1, −1, 0, −58, −17, 6, −6, 7, −1, 1, 0, −23, 40, −2, 5, 43,
−11, −8, −1, −18, −4, 5, 2, 4, 3, 0, −1 },
{ −19, −62, −9, 3, 0, 0, 0, 0, −12, −56, 27, −7, 3, −1, 1, 0, 7, −8,
16, −6, 4, −2, 1, −1, −15, 54, −23, 2, −1, 0, 0, 0, −42, −25, 4, 6, 34,
8, 2, −2, −15, −1, 0, −1, 3, 2, 0, 1 },
{ 1, 9, −5, 0, −1, 0, 0, 0, 0, 22, −1, 2, 0, 1, 0, 0, −13, 17, 0,
−2, 0, −1, 0, 0, −46, −10, −10, 4, −1, 1, 0, 0, −80, −27, 20, −4, −66, 23,
−2, −2, 20, −3, −2, 3, −14, 2, 3, −1 },
{ 5, 17, −9, 0, −2, 1, 0, 0, 13, 54, −2, 7, −1, 1, 0, 0, 4, 51, −3,
−6, −1, −1, 0, 0, −20, 6, −34, 9, −2, 2, −1, 0, 16, −52, 28, 1, 59,
15, −8, −5, −28, −7, 2, 2, 10, 3, 0, −1 },
{ 7, 27, 56, −2, 0, −3, 3, −1, −2, −6, 8, −28, 3, −4, 1, −1, −1, −4, −68,
35, −5, 5, −2, 1, 0, 35, 43, −4, −6, 1, −1, 0, −14, −38, −12, −10, 9,
5, 7, 6, −9, 7, −4, −3, 4, −4, 0, 3 },
{ 0, 0, 19, −4, 3, −2, 2, −1, −3, −13, 10, −4, 1, 0, 0, 0, −6, −37, −18,
−5, 2, −2, 1, −1, 6, −6, −7, 25, −6, 4, −1, 1, 16, 10, 55, −24, 15,
46, −52, 1, 35, −43, 10, 12, −23, 13, 5, −8 },
{ −3, 0, −27, −80, 40, −16, 6, −4, 4, 3, 31, 61, −22, 7, −1, 1, −4, −7,
−26, −6, −10, 6, −4, 1, 3, 8, 14, −18, 15, −5, 2, −1, −2, −4, −1, 13, 0,
2, −4, −3, 3, −1, 2, 1, −2, 0, −2, −1 },
{ 1, 2, −8, 6, −1, 1, 0, 0, 2, 8, −5, −1, 0, 0, 0, 1, 24, 3,
5, −1, 1, 0, −3, 12, 6, −10, 1, −1, 0, 0, −9, −1, −25, 10, 45, −11,
18, 2, 86, 1, −13, −4, −65, −6, 7, 2 },
{ −4, −18, −57, 8, −8, 1, −3, 0, −5, −20, −69, 7, −6, 2, −2, 1, 1, 4,
0, 33, −7, 5, −2, 1, 0, −9, 53, −22, 3, −1, 0, 0, 4, −27, −2, −9, 5,
36, −13, 5, −7, −17, 1, 2, 4, 6, 4, −1 },
}
},
{ //3
{
{ −115, 37, 9, 2, 2, 1, 1, 0, 10, −29, 8, 0, 1, 0, 1, 0, 23, −8, −8,
1, −1, 0, 0, 0, 3, 3, −2, −1, 0, 0, 0, 4, 0, 0, −1, 1, 1,
0, 0, 2, 0, 0, 0, 0, 0, 0 },
{ 15, 51, −18, 0, −3, 0, −1, 0, −95, 7, 34, −3, 5, −1, 2, 0, 23, −47,
1, 6, 0, 1, 0, 1, 8, 5, −12, 0, −1, 0, 0, 0, 3, −3, 1, −1, 2, 1,
−2, 0, 1, −1, 0, 0, 1, 1, −1, 0 },
{ 29, −22, 16, −6, 3, −2, 1, −1, −4, −80, 12, 15, 0, 3, 0, 1, 45, 7,
−59, 7, −2, 1, −1, 0, −15, 41, −3, −16, 2, −3, 0, −1, 1, 0, 7, −2, −3,
6, 1, −2, 0, 0, 1, 0, −1, 2, 0, −1 },
{ −36, −98, 25, 5, 4, 1, 2, 1, −59, 11, −17, 1, 1, 1, 0, 0, 6, −13,
7, −3, 0, 0, 0, 14, −4, −14, 3, −1, 0, 0, 0, 2, 8, −3, −5, 2, 0,
0, 0, 0, 3, 0, −1, 1, 0, 0, 0 },
{ −6, 18, 3, −3, −1, 0, 0, 0, −50, −5, −38, 12, 0, 2, 0, 1, 3, 67, −7,
−40, 3, −6, 1, −3, −12, −13, 65, −3, −10, 0, −1, 0, 9, −20, −5, 22, −2,
0, 0, −1, 2, −3, −2, 3, −1, 0, 1, 0 },
{ 4, 15, 52, −13, 5, −3, 2, −1, −17, −45, 16, 24, −2, 4, −1, 2, −87, −8,
−14, 7, 8, 1, 2, 0, 23, −35, −6, −3, 1, 1, 0, 0, 2, 5, −17, 0, 3, −1,
−1, −5, 0, 1, −4, 0, 1, 0, 0, −2 },
{ −20, −7, −43, 4, 0, 1, −1, 1, −7, 35, 0, 12, −4, 1, −1, 0, −51, −2, −57,
5, 15, 0, 4, 0, 7, 39, 5, −55, 1, −7, 1, −3, 1, −10, 41, 2, 4, −3,
−2, 3, −1, −2, 7, 1, 1, −1, −1, 0 },
{ 4, 29, 1, 26, −5, 4, −2, 1, −17, −7, −73, 6, 6, 2, 1, 1, −5, 21, −3,
5, −1, −3, 0, −1, −11, 2, −52, −3, 27, −2, 5, 0, 0, 27, 8, −58, 2, −5,
25, 3, 0, 3, 0, −5, 0, −2, 7, 0 },
{ 12, 13, 10, 2, −1, 3, −1, 1, 17, −2, −46, 12, 7, 0, 2, 0, 16, −45,
−9, −53, 6, 1, 1, 0, 70, 16, 8, −4, −37, 1, −7, 0, −12, 29, 3, 21, 4,
0, 5, −1, −3, 4, 1, 4, 2, 0, 1, 0 },
{ 5, 20, 90, −17, 4, −3, 2, −1, 6, 66, 8, 28, −7, 3, −1, 1, 29, 5, −19,
12, 9, −1, 1, 0, −10, 14, −1, −13, 7, 0, 1, 0, 0, −6, 13, −4, 0,
−4, 1, 5, 0, −1, −1, 1, 0, −1, 0, 0 },

-continued

```
{ -3, -4, -34, -12, 2, -1, -1, 0, 5, 25, 11, 43, -10, 4, -2, 1, 23, 20,
-40, 12, 21, -3, 4, -1, 25, -28, -10, 5, 8, 6, 0, 2, -4, 21, -64, -8,
-5, 19, 10, -48, 3, -1, 10, -3, 0, 4, 3, -6 },
{ -1, -3, 2, 19, -2, 4, -1, 2, 9, 3, -35, 22, 11, 1, 2, 0, -7, -65, -19,
-22, 11, 4, 2, 1, -75, -18, 3, -1, -10, 2, 0, 1, 2, -35, -27, 4, 1,
8, -17, -19, 3, 0, 3, -6, 0, 2, -1, -2 },
{ 10, -4, -6, 12, 5, 1, 1, 0, 11, -9, -12, -2, -7, 0, -1, 0, 33, -10,
-4, 18, 18, -4, 4, -1, 28, -72, 1, -49, 15, 2, 2, 1, 56, -23, 22, -1, 4,
-1, -15, 26, 6, 4, -10, 0, 0, 2, -3, 2 },
{ 4, 6, 14, 53, -4, 4, 0, 2, 0, -1, -20, -13, 3, 2, -1, 1, -3, 1, -5,
35, -16, -6, -1, -2, 46, 29, 13, 21, 37, -5, 4, -1, -10, -53, -18, 8,
9, 12, -41, -25, -2, 2, 13, -16, 4, 1, -5, 1 },
{ 2, 9, 13, 37, 19, 6, 2, 2, -9, -3, -9, -28, -20, -4, -3, -1, 1, 18,
9, 28, 24, 6, 2, 2, -20, -5, -25, -33, -36, 9, -2, 2, -13, 42, 1, 57, -22,
-2, -25, -28, 5, 6, 19, -12, -5, -3, -2, 4 },
{ 3, -3, 12, 84, -12, 8, -2, 3, 6, 13, 50, -1, 45, 1, 7, 0, -2, 18,
-22, -37, -13, 14, 0, 3, 1, -12, -3, 2, -15, -8, 1, -1, 19, 14, -4, -12,
-4, 5, 17, 8, 2, -4, -4, 4, -2, 2, 1, 0 },
},
{
{ 109, -26, -8, -3, -2, -1, -1, 0, -50, 28, 2, 1, 0, 0, 0, 0, -18, -8,
6, 0, 1, 0, 1, 0, 6, -2, -3, 0, 0, 0, 0, 0, 0, -3, 2, 1, -1, 0, 0,
0, 0, -2, 0, 0, 0, 0, 0, 0, 0 },
{ -39, 31, -5, 2, -1, 1, 0, 0, -95, 6, 18, 0, 4, 0, 1, 0, 32, -49,
5, 1, 1, 0, 0, 0, 27, -1, -14, 2, -2, 1, -1, 0, 3, 5, -3, -2, 4, 1,
-1, -1, 2, 0, 0, 0, 2, 0, 0, 0 },
{ 29, -3, -2, -2, 0, 0, 0, 0, 0, -41, 9, 0, 2, 0, 1, 0, 86, 4, -33,
2, -6, 1, -2, 0, -32, 58, 1, -7, 0, -2, 0, -1, -14, -8, 20, 0, -2,
-3, 0, 4, -1, -1, 0, 0, -1, 1, 0, 0 },
{ 18, 96, -23, 2, -5, 1, -2, 0, -10, 6, 10, -2, 1, -1, 1, 0, -14, 26,
2, -4, 1, -1, 0, 0, -43, -9, 35, -2, 4, -1, 1, 0, 14, -40, 1, 10, 2,
1, -10, 1, 2, -4, -1, -1, 0, 0, -1, 0 },
{ -29, -60, 16, -2, 3, -1, 1, 0, -52, 9, -17, 5, -2, 1, -1, 1, 13, 56,
-2, -9, 0, -2, 0, -1, -34, -18, 41, 0, 3, 0, 1, 0, 19, -36, -10, 13, 3,
6, -14, -1, 3, 1, -1, -3, 1, 1, -1, -1 },
{ -23, -5, -15, 5, -2, 1, -1, 1, 2, 79, -13, -4, -2, -1, -1, 0, -9, 1,
5, -1, 1, 0, 0, 0, -4, 49, 2, -14, 1, -3, 0, -1, -31, -14, 56, -1, 13,
-37, -4, 20, -2, 2, -10, 0, 2, -4, 0, -1 },
{ -7, -3, 12, -3, 3, -1, 1, 0, -31, -62, 8, 7, 0, 2, 0, 1, -75, 9, -45,
5, -1, 1, -1, 0, 14, 35, 0, -23, 2, -5, 1, -2, 1, -8, 32, -1, 7, -12,
-4, 10, 0, 2, -6, -1, 2, 0, 0, -2 },
{ 1, -26, 5, 0, 1, 0, 1, 0, 24, -3, 43, -6, 4, -2, 1, -7, -64,
9, 14, 0, 3, 0, 1, -12, -4, 5, 3, -1, 1, 0, 0, 8, -59, -3, 26, 14,
6, -58, 6, -5, 17, -7, -18, 3, 3, -1, -5 },
{ 11, 14, 6, -3, 1, -1, 1, 0, 10, -7, -9, 3, -2, 1, -1, 0, 22, 21,
1, -21, 2, -4, 1, -2, 92, 1, 53, 0, -9, 1, -2, 0, -21, -11, 1, 40, -5,
-4, -24, 5, -4, 5, -6, -5, 0, 0, 0, -3 },
{ -10, -11, -47, 3, -4, 1, -1, 0, 5, 28, 11, -2, -1, 0, 0, 0, -12, -2,
-38, 2, 0, 1, 0, 0, 16, 38, 11, -16, -1, -3, 0, -2, 12, -9, -22, 7, -8,
60, 4, -36, -6, -15, 54, 7, 3, -7, -8, 14 },
{ -8, -24, -99, 11, -10, 3, -4, 1, -5, -36, 19, -26, 4, -5, 1, -2, 0, 25,
41, 5, -3, 1, 0, 0, 10, -5, -7, 12, 2, 1, 0, 0, -1, 1, 9, -3, -3, -14,
-3, 12, 2, 4, -13, -2, -1, 3, 2, -4 },
{ -5, 1, -1, 0, 1, 0, 0, 0, -10, -14, -6, 8, 0, 1, 0, 0, -17, -2,
7, -5, 3, -1, 0, 0, -16, 13, 3, 31, -1, -6, 0, 2, -93, -15, -46, -3, 23,
-19, 0, -47, 8, 4, 8, 3, 2, 3, 0, 0 },
{ 1, 12, -20, 21, -4, 5, -2, 2, -5, -2, -75, 9, -1, 2, -1, 1, -1, -2,
-16, -4, 0, -1, 0, 0, -7, 7, -31, 0, 3, 0, 0, 0, 4, 11, -12, 4, -12,
14, -50, -1, -8, 32, -4, -54, 2, 0, 30, -15 },
{ 2, -9, -18, 8, -3, 3, -1, 1, 3, -25, -62, -6, 0, -2, 0, -1, -6, -61,
14, -51, 2, -6, 0, -2, -19, 0, 40, -7, -17, 0, -3, 0, 13, -4, 11, 9, 17,
0, 24, 5, 1, -12, 4, 28, 0, 0, -15, 8 },
{ 4, 9, 39, 18, 0, 2, 0, 1, -6, -16, -22, -37, 5, -5, 1, -2, -5, 15,
63, 9, -16, 0, -3, 0, 18, 42, -18, 27, 15, 1, 3, 1, 12, -34, 9, -24, 4,
28, -2, 4, -11, -4, 30, 2, 5, -13, -4, 18 },
{ -7, -2, 15, -6, 1, -1, 1, -1, -11, -3, 22, -14, 0, -2, 1, -1, -18, -7,
30, -9, -4, 0, -1, 0, -35, 23, 23, 10, -17, 1, -3, 0, -19, 53, 6, 48, -65,
12, -12, 11, -8, -16, 10, -21, -2, -12, 6, 2 },
}
}
};
```

This disclosure describes various optimized matrices and reorganization patterns/scans for 8×8 LFNSTs relative to the techniques used for the LFNSTs in VVC Draft 6. The disclosed techniques may simplify the 8×8 LFNST design in VVC Draft 6 by reducing a number of multiplications required to perform the LFNST or inverse LFNST. The disclosed techniques may also reduce memory requirements and/or provide coding gains without increasing encoder or decoder complexity.

After video decoder 300 obtains a list of 2-D dequantized coefficients (based on a coefficient decoding step), video decoder 300 may apply an inverse LFNST to reconstruct a subset of coefficients. Then, video decoder 300 may use an inverse separable transform (e.g., DCT-2) to reconstruct residuals in a 2-D block/array (such as shown in FIGS. 7 and 8).

An LFNST decoding process may be specified based on the following: reorganization patterns/scans, which are used to define how LFNST input and output coefficients are organized; and a transform matrix, defining the non-separable transform used for a subset of decoded coefficients.

Figure 9:
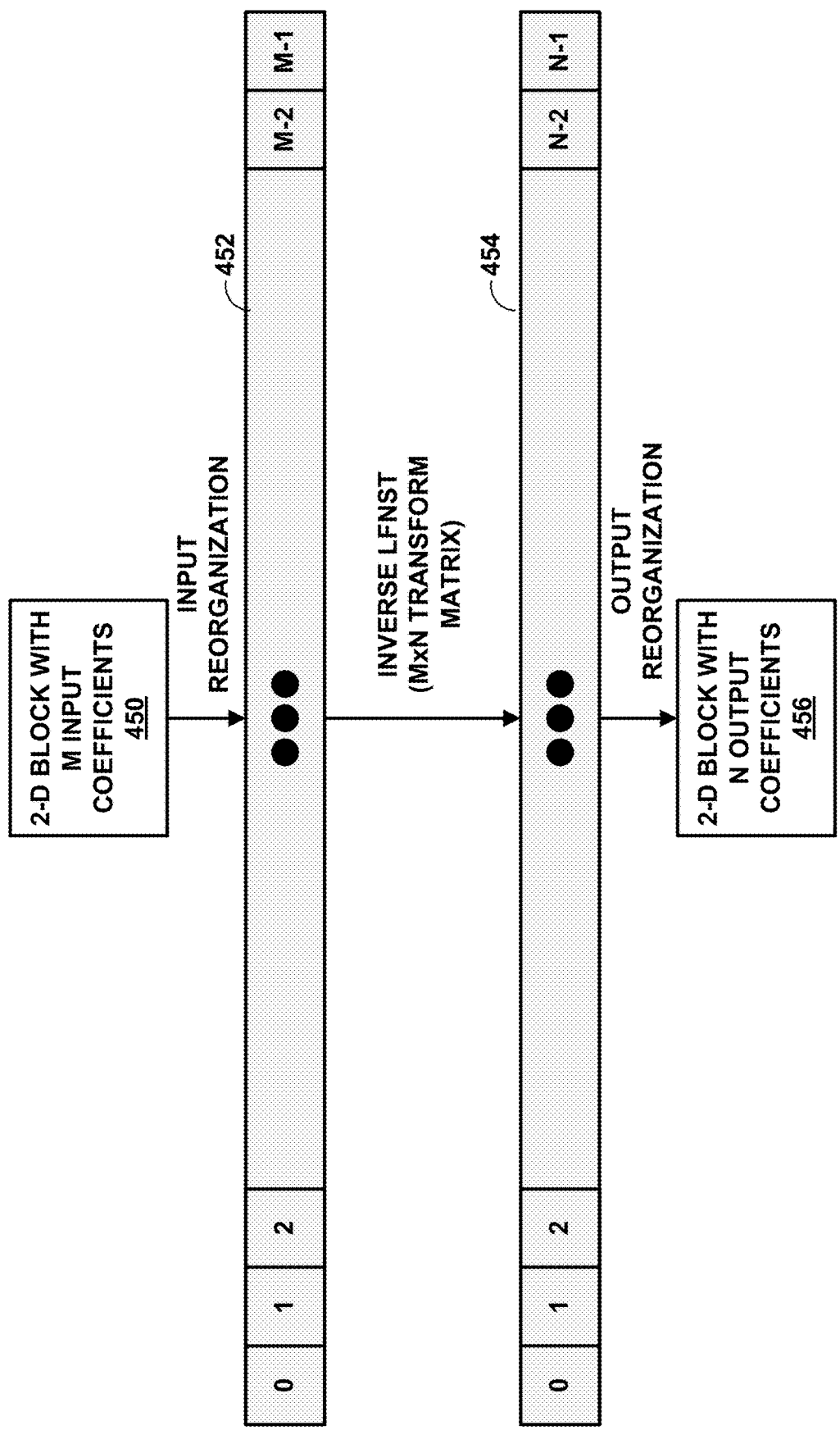
FIG. 9 is a conceptual diagram illustrating an inverse LFNST process.

FIG. 9 is a conceptual diagram illustrating an inverse LFNST process. With LFNST, a 2-D block/array of decoded coefficients may be organized in order to align the entries of matrices and the input to the inverse LFNST. As illustrated in FIG. 9, this can be achieved by, for example, inverse transform processing unit 212 or inverse transform processing unit 308: constructing a 1-D list of M coefficients 452 from the 2-D block of coefficients 450, applying an inverse LFNST (of size M×N) to the 1-D list of M coefficients 452 to reconstruct N LFNST coefficients 454, and the output coefficients are reorganized in a 2-D block/array 456, which are input to the separable transform (inverse DCT-2) reconstructing the residual block.

Figure 11:
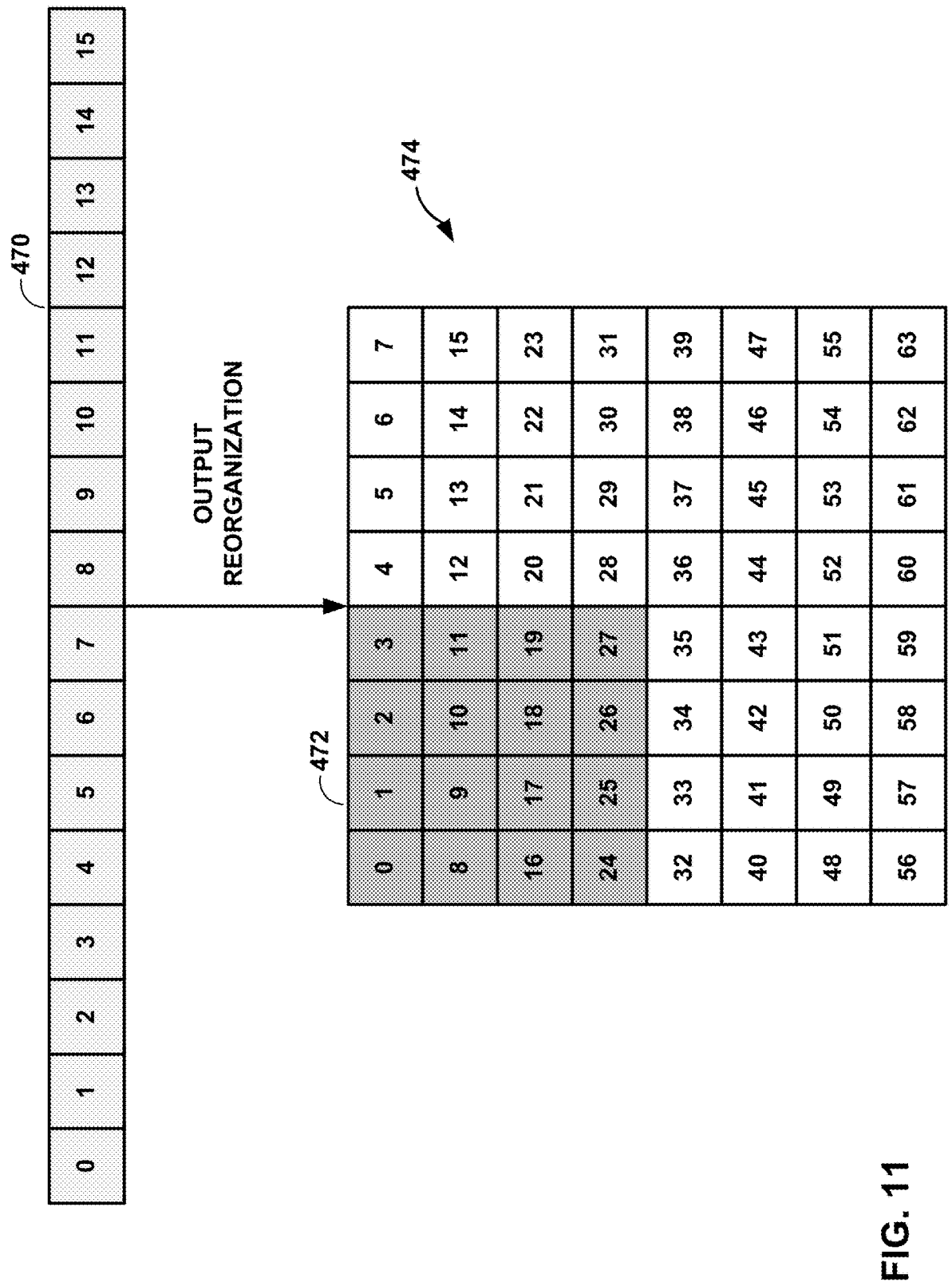
FIG. 11 is a conceptual diagram illustrating a 4×4 block pattern with 16 samples in 8×8 LFNST.

In VVC Draft 6, the LFNST design allows at most M=16 non-zero coefficients (located at top-left 4×4 subblock) while the rest of the coefficients are normatively set to be zeros (such as shown in FIG. 11). However, the techniques of this disclosure may be applied for designs that allow all coefficients to be non-zeros. One example may be the case where M=N. For example, none of the coefficients are normatively zeroed-out.

Figure 10:
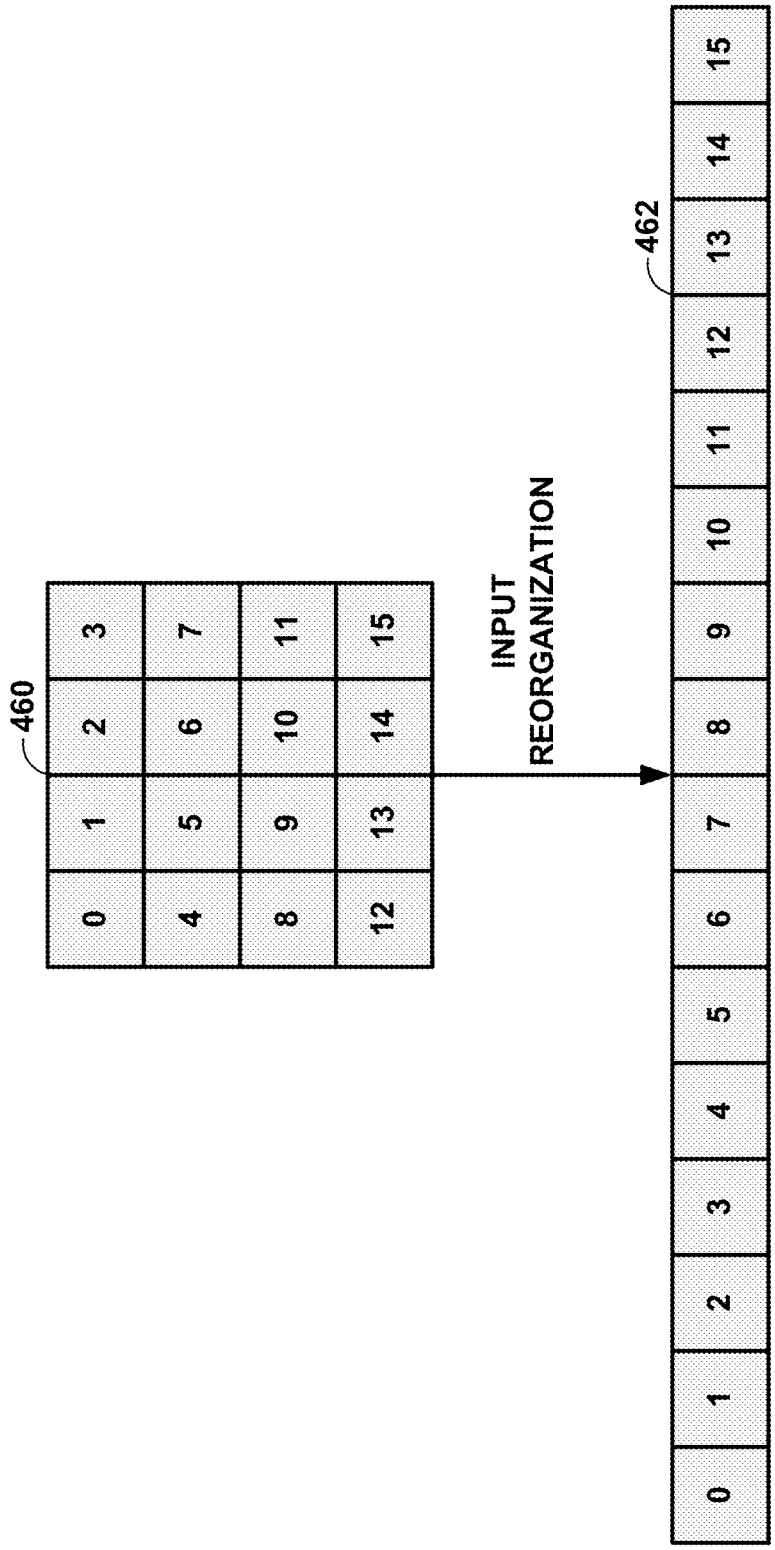
FIG. 10 is a conceptual diagram illustrating input reorganization based on a raster scan.

FIG. 10 is a conceptual diagram illustrating input reorganization based on raster scan. Raster scan is a row-by-row scan beginning with the coefficient in the upper left corner moving to the coefficient in the upper right corner, followed be the row immediately below the upper most row (the second row), again moving left to right, then the row immediately below the second row, again moving left to right and so on. Input reorganization in now further discussed. In one example, the reorganization can be done in raster scan order (also called row-major ordering as shown in FIG. 10). As can be seen, the order of the coefficients in 4×4 block 460 are reorganized in 1-D list 462 based on raster scan order. For example, video decoder 300 may reorganize coefficients in a top row from right to left of 4×4 block 460 into the first, second, third, and fourth positions (e.g., the four left-most positions) in 1-D list 462. Video decoder 300 may place the coefficients from the second row of 4×4 block 460 in the next four positions in 1-D list 462, and so on. In another example, video decoder 300 may perform the reorganization in column-major ordering (e.g., going by columns rather than rows). In another example, video decoder 300 may reorganize coefficients based on block size and/or intra mode.

If a codec (e.g., video encoder 200 or video decoder 300) normatively sets a subset of input coefficients to be zeroed-out, then an input coefficient list for the LFNST may not include those zeroed-out coefficients. The reorganization step may only include coefficients that can be non-zero (e.g., coefficients that are not normatively zeroed out).

The LFNST transform matrix is now further discussed. The LFNST transform matrix within inverse transform processing unit 212 and inverse transform processing unit 308 may be of size M×N, where M denotes the number of basis vectors and also denotes the number of rows and N denotes the number of reconstructed LFNST coefficients after applying the transform (also known as the number of support samples for the transform). The transform matrix entries may be in 8-bit, 9-bit or 10-bit precision. The signs of all entries in a row of the transform matrix may be flipped. In other words, a row-vector in the transform matrix may be multiplied by −1. In some examples, all rows in the transform matrix may be multiplied by −1. In some examples, a subset of rows in the transform matrix can be multiplied by −1, while the other entries are unchanged.

Output reorganization patterns/scans are now further discussed. Inverse transform processing unit 212 and inverse transform processing unit 308 may reorganize a 1-D list of N output LFNST coefficients based on an array (defining a pattern/scan), where each value in the array corresponds to a position/location in a 2-D block. The values in the array (used for reorganization) can denote indices of a 2-D block in any pre-defined order. In one example, the index values can correspond to a position in a 2-D block. Given an index value v, the corresponding position in the 2-D block can be calculated as:

row index: $r=\text{floor}(v/w)$ column index: $c=\text{mod}(v,w)$, where w denotes the width of the LFNST subblock (in VVC Draft 6, w can be 4 or 8).

Based on this formula, the following array for a reorganization pattern corresponds to the raster-order for 4×4 blocks:

```
const int raster_order  [16] =
{ // 0 1 2 3 4 5 6 7 8 9 10 11 12 13 14 15
    0, 1, 2, 3, 4, 5, 6, 7, 8, 9, 10, 11, 12, 13, 14, 15
};
``` so that i-th element in the 1-D coefficient list is mapped to the row and column positions in the 2-D block as for i=0,1, ... 15:

$r[i]=\text{floor}(\text{raster\_order}[i]/w)$ $c[i]=\text{mod}(\text{raster\_order}[i],w)$ Examples for an 8×8 LFNST are now discussed. FIG. 11 is a conceptual diagram illustrating a 4×4 block pattern with 16 samples in 8×8 LFNST. In the example of FIG. 11, video decoder 300 may perform the input reorganization in raster-scan order for M=16 decoded coefficients. 1-D list 470 may be reorganized and output as shown, with the coefficients in 1-D list 470 being reorganized into the top left 4×4 portion 472 of 8×8 block 474. The other coefficients in 8×8 block 474 may be normatively zeroed out. The optimized output reorganization patterns/scans may be specified in arrays g_lfnstRGScan8x8 or g_lfnstRGTranScan8x8, where one of these arrays is used depending on intra mode. The set of optimized transforms (LFNST) matrices may be defined as g_lfnst8x8.

4×4 block pattern with N=16 samples in 8×8 LFNST:

```
const int g_lfnstRGScan8x8  [16] =
{ // 0 1 2 3 4 5 6 7 8 9 10 11 12 13 14 15
    0, 1, 2, 3, 8, 9, 10, 11, 16, 17, 18, 19, 24, 25, 26, 27
};
const int g_lfnstRGTranScan8x8[16] =
{ // 0 1 2 3 4 5 6 7 8 9 10 11 12 13 14 15
    0, 8, 16, 24, 1, 9, 17, 25, 2, 10, 18, 26, 3, 11, 19, 27
};
const int8_t g_lfnst8x8[4][2][16][16] =
{
    { // 0
        {
            {−116, 26, 22, 1, 31, −19, −3, 1, 18, −1, −5, 0, 1, 0, 0, 0 },
            { −22,−101, 50, 5, −35, 26, −16, 4, 29, 12, −10, −3, −5, 3, 2, −1 },
            { 13, −41, −1, 11, 102, −7, −34, 0, −39, 33, 7, −6, −8, −4, 7, 1 },
            { −22, 10, −17, 2, 4, 107, −16, −24, −23, −23, 40, 1, 4, −23, −2, 9 },
            { −33, −40, −83, 48, −30, −27, 18, −11, −27, 21, 22, −11, 25, −5, −6, 3 },
            { −8, −3, 55, −19, −22, −17, 16, 9, −95, −9, 8, 8, 47, −9, −15, 0 },
            { 2, −32, −3, −11, 42, 7, 93, −29, 13, −37, −8, 36, 1, 6, −31, 3 },
            { 0, 19, 17, −12, −8, 19, 52, −23, 0, 98, −6, −9, −14, −41, 18, 9 },
            { −16, −23, −35,−101, −13, −21, −13, −3, −11, 2, 33, 19, −40, −3, 10, 7 },
            { −5, 1, 18, 46, −15, −11, 18, 4, −38, −28, 10, 0,−102, −11, 17, 3 },
            { 14, 3, 33, 12, 5, −31, 2, −8, 37, −3, 97, −22, 8, −21, −29, 36 },
            { 6, −1, 8, 8, −7, −29, −33, −95, 2, −21, −27, 29, 12, −40, 29, 26 },
            { 1, −8, −14, 0, 6, −5, −3, 61, 13, −18, −21, 23, 7,−103, −11, 6 },
            { 1, −12, −1, −18, 12, −2, 32, 5, 2, −38, −2, −81, 20, −13, 78, 4 },
            { 2, 1, 7, 20, 2, 1, 11, 26, 10, 7, 41, 77, 22, 15, 80, −13 },
            { −3, 1, −6, 2, 0, 9, 2, 27, −7, 4, −23, 10, 1, 28, 8, 118 },
        },
        {
            {−103, 53, 9, 0, 50, −10, −12, −1, 8, −12, 0, 2, 2, −1, 2, 0 },
            { 58, 59, −46, −5, 55, −41, −16, 9, −38, −17, 22, 4, −5, 7, 5, −4 },
            { 0, 83, −24, −17, −88, 7, 7, 5, 23, −6, −2, 4, 12, −8, −2, 1 },
            { 33, 24, 30, −23, 30, 78, −41, −21, 22, −36, −34, 15, −18, −18, 14, 10 },
            { 8, 24, 89, −35, −13, −17, 12, −19, −69, 5, −2, 4, 20, 18, −12, 0 },
            { 29, 25, 29, −5, 32, −38, 47, −12, 65, 40, −37, −27, −12, −17, −25, 11 },
            { −7, 17, −39, 20, 17, 64, 41, −28, −52, 46, −13, −29, 17, −19, −26, 13 },
            { −4, −12, −19, −64, 6, −5, −64, 5, 9, 73, −4, 17, 36, −6, −19, 4 },
            { 2, 5, 10, −45, 16, 44, 32, 32, 23, 9, 76, −18, −24, 30, −18, −38 },
            { −18, −24, −37, −81, −4, −18, 41, −32, −17, −28, −17, 13, −45, −20, 11, 22 },
            { 7, −14, −14, −18, 20, 5, 36, −5, 24, −51, −4, 18, 99, 13, −18, −2 },
            { 1, 3, −11, 8, −6, −5, −18,−101, 23, 7, 26, −14, −2, 63, 8, −1 },
```

-continued

```
    { 5, 9, 10, 12, 9, 5, 35, −18, 9, 40, 33, 71, 13, −31, 73, −7 },
    { −2, 7, −14, −3, 5, 14, 22, 34, −4, 22, −64, 31, −12, 88, 25, −12 },
    { 0, 1, −1, 24, −2, 1, 2, −12, 2, −2, 10, 85, −29, 4, −86, 7 },
    { 1, 2, 7, 1, 2, 7, 3, 25, 7, 3, 32, −1, 3, 27, 9, 117 },
  },
},
{ // 1
  {
    {−108, 49, 5, 4, 43, −4, −10, −1, 10, −14, −1, 2, 3, −2, 4, 0 },
    { −45, −17, 21, −1, −91, 50, 13, −2, 38, 20, −21, −4, 13, −12, −10, 4 },
    { 24, −13, 4, −3, 37, 57, −38, −4, 59, −52, −30, 13, −20, −34, 26, 11 },
    { −30,−101, 50, 5, 42, −12, 10, −5, 0, 19, −1, −9, −11, 12, −2, −3 },
    { 16, 17, −13, −2, 46, 16, 14, −15, 16, 72, −44, −21, 26, −37, −52, 18 },
    { 4, −3, −18, 6, −8, −79, 33, 13, 89, −8, 4, −9, −5, −16, 1, −7 },
    { −22, −42, −66, 37, −11, −19, −18, 12, −31, 0, −18, 22, 35, −52, 33, 27 },
    { −1, −18, −39, 15, 12, 28, −50, 22, 36, 18, 59, −6, 45, 37, −24, −36 },
    { 13, 10, 62, −28, −9, −42, −55, 15, 2, −3, −27, 30, 69, −4, −1, 4 },
    { 6, −5, 9, 3, 17, 22, 72, −26, −4, −55, 20, −2, 78, −9, −4, −7 },
    { −5, −13, −36, 8, −4, −10, −3, −19, 4, −36, −69, 6, 5, 79, −40, 18 },
    { 9, 15, 1, 19, 13, 11, 23, −16, 19, 50, −24, 29, 19, 46, 87, −18 },
    { −14, −19, −40,−107, 2, −1, 5, −30, 6, 12, 16, 34, 0, 0, 8, 9 },
    { −2, −2, −5, −22, 14, 20, 39, 108, −8, −2, −23, 32, −3, 5, −10, −17 },
    { −4, −5, −14, −37, −3, −3, −12, 14, −13, −11, −36, −96, 16, −3, 36, −44 },
    { 3, 4, 6, −10, 4, 7, 3, 32, 11, 4, 26, −43, 14, 29, 24, 104 },
  },
  {
    { 77, −50, 4, −3, −73, 38, 5, 0, 25, 1, −13, 2, −6, −10, 7, 1 },
    { −63, −1, 20, 0, −14, 58, −26, 0, 59, −55, −1, 8, −23, 7, 21, −9 },
    { 53, −27, 12, −4, 54, −1, −30, 3, −19, −53, 37, 2, −35, 53, 3, −16 },
    { −44, −74, 49, 1, −5, 28, −3, −8, −54, 30, 2, 3, 26, 27, −20, −2 },
    { 15, −31, 3, 7, 72, 24, 2, −20, 0, −1, −56, 19, 12, −57, 45, 10 },
    { 25, 59, 8, −17, −4, 59, −56, 1, −38, −9, 5, 14, 55, −13, −18, −1 },
    { −12, 10, −28, 18, −40, −7, 23, −15, −62, −34, −4, 33, 5, 17, 75, −24 },
    { −2, −24, 40, −10, −15, −67, −43, 26, 20, −17, 32, 20, 44, −42, 26, −20 },
    { 8, 38, 81, −39, −16, −20, −4, −17, −22, 11, −36, 11, −59, −2, 13, 16 },
    { 19, 24, 35, 9, 17, 2, 33, −38, 48, 30, −2, 22, 43, 50, 14, −56 },
    { −6, −4, −32, 8, 1, 10, −61, 6, 2, 75, 12, 31, −49, −3, 21, −42 },
    { 2, 11, 26, −12, 13, 39, 50, 26, −14, 15, 67, −41, −15, −45, 30, −31 },
    { 2, 4, 16, 71, −10, −6, −3, −60, −13, −23, 14, 6, −24, −47, −49, −33 },
    { −12, −19, −35, −93, −1, −5, 12, −51, −2, −16, 6, 15, −3, −21, −28, −39 },
    { 0, −2, −5, −4, −5, −4, −32, −79, 10, 17, 39, −50, 11, 7, 43, 51 },
    { −1, −2, −2, 0, −6, −11, −29, 6, −11, −8, −55, −91, 6, 6, 9, −61 },
  },
},
{ // 2
  {
    {−120, 33, 6, 5, −5, 0, 1, 0, 26, −5, −1, −1, 7, −1, −1, 0 },
    { 3, 1, 1, 0,−120, 23, 9, 3, −19, −1, 2, 0, 33, −5, −3, 0 },
    { −24, 19, −4, 2, 13, 2, −2, 0,−120, 15, 10, 2, −24, −1, 4, 0 },
    { −4, −10, 4, −1, −35, 10, 0, 1, 21, 8, −2, −1,−119, 14, 12, 2 },
    { 31, 105, −47, 10, 1, 24, −10, 1, 13, −30, 10, −3, −10, −9, 4, 0 },
    { 5, 14, 1, −1, −18,−104, 37, −6, −8, −51, 10, 1, −7, 27, −10, 3 },
    { −7,−31, 23, −5, 9, 36, 0, −1, −11,−102, 22, 0, −10, −48, 3, 1 },
    { 17, 48, 98, −30, 7, 17, 42, −11, 0, 9, −25, 8, −2, 0, −16, 3 },
    { 3, 8, 1, 0, −7, −43, 10, 1, 7, 36, 5, −2, −9,−111, 25, 1 },
    { −4, −13, −35, 5, 11, 29, 98, −24, 6, 18, 49, −9, −3, −2, −29, 6 },
    { −4, −9, −34, 11, 0, 2, 13, 3, −8, −12, −90, 22, −11, −25, −72, 11 },
    { −7, −2, −34,−115, −2, −1, −10, −30, 0, −1, 0, 29, 1, 0, 6, 7 },
    { 2, 5, 18, −7, −5, −11, −53, −8, 5, 14, 58, −18, −8, −12, −92, 22 },
    { 0, 2, 0, −13, 4, 0, 14, 104, 4, 5, 28, 66, −1, 1, −12, −3 },
    { 2, 0, 7, 38, −2, 1, −11, −50, 3, 2, 14, 88, 3, 2, 15, 63 },
    { −1, 0, −3, −15, 2, 3, 8, 37, −2, −2, −12, −50, 4, 4, 19, 108 },
  },
  {
    { −79, 44, −4, 4, 76, −35, −1, −2, −33, 7, 7, −1, 9, 3, −5, 0 },
    { 76, −7, −10, −1, 26, −34, 10, −3, −72, 35, 0, 0, 43, −9, −8, 2 },
    { 30, −50, 27, −7, 79, 28, −30, 2, −5, −38, 12, 2, −44, 26, 5, −4 },
    { −49, −55, 38, −5, −18, 54, −21, 0, −46, 11, −5, 8, 56, −17, 3, −3 },
    { 4, 41, −7, −1, −39, 13, −24, 11, −50, −56, 48, −7, 9, 61, −20, −6 },
    { 22, 24, −8, 1, 36, 19, −17, 3, 62, −34, 11, −2, 89, −13, −6, −6 },
    { 4, 5, 67, −40, −13, −49, −54, 33, 24, 36, 32, −10, −1, −3, −22, −5 },
    { 20, 67, 10, −11, 3, 45, −40, 11, −26, −2, −13, 9, −28, −66, 39, −7 },
    { 5, 13, 52, −13, −9, −39, 10, −21, −3, −37, −57, 41, 19, 33, 55, −19 },
    { −11, −39, −18, 6, −14, −56, −2, 12, −12, −64, 38, −9, −1, −64, 32, −7 },
    { 6, 4, 22, 85, −7, −11, −39, −72, 6, 13, 28, 25, −5, −8, −7, −4 },
    { −6, −19, −65, 4, −2, −8, −56, 25, 8, 37, 1, 26, 6, 33, 51, −45 },
    { 1, 7, 15, −32, 6, 20, 59, −25, 6, 21, 71, 28, −2, −4, 20, −62 },
    { 5, 7, 32, 47, 3, 8, 22, 29, 3, 19, 19, −74, 9, 22, 69, 12 },
    { 3, 2, 21, 62, 3, 1, 24, 76, −2, −8, −17, 34, −5, −10, −37, −52 },
```

```
        { 1, 1, 2, 7, 3, 4, 13, 36, 5, 8, 37, 75, 4, 7, 25, 84 },
      },
    },
    { // 3
      {
        { 112, -38, -12, -2, -17, 33, -7, -1, -24, 7, 11, -1, -2, -4, 2, 2 },
        { 8, 48,-20, -1,-88, 13, 40, -5, 23,-55, 5, 11, 11, 4,-17, 1 },
        { -34, 17, -10, 6, 6, 75, -17, -18, -40, -4, 64, -10, 14, -46, 5, 20 },
        { 31, 97, -32, -11, 26, -10, 4, 1, -7, 36, -6, -16, -17, -3, 45, -4 },
        { 20, 18, -12, 0, 76, -3, 40, -14, -19, -50, 9, 44, -3, 9, -55, 4 },
        { 3, 14, 53, -17, -22, -42, 19, 30, -84, 0, -11, 8, 25, -40, -2, -2 },
        { 23, 4, 45, -11, 6, -43, 9, -10, 54, 2, 57, -7, -14, -37, 1, 62 },
        { -11, -37, -3, -32, 14, 17, 91, -15, 2, -3, -1, -4, 10, -1, 69, -4 },
        { -15, -4, 0, 7, -27, 14, 30, -8, -11, 59, 1, 58, -81, -11, -22, 3 },
        { 9, 27, 83,-26, 15, 68, -5, 31, 29, -11, -25, 6,-13, 13, 1,-13 },
        { 6, 8, -6, -9, 2, 12, 11, -3, 35, 65, -7, 44, 86, -18, -27, -5 },
        { 2, -12, -35, 10, 14, 4, 0, 57, 31, -25, -30, 5, -17, -91, 3, -18 },
        { -11, -5, -33, -27, 0, 14, 8, 72, -12, 9, -11, -5, 4, 35, -10, 85 },
        { 7, 7, 22, 114, 6, 8, 24, 15, -2, 2, -11, 9, 15, 10, 27, 27 },
        { -1, -1, -5, -13, -4, -11, -49, 2, -1, -30, 10, 92, 7, 9, 64, 11 },
        { 0, -2, -3, 7, 1, -12, 14, 70, 7, 10, 81, 4, 1, 30, 0, -59 },
      },
      {
        { 110, -32, -9, -3, -40, 29, 0, 1, -24, -1, 7, 0, 4, -3, -1, 0 },
        { -24, 26, -6, 2, -95, 10, 21, 0, 34, -55, 5, 3, 30, 1, -19, 2 },
        { -33, 6, 3, 2, -3, 41, -10, -1, -82, -3, 38, -2, 33, -64, 0, 10 },
        { 15, 94, -27, -2, -22, 7, 10, -2, -10, 36, 2, -8, -48, -10, 45, -2 },
        { 33, 58, -24, 0, 58, -18, 23, -8, -21, -61, 7, 15, 25, 16, -44, 2 },
        { -16, 1, -22, 7, 21, 103, -20, -14, 17, -10, 14, -1, -16, 54, -5, -12 },
        { 17, -3, 5, 0, 28, 12, 2, -8, 72, -18, 53, -6, -24, -68, 1, 40 },
        { 16, 29, -11, -3, 12, 2, -43, 4, 37, 38, -2, -30, 95, 0, 18, -3 },
        { 11, 38, 71, -6, -12, 7, -66, 24, -2, 7, -10, 2, -25, 0, -62, 8 },
        { 11, 13, 81,-27, 19, 29, 37, 11, 3, -34, -26, -2, 16, -1, 61, -17 },
        { 1, -4, 11, 7, -8, -37, -48, -9, -21, -46, 57, -46, -12, 44, 47, 15 },
        { 0, 7, 40, -14, -8, -4, 51, -33, -3, 54, 62, 15, 18, 45, -21, 31 },
        { -5, -2, -17, -2, 4, 12, 12, 82, -8, 0, -15, 4, 5, 23, 11, 90 },
        { -8, -7, -24,-119, -1, -1, -2, 10, -2, -2, 8, -28, -9, -1, -16, -12 },
        { 0, -1, 8, 21, 3, 11, 35, -23, -8, 3, -34,-106, -8, -4, -31, 21 },
        { -2, 1, -2, -25, -5, 3, -29, -82, -7, -10, -50, 28, 3, -1, 16, 66 },
      },
    },
};
```

Figure 12:
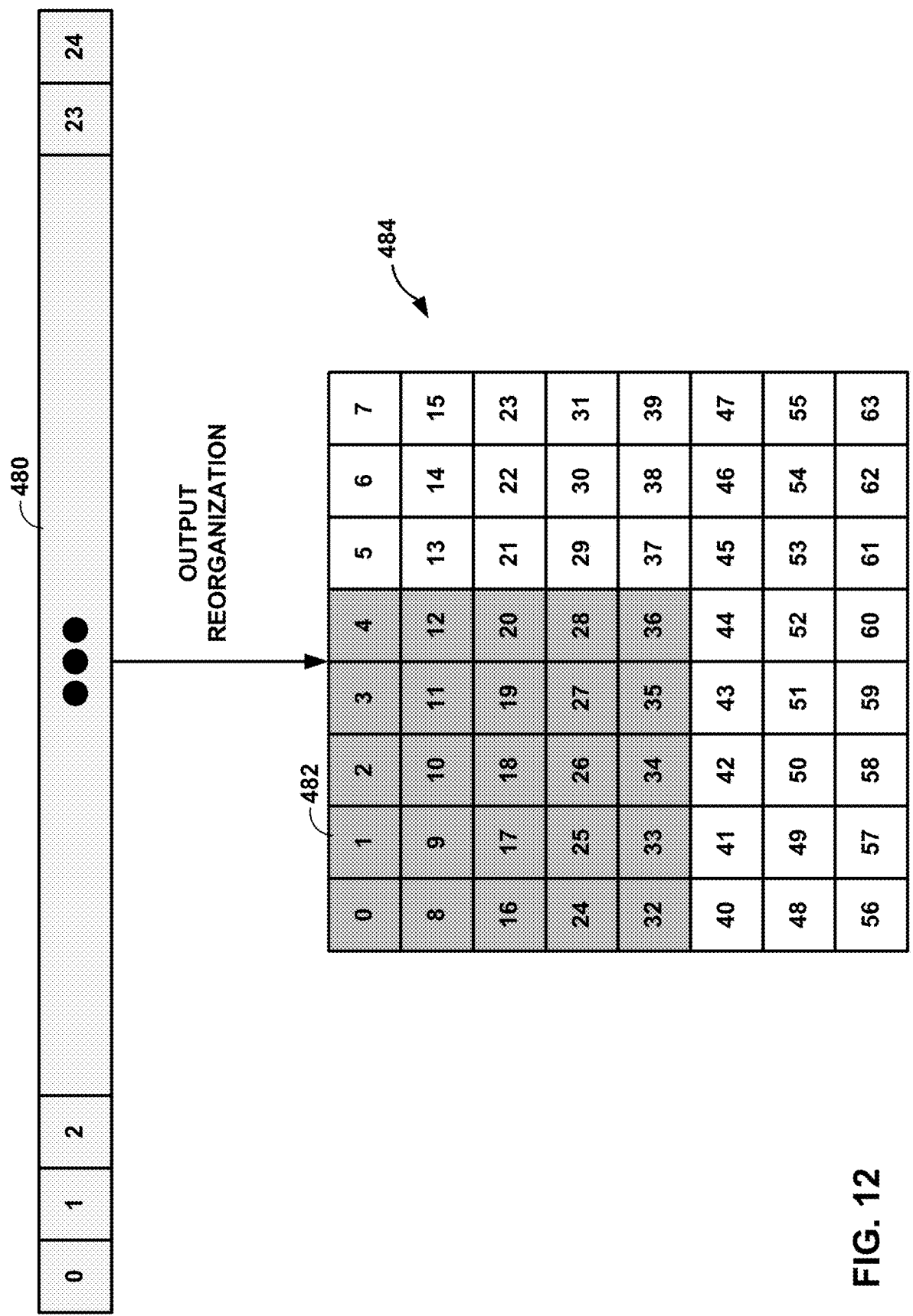
FIG. 12 is a conceptual diagram illustrating a 5×5 block pattern with 25 samples in 8×8 LFNST.

FIG. 12 is a conceptual diagram illustrating a 5×5 block pattern with 25 samples in an 8×8 LFNST. 1-D list 480 may be reorganized and output as shown, with the coefficients in 1-D list 480 being reorganized into the top left 5×5 portion 482 of 8×8 block 484. The remaining coefficients in 8×8 block 484 may be normatively zeroed out. The optimized output reorganization patterns/scans may be specified in arrays g_lfnstRGScan8x8 and g_lfnstRGTranScan8x8, where one of these arrays is used depending on intra mode. The set of optimized transforms (LFNST) matrices may be defined as g_lfnst8x8.

A 5×5 block pattern with N=25 samples in 8×8 LFNST may include:

```
const int g_lfnstRGScan8x8 [25] =
{ // 0 1 2 3 4 5 6 7 8 9 10 11 12 13 14 15 16 17 18 19 20 21 22 23 24
        0, 1, 2, 3, 4, 8, 9, 10, 11, 12, 16, 17, 18, 19, 20, 24, 25, 26, 27, 28, 32, 33, 34, 35, 36
};
const int g_lfnstRGTranScan8x8[25] =
{ // 0 1 2 3 4 5 6 7 8 9 10 11 12 13 14 15 16 17 18 19 20 21 22 23 24
        0, 8, 16, 24, 32, 1, 9, 17, 25, 33, 2, 10, 18, 26, 34, 3, 11, 19, 27, 35, 4, 12, 20, 28, 36
};
const int8_t g_lfnst8x8[4][2][16][25] =
{
  { // 0
    {
      { 116, -26, -22, -1, -5, -31, 19, 3, -1, 1, -18, 1, 5, 0, 1, -1, 0, 0, 0, 0, -4, 0, 1, 0, 0 },
      { 21, 100, -49, -4, -9, 37, -26, 15, -4, 0, -29, -12, 10, 3, 2, 4, -3, -2, 1, 0, -6, -3, 2, 0, 0 },
      { -12, 43, 0, -11, 0,-101, 7, 35, 0, 4, 38, -33, -7, 6, -2, 8, 4, -7, 0, 0, 7, -3, -1, 0, 0 },
      { -22, 10, -16, 1, 2, 4, 107, -17, -24, -3, -23, -23, 40, 1, -1, 4, -22, -2, 9, 0, 2, -3, -1, 0, 1 },
```

-continued

```
        { -33, -39, -82, 49, -2, -30, -25, 18, -12, 7, -28, 20, 22, -11, 0, 25, -5, -6, 3,
-2, 0, 6, 3, -3, 0 },
        { -8, -2, 56, -19, 2, -22, -17, 15, 9, 0, -94, -9, 8, 8, 6, 47, -9, -15, 0, -2,
-3, 6, -4, 0, 0 },
        { 2, -33, -5, -13, 6, 41, 6, 90, -28, -10, 14, -39, -6, 37, -8, 3, 8, -32, 3, 5,
-7, 7, 2, -4, 1 },
        { 0, 17, 16, -13, -1, -7, 18, 55, -23, -2, -1, 96, -4, -7, -6, -16, -40, 17, 10,
0, 3, -7, -11, 4, 1 },
        { 13, 19, 36, 94, -37, 12, 22, 15, -2, 13, 12, -2, -35, -15, 9, 36, -1, -8, -6,
-4, -15, 5, 2, -7, 2 },
        { 4, 2, -16, -42, 15, 10, 12, -20, -6, -4, 36, 30, -12, -2, -8, 96, 10, -13, -2,
-6, -36, 9, 14, 1, 1 },
        { 16, 3, 32, 16, 3, 5, -35, -8, -24, 5, 36, -8, 85, -15, -23, 15, -27, -22, 39,
-2, 4, 6, -22, -4, 5 },
        { 0, -4, 0, -6, -13, -8, -21, -31, -87, 26, -7, -20, -41, 34, -8, -1, -34, 35, 17,
-5, -11, 15, -1, -2, 3 },
        { 0, -8, -18, -7, -15, 6, -3, -6, 57, -8, 15, -14, -21, 26, 18, 11, -95, -13, 5,
7, 13, 19, -21, -8, 1 },
        { -8, -2, 5, 0, -13, -13, -3, 0, 17, -3, -2, 0, 18, 9, 3, -35, -16, -6, 6, 8,
-112, -5, 33, -5, 6 },
        { -7, -13, -3, -36, -112, 2, 0, 5, -3, 4, 7, 3, 22, -4, 28, 7, 20, 8, 2, -8,
10, -5, -5, 8, 5 },
        { -1, 13, 2, 12, -15, -12, 3, -31, -13, -14, -3, 39, 2, 68, -4, -14, 23, -66, -5,
35, 17, 16, 4, -35, 0 },
        },
        {
        { 103, -53, -9, 0, -1, -50, 10, 12, 1, 1, -8, 12, 0, -2, 0, -2, 1, -2, 0, 0,
-1, 1, 0, 0, 0 },
        { -58, -59, 46, 5, 6, -55, 41, 16, -9, 1, 37, 17, -22, -4, -1, 5, -7, -5, 4, 0,
7, 1, -2, 0, -1 },
        { 0, 83, -23, -17, -4, -87, 7, 6, 5, 6, 23, -5, -2, 4, -1, 12, -8, -3, 1, -1,
6, -6, 1, 1, 0 },
        { 33, 24, 30, -23, -1, 30, 78, -40, -21, -1, 22, -36, -35, 15, 4, -18, -18, 14, 10,
0, -2, -2, 3, 0, -1 },
        { -7, -23, -87, 34, 7, 12, 16, -13, 20, -4, 69, -6, 2, -3, -10, -20, -18, 12, 0,
0, -4, 3, 10, -4, 0 },
        { 24, 28, 15, 3, -10, 33, -17, 57, -20, -8, 47, 50, -39, -35, 5, -7, -22, -32, 15,
11, -9, -4, 5, 9, -1 },
        { -16, 7, -47, 21, 0, 6, 72, 24, -23, -7, -68, 30, -1, -20, 7, 19, -13, -17, 9,
4, 4, -9, 3, 5, -1 },
        { -3, -12, -18, -63, 17, 8, -5, -59, 6, 22, 8, 71, -4, 16, -5, 34, -8, -20, 4, -6,
-5, -16, 5, 10, -1 },
        { -10, -15, -24, 6, -6, -16, -45, -11, -41, 10, -26, -16, -71, 23, 27, 1, -32, 22,
42, -7, -2, 10, 22, -7, -7 },
        { 15, 17, 27, 89, -13, -3, -4, -51, 13, -8, 7, 22, -17, -1, 0, 54, 5, 0, -4, -8,
-1, -13, -1, -8, 1 },
        { -7, 14, 17, 20, 1, -21, -4, -38, 15, 1, -26, 48, 3, -21, -5, -95, -17, 15, 2,
10, -6, 7, 9, 4, 0 },
        { 2, 1, 15, -3, 25, 9, 5, 30, 87, 6, -23, -8, -24, 20, -29, 13, -60, 2, 1, -11,
-4, 2, 23, -8, -3 },
        { -4, -13, -4, -8, 3, -10, -11, -35, 25, -17, -9, -48, -19, -56, 7, 2, -2, -63, 11,
42, 9, -14, 7, 40, -3 },
        { 2, 10, -12, 5, 52, 5, 8, 9, 25, 20, -5, 8, -63, 0, -2, -14, 82, -2, -2, -5,
23, 17, -16, -5, -8 },
        { 8, 7, 12, 24, 97, -1, -10, -1, -44, 35, 4, -15, 32, -15, -17, 3, -26, -8, 14,
-6, -6, -10, 2, 7, -6 },
        { 2, 2, 2, -25, 15, 0, -3, -10, -4, -40, 0, 7, -3, -70, -21, 34, -3, 67, 1, 13,
17, 41, 18, -17, -2 },
        },
    },
    { // 1
        {
        { 108, -49, -5, -4, -1, -43, 4, 10, 1, 2, -10, 14, 1, -2, 0, -3, 2, -4, 0, 0,
-2, 2, 0, 1, 0 },
        { 45, 17, -20, 1, -4, 91, -50, -13, 2, -2, -38, -21, 20, 4, 2, -13, 12, 11, -4,
0, -9, 5, 0, -3, 1 },
        { 23, -13, 4, -3, 1, 35, 56, -37, -4, -5, 59, -51, -30, 13, -2, -20, -34, 26, 12,
-1, -6, 4, 14, -6, -2 },
        { 31, 101, -50, -4, -9, -40, 12, -9, 4, 1, 0, -16, 0, 8, 0, 13, -13, 0, 3, -2,
1, -11, 6, 1, 0 },
        { -14, -9, 9, 2, 1, -47, -13, -10, 13, 1, -16, -67, 40, 20, 0, -26, 34, 52, -16,
-5, 8, 32, -9, -24, 0 },
        { -2, 3, 19, -7, 2, 10, 80, -35, -13, -2, -85, 7, -3, 8, 5, 6, 19, -2, 5, -2,
9, -6, -14, 1, -1 },
        { -18, -22, -31, 21, -1, -13, -20, 11, 0, 3, -51, 3, -38, 17, 5, 5, -56, 35, 39,
-7, -6, 18, 50, -16, -9 },
        { 9, 37, 43, -23, -1, 1, 5, 60, -28, 1, -11, -2, -30, -19, 9, -70, -1, -2, 13,
14, -7, 36, 2, 3, -2 },
```

-continued

```
    { 14, 18, 81, -36, 5, -12, -46, -32, 6, 5, -6, -15, -36, 27, 4, 40, -5, 1, 11,
-8, 4, -20, 9, 3, -4 },
    { -9, -1, -11, -5, 5, -20, -23, -77, 29, 6, 0, 37, -11, -2, 1, -76, 7, -12, 9, 8,
-1, 1, 11, 29, -2 },
    { -10, -22, -10, -3, 4, -11, -6, 10, -2, 1, -22, -76, 12, -17, 9, -7, -14, -60, 18,
24, 2, -32, 17, 52, 0 },
    { -2, -9, -38, 15, 1, 1, -13, 3, -22, 6, 9, -17, -76, 14, 17, 6, 67, -6, 20, -2,
38, 4, -29, 1, -10 },
    { 11, 11, 23, 28, -7, 13, 14, 21, 60, -19, 6, 5, 13, -12, -10, -5, 21, 0, 26,
-6, 71, -10, 47, -4, -31 },
    { -9, -13, -35,-102, 30, 9, 7, 13, -3, 7, 8, 11, 23, 26, -7, 3, 8, 1, 22, -5,
25, 8, 19, -3, -15 },
    { 4, 3, 3, -3, -3, -3, -8, -40, -32, 5, 7, 0, 16, -65, 15, 39, -6, -1, 18, 30,
30, 71, 9, 5, -7 },
    { 3, 3, 11, 24, -7, -5, -10, -9, -83, 14, 14, 13, 44, 14, 12, -21, 1, 21, 38,
-16, 23, -48, 10, 1, -13 },
  },
  {
    { 77, -50, 4, -3, 1, -73, 38, 5, 0, 1, 25, 1, -13, 2, -2, -6, -10, 7, 1, 0,
2, 6, 0, -2, 0 },
    { 62, 2, -20, -1, -3, 12, -57, 26, 0, 3, -58, 56, 0, -8, 2, 24, -9, -21, 9, -2,
-9, -7, 15, 0, -1 },
    { 54, -27, 10, -4, 0, 51, -4, -27, 2, -3, -23, -48, 37, 2, 2, -33, 54, 0, -16,
4, 7, -6, -23, 11, 0 },
    { -42, -43, 38, -3, 6, -35, 19, -7, 2, 1, -39, 29, 21, -7, 1, 22, 42, -45, -2,
-1, 20, -42, 0, 19, -4 },
    { -11, -67, 28, 7, 5, 57, 31, 1, -20, -1, -31, 12, -42, 18, 0, 21, -30, 32, 5,
-7, -14, 14, 1, -18, 5 },
    { 28, 22, 10, -15, 0, 37, 38, -46, 9, -5, 26, -4, -6, -6, -2, 19, -33, -41, 21,
0, 0, -51, 52, 11, -6 },
    { 13, 55, -10, -3, -5, -27, 43, -28, -10, 2, -62, -22, 1, 30, -1, 50, 2, 28, -19,
-6, -11, -5, -22, -4, 8 },
    { 11, 23, -35, 13, -4, 27, 49, 42, -32, -2, 10, 29, -44, -8, 6, -19, 30, -19, 4,
-3, 29, -25, -44, 16, -1 },
    { 10, -5, 19, 6, -6, 15, -16, -8, -9, 8, 54, 28, 15, 12, -16, 51, -4, -10, -54,
9, -37, -2, -48, 34, 11 },
    { 14, 44, 87, -43, -1, -4, -6, -12, -16, 9, -7, 32, -25, 6, -1, -40, 2, -2, 3, 1,
7, 26, -12, 0, -1 },
    { 9, 1, 23, 3, 1, -5,-51, 8, -11, 1, 29, -25, -33, 34, 8, 36, 26, 27, 12,
-29, 42, -53, 1, -30, 5 },
    { -10, -13, -16, 16, -6, -19, -33, -27, -27, 21, -21, -21, -39, 40, -5, -41, -33, -9,
-7, 14, -4, -26, 0, 67, -1 },
    { -4, -10, -39, -7, 8, 5, -2, -70, 33, 8, 9, 63, 1, 27, -16, -17, 6, 23, -8, -11,
44, 6, -12, -17, 1 },
    { 8, 16, 28, 68, -26, 6, 17, 26, -15, 1, -1, 20, 46, 23, -22, -21, -16, 25, -32,
-4, 33, -9, 41, 2, -2 },
    { -1, 5, -5, 39, -2, -11, 0, -33, -39, -2, 12, 23, 0, 12, 26, -25, 42, -8, 16,
-31, -73, -8, 19, -31, 15 },
    { 8, 5, 14, 65, -18, -2, -10, -39, -6, -2, 3, -9, -23, -26, 13, 37, 15, -17, 32,
19, 31, 55, -6, 16, -29 },
  },
},
{ // 2
  {
    { 120, -33, -6, -5, -2, 5, 0, -1, 0, 0, -26, 5, 1, 1, 0, -7, 1, 1, 0, 0, -4,
1, 0, 0, 0 },
    { -3, -1, -1, 0, 0, 118, -23, -9, -3, -3, 23, 1, -3, 0, -1, -33, 6, 3, 0, 1,
-16, 2, 1, 0, 0 },
    { -23, 18, -4, 2, -1, 19, 1, -2, -1, -1,-118, 15, 9, 2, 4, -22, -1, 4, 0, 1,
19, -3, -1, 0, 0 },
    { 3, -7, 3, -1, 0, 37, -14, 1, -2, 0, -12, -5, 0, 1, 0,112, -12, -11, -2, -4,
40, 3, -5, -1, -2 },
    { -30,-105, 47, -10, 12, -6, -22, 9, -1, 2, -7, 30, -10, 3, -2, -10, 11, -2, 1,
0, 9, 1, -2, 1, -1 },
    { 4, 13, 1, -1, 0, -18,-100, 35, -6, 8, -9, -54, 10, 0, 2, -7, 28, -10, 3, -2,
-3, 23, -4, 0, 0 },
    { 9, 5, -2, 0, -1, 1, -1, -2, 0, 0, 25, -11, 2, -2, 0, -40, -6, 5, 0, 2, 117,
-8, -12, -1, -3 },
    { -8, -31, 20, -4, 5, 10, 45, -4, 0, -3, -13, -98, 21, 0, 4, -8, -41, 2, 0, 1,
-8, 29, -6, 1, -1 },
    { 17, 47, 96, -30, 13, 6, 12, 43, -12, 3, 0, 5, -23, 8, -6, -3, -12, -14, 3, -1,
-2, -17, -4, 1, 0 },
    { 1, 8, 11, -4, 2, 5, 41, -10, -1, -4, -2, -4, -13, 2, -1, 5, 94, -23, -1, -3,
12, 68, -5, -4, -2 },
    { 4, 13, 34, -6, 5, -12, -31, -96, 24, -9, -7, -18, -50, 10, -4, 3, -2, 30, -7, 5,
0, 0, 13, -2, 2 },
    { -3, -14, -11, 4, -1, 5, 17, 5, 0, 0, -7, -46, -22, 9, -1, 4, 54, -20, 2, -2,
-1, -95, 24, -1, 4 },
```

```
        { -3, -6, -32, 11, -6, 0, 0, 15, 2, 1, -6, -2, -86, 20, -8, -12, -38, -68, 11, -2,
2, 23, 7, -3, 2 },
        { 6, 1, 38, 108, -34, 1, 0, 8, 29, -9, 0, 1, 0, -26, 8, -1, 1, -7, -6, 1,
-1, -3, -9, -2, 0 },
        { 1, 4, 8, -11, 6, -4, -9, -47, 15, -2, 3, 7, 44, 3, 1, -6, -2, -80, 22, -6,
-8, -20, -64, 12, -2 },
        { 1, -1, 5, 12, 1, -4, -1, -28, -96, 31, -2, -2, -16, -66, 17, -1, -2, -10, 8, -2,
0, -3, 0, 11, -1 },
    },
    {
        { -78, 44, -4, 4, -1, 76, -35, -1, -2, -1, -33, 7, 7, -1, 1, 9, 3, -5, 0, 0,
-3, -3, 1, 0, 0 },
        { 74, -6, -10, 0, -3, 23,-34, 11, -3, 2,-71, 36, 0, 0, 1, 45, -11, -8, 2, -2,
-17, -3, 7, -1, 1 },
        { 35, -46, 23, -7, 4, 77, 22, -27, 2, -5, -11, -35, 13, 1, 1, -44, 29, 3, -4, 2,
29, -7, -9, 4, -2 },
        { 46, 59, -40, 6, -8, 9, -57, 24, 0, 3, 40, -6, 5, -8, 1, -53, 17, -4, 4, 1,
20, -3, -1, 1, -1 },
        { -8, 27, -3, -1, -2, -52, 7, -13, 8, -1, -60, -28, 35, -5, 5, 4, 55, -20, -3, 0,
44, -36, -7, 8, -3 },
        { -23, -36, 8, 1, 3, -18, -19, 27, -8, 4, -30, 60, -32, 5, -2, -51, -17, 10, 8,
-1, 66, -1, 0, -7, -1 },
        { 2, -7, 59, -35, 11, -4, -48, -41, 27, -1, 42, 41, 25, -10, -6, 16, 7, -31, -2,
4, 8, -32, 12, 10, -3 },
        { 6, 31, 31, -21, 5, -24, -9, -40, 20, -2, -43, -2, 18, 0, -3, -59, -30, 20, -8,
9, -39, 51, -5, 3, -1 },
        { 20, 54, 5, -8, -2, 15, 37, -32, 11, -5, 10, 6, -10, 4, -5, 39, -46, 19, -5, 3,
73, 19, -13, -4, -2 },
        { -8, -34, 10, -1, 3, -12, -65, 12, -2, 3, 6, -43, 11, 6, 1, 38, 10, 28, -14, 3,
28, 58, -41, 4, -2 },
        { -10, -32, -48, 14, -8, 3, 8, -5, 22, -5, 3, 6, 66, -43, 10, -3, -37, -46, 17,
3, 17, 35, 18, 3, -7 },
        { -4, -1, -15, -73, 41, 5, 5, 43, 59,-28, -9, -27, -31, -21, 1, 5, 2, 1, 11, 7,
2, 1, 22, -6, -5 },
        { -5, -11, -55, -14, 7, 4, 14,-15, 31, -10, 7, 50, 12, 4, -11, -2, 24, 29,-44,
15, -15, -10, -61, 32, -3 },
        { 6, 23, 37, -9, 1, 9, 36, 40, -15, 1, 6, 39, 4,-19, 5, 5, 55,-37, 11, -4,
-3, 62, -25, 5, -7 },
        { 2, 9, 31, -19, 5, 5, 11, 66, -24, 12, -2, -15, 47, 5, -10, -8, -52, -7, -32,
14, 0, -36, -27, 32, -3 },
        { 4, 5, 28, 38, 3, -1, -2, 8, 18, -34, 0, 3, 3, -68, 43, 1, -10, 41, 35, -16,
-10, -30, -42, -11, -2 },
    },
},
{ // 3
    {
        { 112, -38, -12, -2, -3, -17, 33, -7, -1, -1, -24, 7, 11, -1, 1, -2, -4, 2, 2, 0,
-4, 0, 0, 1, 0 },
        { -8,-48, 20, 1, 3, 88, -13, -40, 5, -5,-23, 55, -5, -11, 0, -11, -4, 18, -1, 0,
-3, 1, -1, 2, 0 },
        { 34, -17, 9, -6, 2, -6, -74, 17, 17, 0, 39, 4, -64, 10, 0, -14, 46, -6, -21, 3,
-1, 0, 11, -3, -1 },
        { 25, 85, -27, -11, -5, 8, -8, -1, 4, -1, -1, 44, -9, -25, 3, -15, -3, 58, -5, -9,
3, -24, 1, 25, -1 },
        { 27, 46, -22, -2, -3, 78, -4, 35, -13, -4, -20, -36, 8, 37, -3, -8, 8, -42, 2,
12, -8, 9, 5, -16, 1 },
        { -11, -15, -58, 19, -2, 17, 53, -22, -27, 2, 61, 0, -2, -6, -5, -19, 47, 2, -16,
0, -4, -8, 35, -3, -3 },
        { 20, -2, 17, -3, -3, 14, -26, 4, -17, 5, 76, 1, 50, -9, -22, -20, -17, 2, 58,
-4, -7, 3, -37, 3, 11 },
        { -7,-37, 1,-21, 7, 24, 11, 68, -12, -11, 0,-33, -1, -3, 2, 21, 6, 44, -5,
-32, -4, -19, -1, 62, -3 },
        { -15, -16, 6, -3, 4, -18, 19, 50, -10, -11, -6, 46, 1, 52, -7, -64, -12, 4, 3,
37, 14, -40, -3, -12, 0 },
        { 11, 28, 87, -25, -3, 15, 61, -10, 31, -10, 32, -14, -18, 3, 13, -10, 11, -1, -11,
1, -7, -5, 9, -1, -1 },
        { -6, -9, -46, 7, -1, 11, 25, 1, 60, -9, 17, -10, -46, 7, 27, -3, -27, -1, 14, 3,
-8, 4, -67, -1, 27 },
        { 7, 4, -9, -23, 8, 4, 8, 18, -11, -23, 43, 52, -1, 28, 5, 69, -38, -10, -27,
14, 13, 36, 6, -3, -23 },
        { 9, -7, -2, 14, 6, 11, -17, -13, -3, 9, 21, -41, 6, -12, 29, -40, -67, 4, -50,
-3, 40, -12, 7, 1, -43 },
        { -11, -4, -16, -71, 14, -9, 7, 17, 0, -7, -9, 15, 4, -32, 10, -53, 4, -24, -3,
-41, -2, 60, 1, -9, -7 },
        { -1, -13, -15, -68, 6, 11, -3, 5, 7, 24, 3,-20, 2,-32, -5, 28, -2, 21, 7, 34,
13, -48, 7, -65, 7 },
```

-continued

```
        { 3, 0, 18, 52, -17, 10, 20, 62, -8, 50, 1, 25, -22, -57, 0, 6, -6, -8, -2, -9,
4, 15, -5, -35, -4 },
    },
    {
        { 110, -32, -9, -3, -2, -39, 29, 0, 1, 0, -24, -2, 7, 0, 1, 4, -3, -1, 0, 0,
-3, 2, 1, 0, 0 },
        { 25, -26, 5, -2, 1, 94, -10, -21, 0, -5, -33, 56, -5, -3, -1, -31, 0, 20, -2, 2,
-1, -9, 3, 3, 0 },
        { 31, -4, -4, -2, -1, 2, -37, 9, 1, 2, 79, 2, -37, 2, -6, -31, 65, 0, -10, 0,
-18, -8, 26, -1, 1 },
        { -4, -64, 17, 1, 4, 36, -11, -9, 1, -1, 5, -38, -1, 8, 0, 47, 12, -51, 2, -4,
-18, 58, 0, -17, 0 },
        { 31, 86, -33, 0, -7, 46, -1, 18, -9, 1, -27, -39, 9, 10, 1, 8, 17, -26, -2, 0,
-14, 18, 17, -10, 1 },
        { 30, 14, 8, -6, 0, 1, -84, 19, 8, 3, 14, -2, -6, 2, -2, 0, -47, -2, 20, -1,
26, 15, -62, 1, 1 },
        { 9, 1, -9, 3, -2, 33, 55, -9, -11, -2, 73,-17, 48, -7, -2, -28, -32, 0, 31, -1,
-12, 3, -33, 2, 5 },
        { 5, 39, -8, -2, -3, -20, 6, -52, 9, -1, 21, 68, -7, -26, 0, 30, -2, 3, -1, -2,
-15, 65, 0, -22, 1 },
        { -11, -3, 2, 5, 0, -22, 5, -10, 1, 3, -18, 6, -1, 19, -2, -86, -1, -56, 3, 16,
27, 25, 1, -53, 1 },
        { 8, 27, 96, -18, 3, -8, 1, -9, 23, -2, -15, -11, 2, 0, 1, -17, 3, 1, 21, 0,
-63, -8, -4, 1, 11 },
        { -17, -19, -56, 16, -1, -19, -26, 11, -4, 5, -25, 20, 26, 0, -4, -10, 24, -5, 37,
0, -76, -9, -32, -2, 22 },
        { -5, 3, -19, 0, 2, 9, 44, -4, 34, -8, -7, -15, -85, 12, 13, -5, 9, 4, -11, 0,
-9, 4, -66, 7, 12 },
        { -3, 1, 15,-21, 4, 4, 28, 92, -15, -9, 11, 57, -7, 39, -8, 17, -9, -15, 3, 9,
-8, 15, 2, -7, 1 },
        { 9, 12, 9, 23, -7, 5, 2,-34, 3, 4, 13, 23, -3, 32,-12, 48, 11,-46, 23, 27,
18, -71, -13, -29, 16 },
        { -1, 5, 22, -14, -3, -1, 13, 6, -24, 0, -16, 3, 19, -17, -20, 3, 78, 12, 41,
-20, 54, 19, -38, 13, 19 },
        { -2, -8, -11,-69, 17, 7, 1, 14, -4, 17, 0, -11, -3, -55, 11, 11, 0, 13, -7, 8,
-3, -27, -8, -78, 7 },
    },
  },
};
```

Figure 13:
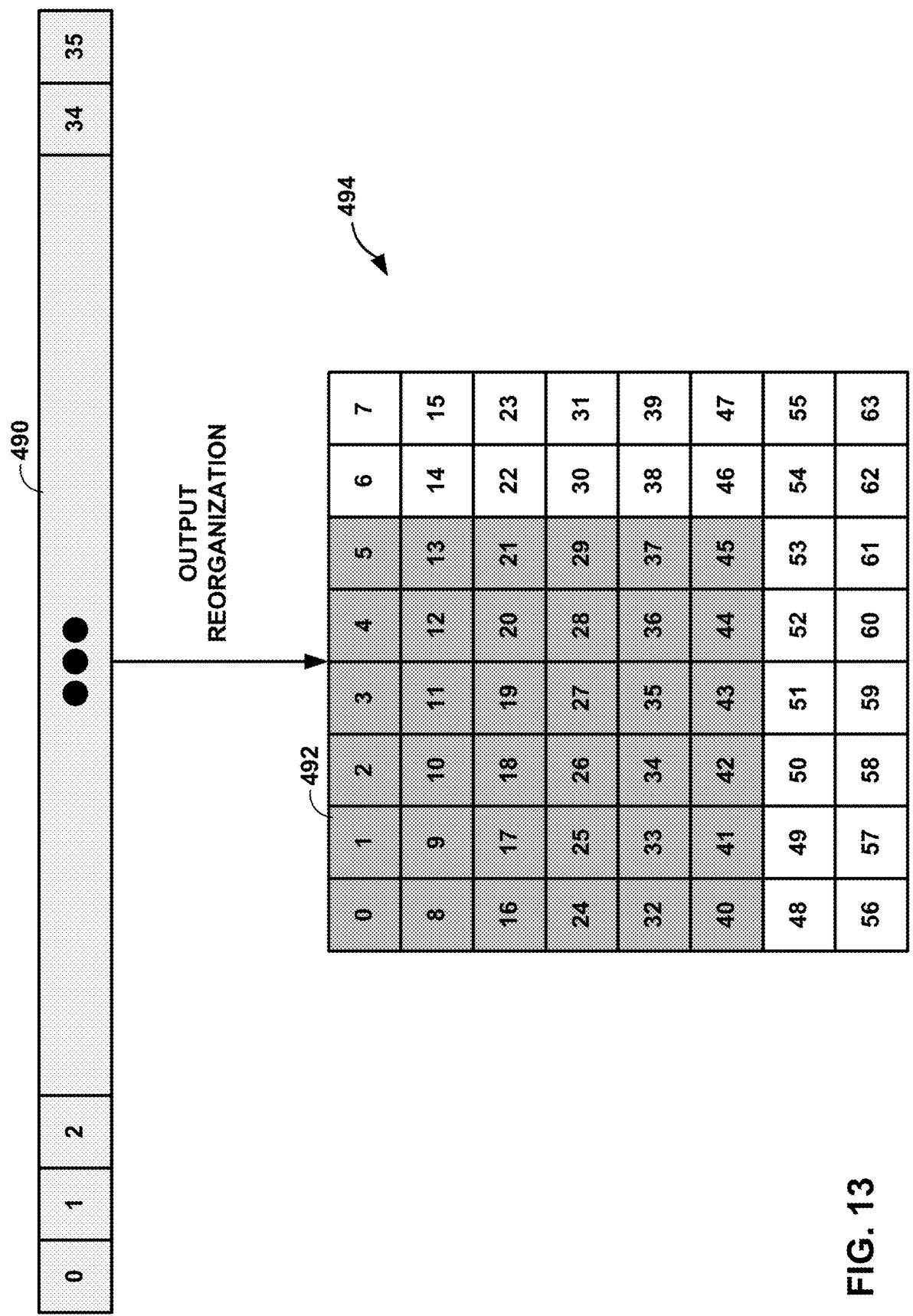
FIG. 13 is a conceptual diagram illustrating a 6×6 block pattern with 36 samples in 8×8 LFNST.

FIG. 13 is a conceptual diagram illustrating a 6×6 block pattern with 36 samples in an 8×8 LFNST. This example may simplify the VVC Draft 68×8 LFNST design by replacing the L-shaped, 48-sample support pattern with the 6×6-square pattern. Experimentation showed that the example of FIG. 13 with optimized transform matrices provides −0.01% all intra and 0.00% random access over VTM-6.0. The example of FIG. 13 may reduce the number of multiplications as well as memory used to store transform matrices for an 8×8 LFNST compared to the 8×8 LFNST of VVC Draft 6. The memory requirements and number of multiplications of the example of FIG. 13 may be identical to the techniques tested in Zhou, et al. "CE6-2.3a: Simplification with new LFNST transform basis," Joint Video Experts Team (JVET) of ITU-T SG 16 WP 3 and ISO/IEC JTC 1/SC 29/WG 11, 16th Meeting: Geneva, CH, 2-12 Oct. 2019, JVET-P0065 (hereinafter "JVET-P0065), where patterns with 36 samples are proposed. The example of FIG. 13 may further simplify CE6-2.3a by using a single 6×6-square block, while JVET-P0065 uses two irregular (non-square) separate patterns depending on the LFNST index. The example of FIG. 13 may simplify the existing LFNST design with negligible Bjontegaard rate differences (BD rate). 1-D list 490 may be reorganized and output as shown, with the coefficients in 1-D list 490 being reorganized into the top left 6×6 portion 492 of 8×8 block 494. The remaining coefficients in 8×8 block 494 may be normatively zeroed out. The optimized output reorganization patterns/scans may be specified in arrays g_lfnstRGScan8×8 and g_lfnstRGTranScan8×8. The set of optimized transforms (LFNST) matrices may be defined as g_lfnst8×8. A 6×6 block pattern with N=36 samples in 8×8 LFNST may include:

```
const int g_lfnstRGScan8x8[36] =
{ // 0 1 2 3 4 5 6 7 8 9 10 11 12 13 14 15 16 17 18 19 20 21 22 23
24 25 26 27 28 29 30 31 32 33 34 35
    0, 1, 2, 3, 4, 5, 8, 9, 10, 11, 12, 13, 16, 17, 18, 19, 20, 21, 24, 25, 26, 27, 28, 29,
32, 33, 34, 35, 36, 37, 40, 41, 42, 43, 44, 45
};
const int g_lfnstRGTranScan8x8[36] =
{ // 0 1 2 3 4 5 6 7 8 9 10 11 12 13 14 15 16 17 18 19 20 21 22 23
24 25 26 27 28 29 30 31 32 33 34 35
    0, 8, 16, 24, 32, 40, 1, 9, 17, 25, 33, 41, 2, 10, 18, 26, 34, 42, 3, 11, 19, 27, 35,
43, 4, 12, 20, 28, 36, 44, 5, 13, 21, 29, 37, 45
};
const int8_t g_lfnst8x8[4][2][16][36] =
{
    { // 0
        {
```

```
        {−116, 26, 22, 1, 5, 1, 31, −19, −3, 1, −1, 0, 18, −1, −5, 0, −1, 0, 1, 0,
0, 0, 0, 0, 4, 0, −1, 0, 0, 0, 1, 0, 0, 0, 0, 0 },
        { −21,−100, 49, 4, 9, 1, −36, 26, −15, 4, 0, 1, 29, 12, −10, −3, −2, −1, −4, 3,
2, −1, 0, 0, 6, 3, −2, 0, 0, 0, −1, 1, 0, 0, 0, 0 },
        { 12, −43, 0, 11, 0, 3, 101, −7, −34, 0, −4, 0, −38, 33, 7, −6, 2, −2, −8, −4,
7, 1, 0, 0, −7, 3, 1, 0, 0, 0, −3, 0, 1, 0, 0, 0 },
        { 22, −10, 16, −1, −2, −1, −4,−107, 16, 24, 3, 5, 23, 23, −39, −1, 1, 0, −4,
22, 2, −9, 0, −1, −2, 3, 1, 0, −1, 0, −1, 5, 0, −1, 0, 0 },
        { −33, −39, −82, 48, −3, 11, −30, −26, 18, −12, 8, −1, −27, 20, 22, −11, 0, −2, 25,
−5, −6, 3, −2, 0, −1, 6, 3, −3, 0, −1, 5, 0, 0, 0, −1, 0 },
        { 8, 2, −55, 19, −2, 4, 22, 17, −15, −9, 0, −1, 94, 9, −8, −8, −5, −3, −47, 9,
15, 0, 2, 0, 4, −6, 4, 0, 0, 0, −9, 0, 3, 1, 0, 0 },
        { 2, −32, −5, −13, 6, 1, 41, 6, 90, −28, −10, −4, 14, −38, −7, 36, −7, 3, 3, 8,
−32, 3, 5, 0, −7, 7, 2, −4, 1, 0, −1, 0, −6, 1, 0, 0 },
        { 0, −17, −17, 12, 1, 1, 7, −18, −54, 23, 2, 4, 1, −96, 4, 8, 6, 5, 15, 40,
−17, −10, 0, −3, −3, 7, 11, −4, −1, 0, 0, 4, 2, −1, 0, 0 },
        { 13, 19, 36, 93, −37, 8, 12, 22, 13, −1, 13, −8, 12, −3, −36, −14, 10, −1, 36,
0, −8, −6, −4, 1, −16, 5, 2, −7, 2, 0, 4, −4, −1, 0, −1, 0 },
        { −4, −2, 17, 42, −15, 3, −10, −12, 20, 6, 4, −2, −36, −30, 13, 1, 8, 2, −94,
−11, 12, 3, 6, 2, 37, −9, −15, −1, −1, 1, −9, 6, 1, −2, 0, 0 },
        { 16, 4, 32, 17, 3, −3, 5, −34, −7, −23, 5, 3, 36, −8, 85, −16, −23, 1, 16, −27,
−23, 39, −2, 1, 5, 6, −22, −4, 4, −1, −3, 3, 1, 1, 0, 0 },
        { 0, 4, −1, 7, 14, −7, 9, 22, 31, 86, −26, 1, 7, 20, 39, −33, 8, −3, 3, 34,
−35, −18, 5, −2, 12, −15, 1, 2, −3, 1, −6, 2, −3, −6, 2, 0 },
        { 0, 8, 18, 9, 18, −6, −6, 3, 6, −56, 8, 4, −15, 13, 20, −26, −18, 2, −13, 93,
13, −5, −6, −8, −16, −19, 22, 8, −1, 1, 2, −3, −5, 7, 0, 0 },
        { 7, 2, −5, 0, 10, −2, 11, 4, 0,−21, 3, 1, 0, 2,−20, −7, −3, 1, 37, 18,
4, −6, −7, −2, 105, 5, −30, 5, −6, −1, −33, 9, 9, −2, 2, −1 },
        { −7, −11, −1,−38,−107, 29, 1, −1, 3, −3, 3,−12, 6, 5, 25, −2, 25, −6, 5, 25,
4, 1, −6, 1, 8, −5, −3, 7, 5, −2, −4, 0, 0, 0, 1, 1 },
        { −1, 13, 3, 14, −9, 4,−13, 3, −30, −12, −15, 3, −4, 38, 2, 67, −5, −11, −16,
22, −66, −4, 35, −3, 11, 17, 6, −36, 0, 2, −4, −3, 10, 3, −3, 0 },
    },
    {
        {−103, 53, 9, 0, 1, 1, 50, −10, −12, −1, −1, 0, 8,−12, 0, 2, 0, 0, 2, −1,
2, 0, 0, 0, 1, −1, 0, 0, 0, 0, 1, 0, 0, 0, 0, 0 },
        { −58, −59, 46, 5, 6, 1, −55, 41, 16, −9, 1, −1, 37, 17, −22, −4, −1, −1, 5, −7,
−5, 4, 0, 0, 7, 1, −2, 0, −1, 0, 1, −1, −1, 0, 0, 0 },
        { 0, −83, 23, 17, 4, 3, 87, −7, −6, −5, −6, −1, −23, 5, 2, −4, 1, 0, −12, 8,
3, −1, 1, 0, −6, 6, −1, −1, 0, 0, −3, 2, 0, 0, 0, 0 },
        { 33, 24, 30, −23, −1, −5, 30, 78, −40, −21, −1, −3, 22, −35, −35, 15, 4, 3, −18,
−18, 13, 10, 0, 1, −2, −2, 3, 0, −1, 0, −4, −3, 3, 1, 0, 0 },
        { −7, −23, −87, 34, 6, 6, 12, 16, −13, 20, −4, −1, 69, −6, 2, −3, −10, −1, −20,
−18, 12, 0, 0, 2, −4, 3, 10, −4, 0, 0, −4, 0, 2, −2, 0, 0 },
        { 24, 28, 15, 3, −10, 0, 33, −17, 57, −20, −8, −1, 46, 50, −39, −35, 5, −2, −7,
−22, −32, 15, 11, 1, −9, −4, 5, 9, −1, −1, −2, −1, −2, 1, −1, 0 },
        { 16, −7, 47, −21, 0, −3, −6, −72, −23, 22, 7, 4, 69, −30, 0, 19, −7, 1, −19,
12, 17, −9, −4, 0, −4, 9, −3, −5, 1, 0, −4, 5, 0, −1, 0, 0 },
        { −3, −11, −18, −63, 17, −1, 9, −5, −59, 6, 23, −2, 8, 71, −4, 16, −5, −7, 34, −7,
−20, 4, −7, 1, −5,−16, 5, 10, −1, 1, 1, −1, 5, 0, −2, 0 },
        { 10, 14, 24, −6, 6, −4, 16, 45, 12, 41, −10, −4, 25, 16, 70, −22, −28, −1, −2,
32, −22, −42, 7, 1, 2, −10, −22, 7, 7, 0, −3, −3, −2, 0, 0, 0 },
        { −15, −17, −27, −90, 13, 4, 3, 3, 51, −13, 9, −3, −7, −22, 16, 2, 0, −1, −54, −5,
1, 4, 8, 1, 0, 13, 1, 7, −1, −2, 0, 0, −5, 1, −1, 0 },
        { 6, −14, −18, −20, −3, 4, 20, 3, 36, −20, −1, 1, 27, −48, −2, 19, 7, 1, 94, 21,
−15, −2, −10, −4, 6, −7, −11, −3, 0, 1, −7, −2, 1, 4, 1, 0 },
        { −3, −1, −14, 2, −27, 6, −10, −5, −34, −82, −7, 16, 20, 10, 24, −23, 30, 2, −19,
57, −3, −1, 13,−12, 4, −2,−22, 9, 3, −2, −1, −3, 3, 10, −1, −1 },
        { −4, −13, −4, −9, 2, 0, −9, −10, −33, 28, −17, 4, −10, −47, −18, −54, 5, 14, 3,
−7, −62, 11, 42, 0, 8, −14, 8, 40, −3, −7, −1, 4, 11, −3, −6, 0 },
        { −2, −10, 12, −8, −59, 11, −4, −5, −7, −19, −22, 16, 4, −4, 59, 3, 2, 3, 14, −78,
5, 0, 4, 4, −23, −16, 16, 3, 9, 1, 3, 11, 2, −4, 2, −3 },
        { −7, −5, −11, −23, −87, 19, 2, 11, 2, 49, −31, 12, −6, 16, −39, 14, 15, 2, −4,
31, 8,−13, 5, −3, 10, 12, −3, −8, 5, −2, −1, −8, −3, −1, 3, 0 },
        { 2, 2, 1, −25, 18, −5, −1, −3, −11, −6, −39, 1, 0, 9, −3, −66, −22, 20, 34, −2,
64, 0, 14, 5, 15, 41, 17, −18, −1, −7, 0, −3, −18, −3, 8, 0 },
    },
},
{ // 1
    {
        { 108, −49, −5, −4, −1, −1, −43, 4, 10, 1, 2, 0, −10, 14, 1, −2, 0, 0, −3, 2,
−3, 0, 0, 0, −2, 2, 0, 1, 0, 0, −1, 0, 0, 0, 0, 0 },
        { 44, 17, −20, 1, −4, 0, 91, −49, −13, 2, −2, 1, −37, −21, 20, 4, 2, 1, −13, 12,
11, −4, 0, −1, −9, 5, 0, −3, 1, 0, −3, 4, −1, 0, 1, 0 },
        { 23, −13, 4, −3, 1, −1, 34, 56, −37, −4, −5, −1, 59, −51, −30, 13, −2, 3, −20,
−34, 26, 12, −1, 2, −6, 4, 15, −6, −2, 0, −7, 1, 3, −3, 1, 0 },
        { −31,−101, 50, 4, 9, 2, 39, −12, 10, −4, −1, −1, 0, 16, 0, −8, 0, −1, −13, 13,
1, −4, 2, −1, −1, 11, −6, −2, 0, −1, −2, 4, −4, 0, 0, 0 },
```

-continued

```
        { -13, -8, 9, 2, 1, 0, -47, -13, -9, 13, 1, 3, -14, -66, 39, 19, 0, 3, -26, 33,
52, -16, -5, -3, 8, 33, -8, -25, 0, -2, 1, 7, -15, -4, 5, 0 },
        { 1, -3, -19, 7, -2, 2, -10, -80, 35, 13, 2, 3, 84, -5, 2, -9, -5, -2, -5, -20,
2, -4, 2, 0, -10, 5, 15, -1, 1, -1, -4, 8, 0, -6, 0, -1 },
        { -17, -19, -27, 19, -1, 5, -12, -16, 12, -1, 2, 0, -53, 5, -37, 15, 5, 2, 3,
-56, 33, 39, -6, 5, -6, 18, 51, -15, -10, -2, 6, 12, -2, -19, 0, 0 },
        { -10, -38, -38, 22, 1, 5, -4, -11, -60, 28, -1, 5, 6, -3, 27, 22, -8, 1, 68, 0,
3, -10, -14, 0, 7, -38, 1, -1, 1, 4, -3, -6, 23, 0, 1, 0 },
        { -14, -20, -84, 38, -5, 10, 13, 46, 27, -5, -5, -3, 8, 17, 36, -24, -5, -4, -30,
4, 2, -12, 6, 0, -3, 19, -11, -7, 4, -2, 1, -3, -13, 4, 2, 0 },
        { -12, -6, -12, -3, 5, 0, -21, -16, -58, 24, 5, 5, -8, 8, 2, -9, 2, -2, -80, 1,
-29, 12, 16, 2, -4, -9, 17, 45, -1, 0, 5, 12, 26, -2, -14, -2 },
        { 6, 17, 2, -2, -1, -2, 2, -8, -48, 15, 2, 2, 21, 80, -21, 14, -6, -3, -14, 16,
43, -9, -17, -1, 1, 28, -11, -35, -2, 1, 2, -7, -30, -1, 9, 2 },
        { 4, 13, 39, -14, -2, -3, 3, 21, 0, 21, -7, 1, -3, 24, 77, -13, -18, -2, 1, -53,
8, -21, -2, 4, -32, -2, 31, -7, 6, 1, 0, 26, 1, -23, 1, -3 },
        { 8, 6, 6, 2, -1, -2, 14, 14, 14, 32, -10, 0, 13, 4, 12, -9, -6, -1, 4, 42,
-8, 30, -3, -2, 67, 1, 45, -1, -38, -2, 2, -4, -3, -57, -8, 6 },
        { -8, -15, -31, -80, 22, -4, 0, -4, -25, -15, 10, 1, 4, -7, 14, -18, 5, 0, 31,
-10, -23, 14, 20, -2, 6, 51, 4, 8, -3, -9, 11, 2, -40, -1, -2, -1 },
        { 10, 10, 28, 69, -22, 6, -5, -7, -34, 9, -6, 3, -3, -16, -11, -60, 10, 2, 27,
-11, -17, -5, 26, 0, 4, 43, -3, 9, 5, -9, 12, 0, -26, 0, -5, -2 },
        { 2, 4, 5, 19, -8, 4, -7, -7, -23, -97, 18, -2, 18, 13, 33, -3, 21, -3, 5, 25,
18, 32, -4, -9, -13, -6, 18, 5, -12, -2, -1, 19, 14, -16, -7, 0 },
    },
    {
        { 77, -50, 4, -3, 1, -1, -73, 38, 5, 0, 1, 0, 25, 1, -13, 2, -2, 1, -6, -10,
7, 1, 0, 0, 2, 6, 0, -2, 0, 0, -2, -2, -1, 1, 0, 0 },
        { -61, -2, 20, 1, 3, 0, -12, 57, -26, 0, -3, 0, 58, -56, 0, 8, -2, 2, -24, 10,
21,-10, 2, -2, 9, 6, -16, 1, 1, 0, -2, -5, 5, 3, -1, 0 },
        { -54, 27, -10, 4, 0, 1, -51, 4, 27, -2, 3, -1, 23, 47, -37, -2, -2, -1, 32, -54,
0, 16, -4, 3, -7, 7, 23, -11, 0, -1, 5, 1,-13, -1, 2, 0 },
        { 40, 36, -35, 4, -5, 1, 38, -18, 8, -3, -1, -1, 33, -29, -22, 7, -1, 2, -21, -40,
48, 1, 0, 0, -20, 45, -4, -21, 4, -3, 2, -10, -18, 14, 1, 1 },
        { -15, -70, 31, 7, 5, 1, 52, 32, 1, -20, -1, -4, -35, 14, -39, 18, 0, 3, 22,
-24, 29, 5, -7, 2,-13, 12, -1,-17, 5, -1, 1, 1, -6, 9, 1, -1 },
        { -28, -17, -8, 13, 0, 3, -40, -32, 42, -9, 5, -1, -29, 8, 7, 5, 2, 0, -15, 37,
32, -21, 0, -4, 3, 43, -55, -7, 6, -2, 13, -26, -4, 25, -5, 3 },
        { -17, -58, 13, 2, 5, 1, 21, -47, 28, 12, -2, 2, 55, 18, 5, -29, 1, -5, -51, 1,
-22, 18, 5, 1, 10, 13, 23, -1, -8, 0, -7, 7, -15, -10, 4, 0 },
        { 11, 9, -26, 14, -4, 2, 32, 25, 31, -26, 1, -5, 32, 31, -41, -2, 0, -1, -9, 9,
-23, -2, 1, 0, 17, -29, -39, 32, -1, 3, 3, -38, 48, 6, -10, 3 },
        { -2, 21, -19, -8, 4, -1, -2, 39, 20, -4, -9, -1, -43, -6, -26, -19, 17, -2, -48,
24, -1, 47, -10, 3, 46, -4, 20, -35, -9, 3, -16, -2, -27, 6, 16, -3 },
        { 17, 40, 81, -42, 0, -9, 7, 7, -18, -8, 5, -1, 10, 43, -9, -6, -3, -2, -17, 7,
-17, -7, 3, 0, -2, 26, -23, -1, 2, -1, 7, -17, -31, 16, 0, 2 },
        { 3, -7, -33, 7, 4, 2, 23, 40, 12, 17, -14, 1, 29, 21, 38, -36, 1, -4, 48, 26,
-18, -13, -3, -4, -13, 3, -21, -31, 8, -1, -9, 3, -47, 28, 10, -2 },
        { -10, -5, -29, 5, -3, 3, 45, -9, 6, 2, -2, -34, 13, 23, -23, -7, 0, -41, -28,
-26, -7, 29, -1, -36, 45, 8, 42, -10, -3, 31, -6, -4, -16, -13, 6 },
        { 9, 21, 40, 13, -11, 0, 2, 15, 80, -42, -6, -3, 0,-37, 5,-16, 11, 0, 10,
13, -7, -6, 4, -3, -36, 1, 12, 8, 0, 0, 7, 38, 1, -21, -3, -2 },
        { -7, -12, -2, -27, 14, -2, -13, -20, -8, 5, -9, 4, -11, -43, -29, -30, 26, 1, 1,
-18, -38, 29, 5, 0, -44, -19, -20, 9, 18, 4, 2, -6, 3, 65, -4, -3 },
        { 4, -4, 19, -18, 0, 0, 7, -3, 22, 34, -7, -1, -5, -37, 2, -27, -6, 6, 52, -13,
-2, 24, 19, -5, 38, 27, -1, 8, -36, 0, 16, -58, 8, -22, 5, 10 },
        { 2, -4, -15, 23, -5, 2, -5, -12, -40, -38, 13, 0, 18, -5, -32, 17, 20, -3, 24,
55, -22, 36, -8, -6, -21, 27, 13, 3, -24, 4, 40, -7, -24, -20, 3, 3 },
    },
},
{ // 2
    {
        {-120, 33, 6, 5, 2, 2, -5, 0, 1, 0, 0, 0, 26, -5, -1, -1, 0, 0, 7, -1, -1,
0, 0, 0, 4, -1, 0, 0, 0, 0, 2, -1, 0, 0, 0, 0 },
        { 3, 1, 1, 0, 0, 0, -118, 23, 9, 3, 3, 1, -23, -1, 3, 0, 1, 0, 32, -6, -3,
0, -1, 0, 16, -2, -1, 0, 0, 0, 5, -1, 0, 0, 0, 0 },
        { 23, -18, 4, -2, 1, -1, -20, -1, 2, 1, 1, 0, 118, -15, -9, -2, -4, -1, 23, 1,
-4, 0, -1, 0, -19, 4, 1, 0, 0, 0, -7, 1, 1, 0, 0, 0 },
        { -3, 5, -2, 1, 0, 0, -36, 13, -1, 1, 0, 1, 13, 5, 0, -1, -1, 0, -112, 12,
11, 2, 4, 1, -38, -3, 5, 1, 1, 0, 15, -3, -1, 0, 0, 0 },
        { 30, 105, -47, 10, -12, 2, 5, 23, -10, 1, -2, 0, 7, -30, 10, -3, 2, -1, 7, -11,
2, -1, 0, 0, -11, -1, 3, -1, 1, 0, -6, -1, 1, 0, 0, 0 },
        { 5, 14, 0, -1, 0, 0, -17, -99, 35, -6, 8, 0, -7, -55, 11, 0, 2, 1, -9, 27,
-10, 3, -2, 0, 5, 22, -5, 0, -1, 0, 8, 8, -2, 0, 0, 0 },
        { -9, -5, 3, -1, 1, 0, -5, -7, 5, -1, 1, 0, -27, 7, -1, 2, 0, 1, 32, 9, -5,
0, -2, 0, -113, 11, 11, 1, 3, 1,-35, -1, 5, 0, 1, 0 },
        { 8, 31, -20, 4, -5, 1, -9, -45, 4, 0, 3, 1, 12, 97, -21, 0, -4, -1, 9, 41,
-2, 0, -1, -1, 6, -29, 7, -1, 1, 0, 4, -7, 0, -1, 0, 0 },
        { -2, 1, -1, 1, 0, 0, -9, -1, -1, 1, 1, 0, 2, 4, 0, 0, 0, 0, -24, 10, -1,
```

```
1, 1, 0, 33, 13, −4, 0, −1, 0, −119, 7, 13, 1, 3, 1 },
    { −17, −48, −96, 31, −13, 12, −6, −13, −42, 12, −3, 4, 0, −5, 22, −8, 6, −2, 3,
10, 14, −3, 1, −1, 1, 16, 4, −1, 0, −1, 4, 4, 2, −1, 0, 0 },
    { −1, −7, −10, 3, −2, 2, −6, −41, 11, 1, 4, 0, 3, 6, 13, −2, 1, 0, −7, −95,
22, 1, 3, 2, −9, −65, 4, 4, 2, 2, −16, 6, −3, 1, 0, 1 },
    { 4, 13, 34, −6, 5, −3, −12, −32, −95, 24, −9, 8, −7, −17, −50, 10, −5, 4, 3, −3,
29, −6, 5, −2, 0, 1, 13, −2, 2, −1, 0, 3, 6, −1, 1, 0 },
    { −2, −13, −3, 2, 1, 1, 3, 11, 0, 1, 0, 0, −5, −44, 0, 5, 1, 2, 5, 53, −3,
−1, −1, −1, 2,−89, 21, 0, 3, 1, −11, −53, 4, 3, 1, 2 },
    { 4, 9, 32,−12, 6, −5, −1, −4,−17, −1, −1, −1, 8, 13, 87,−22, 8, −5, 11, 24,
71, −11, 3, −3, −2, 1,−13, 4, −3, 0, −2, −7,−13, 3, −1, 0 },
    { 6, 2, 41, 105, −35, 22, 1, 0, 8, 27, −9, 3, 0, 1, −2, −26, 8, −8, −1, 0,
−6, −6, 1, −2, −1, −1, −9, −2, 0, −1, 0, −3, −2, −1, 0, 0 },
    { −1, −2, 0, 1, −3, 0, 2, 14, 4, −2, −1, 0, −3, −12, −7, −3, 2, 0, 4, 31, 9,
−3, 0, −2, −4, −41, 2, 1, 2, 0, 0, 113, −20, −5, −2, −3 },
  },
  {
    { −78, 44, −4, 4, −1, 1, 76, −35, −1, −2, −1, −1, −33, 7, 7, −1, 1, 0, 9, 3,
−5, 0, 0, 0, −3, −3, 1, 0, 0, 0, 1, 1, 0, 0, 0, 0 },
    { 74, −6, −10, 0, −3, 0, 23,−34, 11, −3, 2, −1,−71, 36, 0, 0, 1, 0, 46, −11,
−8, 2, −2, 0, −18, −3, 7, −1, 1, 0, 5, 3, −2, 0, 0, 0 },
    { −36, 45, −23, 7, −4, 2, −76, −20, 26, −2, 5, 0, 12, 34, −13, −1, −1, −1, 44,
−29, −3, 4, −2, 1, −30, 8, 9, −4, 2, −1, 15, 0, −7, 1, −1, 0 },
    { −46, −59, 40, −6, 8, −1, −7, 57, −24, 0, −3, −1, −39, 5, −5, 8, −1, 2, 52, −17,
5, −4, −1, −1,−21, 3, 0, −1, 1, 0, 7, 1, 0, 0, 0, 0 },
    { 11, −24, 3, 0, 2, 0, 54, −5, 10, −7, 1, −2, 60, 20, −31, 5, −4, 0, −6, −51,
20, 2, 1, 2, −48, 38, 6, −7, 2, −1, 26, −7, −12, 4, −1, 0 },
    { 22, 38, −8, −1, −3, 0, 12, 18, −28, 9, −4, 2, 21, −64, 36, −5, 2, 0, 44, 25,
−11, −9, 2, −3, −60, −1, −1, 8, 0, 1, 26, 2, 1, −2, −1, 0 },
    { −2, 14, −31, 19, −7, 4, −13, 29, 17, −13, 1, −3, −62, −34, −10, 7, 4, 1, −47,
−10, 32, −1, 1, 0,−13, 49, −15, −5, 1, −1, 37,−21, −6, 7, −2, 1 },
    { −3, −13, −58, 36, −10, 8, 25, 39, 50, −30, 2, −5, 15, −22, −28, 6, 6, −1, 45,
11, 4, 7, −9, 1, 19, −21, −2, −8, 3, 0, −33, 2, 6, 4, 1, 0 },
    { 21, 59, 8, −11, −1, −3, 11, 35,−38, 14, −5, 2, 4, 3, −5, 4, −5, 2, 29,−53,
24, −6, 5, −1, 50, 28, −13, −3, −2, −2, −35, −14, 2, 3, 1, 1 },
    { 4, 25, −8, 1, −2, 0, 3, 42, −9, 2, −2, 0, −17, 17, −6, −3, 1, −1, −47, −20,
−10, 10, −1, 3, −58, −33, 37, −7, 4, 0, −56, 36, −8, −3, 3, −1 },
    { 6, 20, 44, −13, 9, −6, −8, −25, 7, −19, 6, −3, −4, −15, −54, 41, −9, 8, 4, 31,
52, −21, −1, −2, −30, −19, −29, −1, 6, −1, −29, −2, 19, 8, −3, 1 },
    { 12, 35, 14, −4, 1, −3, 12, 43, −4, −10, −1, −3, 3, 28, −39, 14, −5, 2, −4, 20,
−6, 5, −5, 1, 26, −46, 18, −4, 2, 1, 78, 13, −13, −3, −2, −2 },
    { 0, −1, 24, −23, 15, −7, −5, −24, 22, 8, −6, 2, −9, −62, −23, −3, 6, 1, 12, −14,
3, 25, −5, 3, 22, 15, 50, −28, 2, −3, −1, 44, −49, 3, 4, −2 },
    { −5, −3, −37, −69, 39, −13, 7, 17, 35, 63, −29, 6, −4, 6, −20, −19, −3, 6, 2,
16, 7, −8, 13, −7, −8, −4, −10, 11, −7, 2, 0, −17, 7, −3, 2, 1 },
    { 7, 24, 55, −7, 2, −4, 5, 24, 43, −20, 3, −3, 1, 10, −3, −22, 10, −5, 1, 29,
−48, 32, −10, 4, −9, 37, 6, −9, −6, 1, −19, −53, 3, 1, 4, 1 },
    { −2, −5, −27, 15, −6, 2, −3, −1, −55, 18, −9, 6, 5, 33, −28, −1, 6, −2, 9, 69,
13, 15, −10, 1, −4, 45, 12, −30, 4, −3, −15, 2, −34, 13, 2, −1 },
  },
},
{ // 3
  {
    {−112, 38, 12, 2, 3, 1, 17, −33, 7, 1, 1, 0, 24, −7, −11, 1, −1, 0, 2, 4,
−2, −2, 0, 0, 4, 0, 0, −1, 0, 0, 1, 1, 0, 0, 0, 0 1,
    { −8,−48, 20, 1, 3, 1, 88, −13, −40, 5, −5, 1,−23, 55, −5, −11, 0, −2, −11, −4,
18, −1, 0, 0, −3, 1, −1, 2, 0, 0, −3, −1, 2, 0, 1, 0 },
    { 34, −17, 9, −6, 2, −2, −6, −74, 17, 17, 0, 4, 39, 4, −64, 10, 0, 2, −14, 46,
−6, −21, 3, −3, −1, 0, 11, −3, −1, 0, −3, 6, 1, −2, 0, 0 },
    { 24, 84, −27, −11, −5, −2, 7, −8, −1, 4, −1, 0, −1, 44, −9, −25, 3, −4, −15, −3,
59, −5, −9, −1, 3, −24, 1, 25, −1, 1, −4, 0, −4, 0, 4, 0 },
    { 27, 46, −22, −2, −3, −2, 78, −5, 35, −13, −4, −3, −20, −35, 8, 37, −3, 4, −8, 8,
−42, 2, 12, 0, −8, 9, 6, −16, 1, 1, −2, −2, 1, 1, −2, 0 },
    { −12, −15, −58, 19, −2, 5, 16, 53, −22, −26, 2, −5, 59, 1, −3, −6, −4, −1, −18,
47, 2, −18, 1, −4, −3, −7, 37, −3, −4, −1, −2, −4, 1, 9, −1, 0 },
    { −19, 3, −15, 3, 3, 1, −15, 24, −4, 18, −5, 2, −78, 0, −50, 9, 21, 0, 20, 16,
−3, −57, 5, −4, 7, −3, 37, −4, −11, 0, 6, −6, 0, 5, −1, 0 },
    { −7, −37, 1, −18, 7, −1, 23, 12, 65, −12, −11, −3, −1, −31, −2, 0, 2, 5, 19, 6,
41, −6, −30, 1, −3, −20, 0, 62, −3, −2, −4, 5, −31, −1, 13, 0 },
    { −14, −15, 7, −1, 3, −3, −18, 18, 45, −9, −10, 0, −6, 45, 2, 53, −7, −5, −63,
−12, 3, 3, 40, −2, 14, −41, −2, −15, 0, 10, −1, 1, −11, 1, −3, 1 },
    { −13, −28, −92, 26, 2, 6, −13, −54, 9, −22, 8, 2, −31, 13, 10, −2, −9, 1, 8,
−11, 0, 13, 0, −2, 5, 5, −21, 0, 7, 0, 1, 10, 0, −15, 0, 0 },
    { 6, 0, 21, −2, 0, −2, −10, −40, 3,−51, 9, 2, −13, 9, 44, −8, −24, 1, 6, 2,
2, −15, −3, 1, 16, 0, 57, 0, −37, 1, 0, −12, −3, 58, −2, −7 },
    { −8, 6, 18, −3, −7, −1, −13, 2, 3, −10, 5, −2, −38, 14, 9, −3, −32, 3, 5, 75,
2, 49, −4, −22, −35, −7, 12, 2, 46, −2, 8, −18, 0, −14, 1, 11 },
    { 0, 4, −10, −30, 6, −5, −2, 15, 28, −8, −26, 0, 27, 63, −4, 28, −7, −13, 72, −3,
−9, −1, 11, −2, −6, 42, 2, −1, −1, −3, −7, −6, 19, 1, 10, −1 },
```

-continued

```
    { -9, -14, -14, -65, 8, 1, 3, 9, 39, 2, 10, -4, -7, -1, -2, -49, 4, 13, -24, 1,
8, 2, -20, 3, 2, 11, -1, -42, -2, 5, 10, 1, 48, 6, -43, -1 },
    { -7, 4, -1, -6, 6, 1, -15, 3, 1, -4, -15, 1, -12, 15, 3, 4, 8, 5, -62, 4,
-28, -4, -43, 9, -2, 57, 0, 35, -5, -41, -12, -9, 13, -3, 46, -3 },
    { -2, -6, -21, -69, 28, -3, -6, -25, -42, 9, -32, 1, 5, -22, 32, 27, 23, -15, -7,
-4, 6, -8, 13, 1, 0, -14, 24, 7, 26, 1, 6, -25, -12, -14, 3, 29 },
    },
    {
    { 110, -32, -9, -3, -2, -1, -39, 29, 0, 1, 0, 0, -24, -2, 7, 0, 1, 0, 4, -3,
-1, 0, 0, 0, -3, 2, 1, 0, 0, 0, 0, -1, 0, 0, 0, 0 },
    { -25, 26, -5, 2, -1, 0, -94, 10, 21, 0, 5, 0, 33, -56, 5, 3, 1, 1, 31, 0,
-19, 2, -2, 1, 1, 9, -3, -3, 0, -1, 4, 1, 0, -1, 0, 0 },
    { 30, -4, -4, -2, -1, 0, 2, -36, 9, 1, 2, 1, 78, 1, -36, 2, -6, 1, -31, 65,
-1, -11, 0, -3, -18, -8, 27, -1, 1, 0, -1, -7, 0, 6, 0, 1 },
    { 3, 59, -16, -1, -4, -1, -36, 10, 9, -1, 1, 0, -4, 36, 1, -7, 0, -2, -47, -12,
51, -2, 4, -1, 18, -60, -1, 19, -1, 3, 6, 3, -23, 2, 1, 0 },
    { -18, -79, 32, -1, 7, 0, -38, -26, -10, 10, 0, 3, 32, 31, -11, -7, -2, -2, -6,
-28, 21, 8, 0, 2, 20, -11, -37, 10, 0, 2, -3, 26, -10, -13, 2, -2 },
    { -39, -47, 9, 5, 3, 2, -18, 69, -23, -3, -3, -1, -7, 14, 4, -5, 1, -1, 0, 32,
10, -16, 0, -3, -18, -20, 51, 3, -1, 0, 13,-35, -9, 21, 0, 2 },
    { -1, 31, -7, -3, -2, -1, -24, 17, -42, 6, -1, 1, 25, 63, 0, -22, 0, -5, -2, -7,
4, 3, 1, 0, -6, 52, -4, -27, 2, -5, -11, -9, 62, -6, -5, -1 },
    { -7, 3, 10, -4, 2, -1, -37, -60, 5, 13, 2, 4, -68, 26, -46, 3, 1, 1, 28, 25,
1, -28, 2, -5, 14, 6, 29, -5, -6, -1, 1, -7, 8, 11, -1, 0 },
    { 12, 15, -4, -4, -1, -1, 15, -4, -8, 2, -3, 1, 24, 13, 0, -23, 1, -4, 90, 0,
48, -3, -15, -1, -28, -2, 1, 45, -1, 3, -14, -3, -23, 2, 11, 0 },
    { 13, 10, 63, -11, 1, -4, -7, -40, 3, 4, 3, 2, 8, 0, 46, -5, -4, -1, -11, -34,
-1, 24, 0, 4, -22, 0, 21, -2, -1, 0, 9, -61, -4, 37, -1, 5 },
    { 8, -3, -7, 0, -2, 0, 13, 5, 2,-17, 0, -2, 28, -3, 10, 0, -4, -1, 11,-25,
0, -27, 1, -1, 85, 13, 41, 0, -28, -1, -26, 13, 1, 52, 0, -1 },
    { -12, -31, -87, 21, -3, 7, -11, -42, 17, -27, 7, -3, -3, 25, 50, -5, -8, -2, 5,
1, -4, 18, 0, 1, -10, -2, 7, -4, 3, 0, 5, -18, 0, 8, -2, 2 },
    { 6, 9, -14, 26, -6, 5, -5, -26,-103, 15, 9, 5, -3, -34, 6, -26, 4, -2, -9, 5,
-11, 0, -1, 1, 9, -9, 1, -2, -2, 0, 15, 7, -31, 5, 2, -1 },
    { -1, -15, -4, -20, 4, 0, 9, -11, 9, -6, 4, -2, -7, -48, 6, -52, 9, -1, -6, 2,
57, -14, -18, 1, 6, -11, 3, -12, -5, 1, 38, 3, 60, -4, -29, -1 },
    { -10, -10, -20, 3, 2, 2, -9, -2, 5, 17, -6, 2, -15, -28, -12, -7, 12, 0, -51,
-11, 27, -13, -21, 4, -14, 59, 0, 52, -7, -7, -41, -23, -6, 4, 33, -1 },
    { -3, 6, 37, -5, -4, -2, -10, -3, -4, -37, 5, -3, -21, 2, 51, -13, -21, 0, -7, 71,
8, 32, -15, -3, 22, 12, -7, 20, 7, -4, -30, 33, 5, -5, 12, -3 },
    },
  },
};
```

Figure 14:
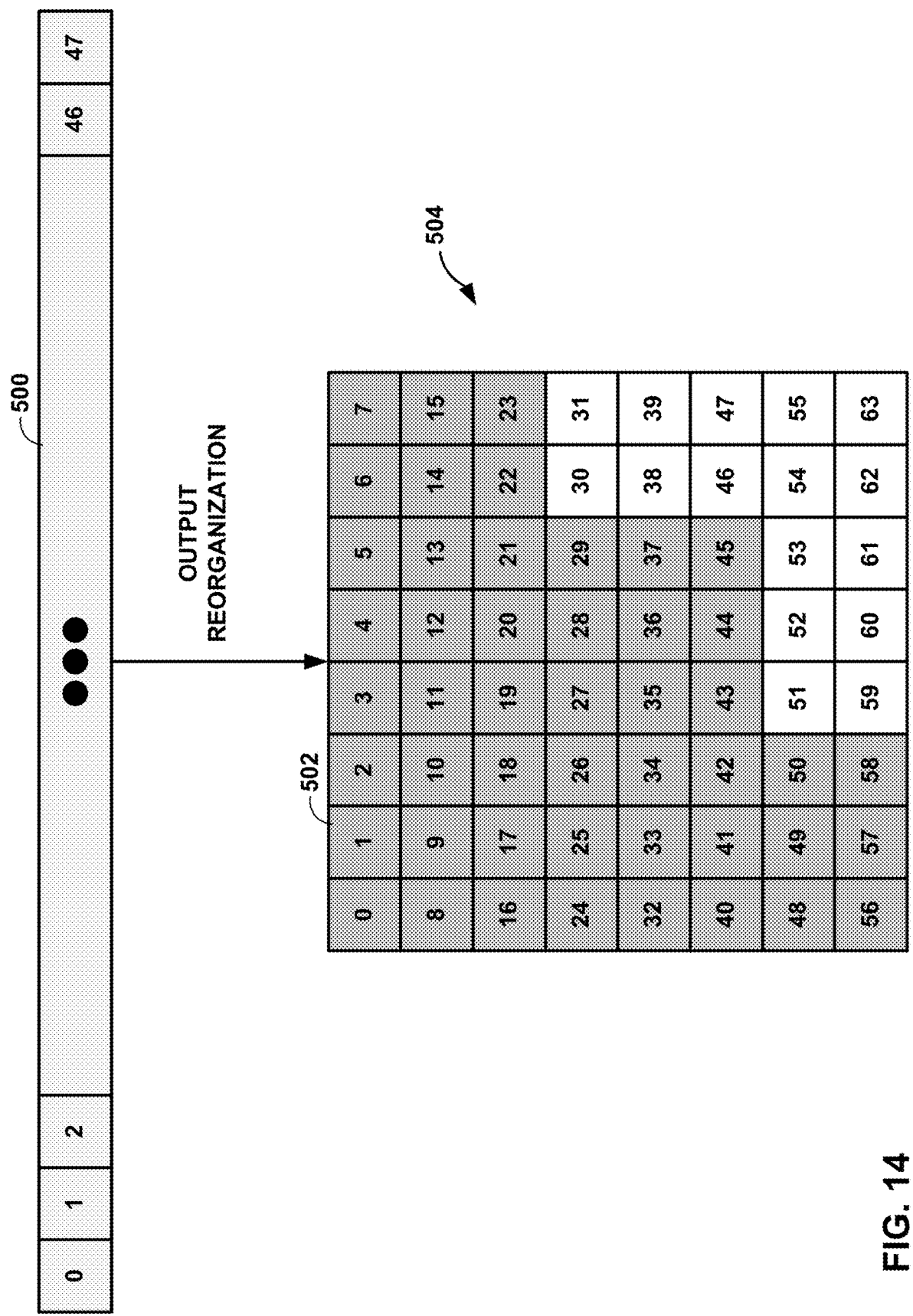
FIG. 14 is a conceptual diagram illustrating a circular pattern with 48 samples in 8×8 LFNST.

FIG. 14 is a conceptual diagram illustrating a circular pattern with 48 samples in 8×8 LFNST. This example aims to provide additional coding gains by introducing a circular 48-sample support pattern for an 8×8 LFNST. Experimental results show that −0.09% all intra and −0.04% random access BD rates may be achieved over VVC Test Model 6 (VTM-6.0) a description of which may be found in Chen et al., "Algorithm description for Versatile Video Coding and Test Model 6 (VTM 6), Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2002-v2. The example of FIG. 14 may provide additional coding gains over VTM-6.0 without increasing the memory requirements and number of multiplications. 1-D list 500 may be reorganized and output as shown, with the coefficients in 1-D list 500 being reorganized into the dark shaded portion 502 of 8×8 block 504. The remaining coefficients of 8×8 block 504 may be normatively zeroed out. The optimized output reorganization patterns/scans may be specified in arrays g_lfnstRGScan8×8 and g_lfnstRGTranScan8×8. The set of optimized transforms (LFNST) matrices may be defined as g_lfnst8×8. A circular pattern with N=48 samples in 8×8 LFNST may include:

```
const int g_lfnstRGScan8x8[48] =
{ // 0 1 2 3 4 5 6 7 8 9 10 11 12 13 14 15 16 17 18 19 20 21 22 23
24 25 26 27 28 29 30 31 32 33 34 35 36 37 38 39 40 41 42 43 44 45 46
47
        0, 1, 2, 3, 4, 5, 6, 7, 8, 9, 10, 11, 12, 13, 14, 15, 16, 17, 18, 19, 20, 21, 22, 23,
24, 25, 26, 27, 28, 29, 37, 45, 32, 33, 34, 35, 40, 41, 42, 43, 48, 49, 50, 36, 56, 57, 58,
44
};
const int g_lfnstRGTranScan8x8[48] =
{ // 0 1 2 3 4 5 6 7 8 9 10 11 12 13 14 15 16 17 18 19 20 21 22 23
24 25 26 27 28 29 30 31 32 33 34 35 36 37 38 39 40 41 42 43 44 45 46
47
        0, 8, 16, 24, 32, 40, 48, 56, 1, 9, 17, 25, 33, 41, 49, 57, 2, 10, 18, 26, 34, 42, 50,
58, 3, 11, 19, 27, 35, 43, 44, 45, 4, 12, 20, 28, 5, 13, 21, 29, 6, 14, 22, 36, 7, 15, 23,
37
};
```

```
const int8_t g_lfnst8x8[4][2][16][48] =
{
  { // 0
    {
      { 116, -26, -22, -1, -5, -1, -2, 0, -31, 19, 3, -1, 1, 0, 0, 0, -18, 1, 5, 0,
1, 0, 0, 0, -1, 0, 0, 0, 0, 0, 0, 0, -4, 0, 1, 0, -1, 0, 0, 0, -2, 0, 0,
0, 0, 0, 0, 0 },
      { 21, 100, -49, -4, -9, -1, -3, -1, 36, -26, 15, -4, 0, -1, 0, 0, -29, -12, 10, 3,
2, 1, 1, 0, 4, -3, -2, 1, 0, 0, 0, 0, -6, -3, 2, 0, 1, -1, 0, 0, -2, -1, 1,
0, 0, 0, 0, 0 },
      { -12, 43, 0, -11, 0, -3, 0, -1, -101, 7, 34, 0, 4, 0, 2, 0, 38, -33, -7, 6,
-2, 2, 0, 0, 8, 4, -7, -1, 0, 0, 0, 0, 7, -3, -1, 0, 3, 0, -1, 0, 2, -1, 0,
0, 1, 0, -1, 0 },
      { 22, -10, 16, -1, -2, -1, -1, 0, -4, -107, 16, 24, 3, 5, 1, 2, 23, 23, -39, -1,
1, 0, 0, 0, -4, 22, 2, -9, 0, -1, 0, 0, -2, 3, 1, 0, -1, 5, 0, -1, -1, 1, 0, -
1, -1, 2, 0, 0 },
      { -33, -39, -82, 48, -3, 11, 0, 4, -30, -26, 18, -12, 8, -1, 2, 0, -27, 20, 22,
-11, 0, -2, 0, -1, 25, -5, -6, 3, -2, 0, -1, 0, -1, 6, 3, -3, 5, 0, 0, 0, 0, 2,
2, 0, 2, 0, 0, -1 },
      { -8, -2, 55, -19, 2, -4, 0, -1, -22, -17, 15, 9, 0, 1, 0, 0, -94, -9, 8, 8,
5, 3, 2, 1, 47, -9, -15, 0, -2, 0, 0, 0, -4, 6, -4, 0, 9, 0, -3, -1, -1, 1, -1,
0, 3, 0, -1, 0 },
      { -2, 32, 5, 13, -6, -1, -2, -1, -41, -6, -90, 27, 10, 4, 3, 1, -14, 39, 7, -36,
7, -3, 1, -1, -3, -8, 32, -3, -5, 0, 0, 0, 8, -7, -2, 4, 0, 0, 6, -1, 2, -2, 0,
-1, 1, 0, 2, 0 },
      { 0, -17, -17, 12, 1, 1, 1, 0, 7, -18, -54, 23, 2, 4, 0, 1, 1, -96, 4, 8,
6, 5, 1, 2, 15, 40, -17, -10, 0, -3, 0, 0, -3, 7, 11, -4, 0, 4, 2, -1, -1, 2,
2, -1, -1, 1, 1, 0 },
      { -12, -19, -36, -92, 37, -8, 11, -1, -12, -22, -13, 2, -13, 8, -1, 2, -12, 3, 36,
14, -10, 1, -2, 0, -36, 0, 7, 6, 4, -1, 1, 0, 16, -5, -2, 7, -4, 4, 1, 0, 5,
-1, 0, -2, -1, 1, 0, 1 },
      { 4, 2, -17, -42, 15, -3, 4, 0, 9, 12, -21, -6, -4, 2, 0, 0, 36, 30, -13, -1,
-8, -2, -2, -1, 94, 10, -12, -3, -6, -2, 0, 0, -37, 9, 15, 1, 9, -6, -1, 2, -10, 0,
3, 1, 1, -2, 0, 0 },
      { -16, -4, -32, -16, -3, 3, 1, 1, -5, 34, 7, 24, -5, -3, -1, -2, -36, 8, -85, 15,
23, -1, 4, 0, -16, 27, 23, -39, 2, -1, 1, 0, -4, -6, 22, 4, 3, -3, -1, -1, 2, -1,
4, -4, 1, -1, 0, 0 },
      { 0, -4, 0, -8, -14, 7, -2, 2, -8, -22, -31, -86, 26, -1, 7, 1, -7, -20, -39, 34,
-8, 3, 0, 1, -4, -34, 35, 17, -5, 2, -1, 0, -12, 15, 0, -2, 6, -2, 3, 6, -1, 3,
0, 3, 1, 0, 1, -2 },
      { 0, 8, 18, 10, 18, -6, 1, -2, -6, 3, 6, -57, 8, 3, 1, 1, -15, 13, 20, -25,
-19, 2, -1, 1, -13, 93, 13, -4, -6, -8, 1, 0, -15, -19, 22, 8, 2, -3, -4, 7, 0, -5,
0, -1, 1, -1, -1, 0 },
      { -7, -2, 5, 0, -10, 2, -1, 1, -11, -4, 1, 21, -4, -1, 0, 0, 0, -3, 20, 6, 3,
-1, -1, 0, -38, -18, -3, 6, 7, 2, 1, 1, -104, -5, 30, -4, 33, -9, -9, 2, -8, 4, 1,
6, 8, 0, -2, -1 },
      { -7, -11, 0, -38, -106, 29, -7, 8, 1, 0, 3, -3, 2, -12, 3, -1, 6, 5, 25, -1,
25, -7, 0, -1, 5, 26, 4, 1, -6, 1, -2, 1, 8, -5, -3, 7, -4, 0, 0, 0, 0, -1, -1,
5, -1, 0, 0, 1 },
      { -1, 13, 3, 14, -8, 3, -1, 0, -13, 3, -30, -12, -16, 3, 1, 1, -4, 38, 2, 68,
-5, -11, -1, -3, -16, 22, -66, -4, 35, -3, 2, 0, 10, 17, 6, -36, -4, -3, 10, 3, 1,
-1, 1, 0, -1, -1, 3, -3 },
    },
    {
      { 103, -53, -9, 0, -1, -1, 0, 0, -50, 10, 12, 1, 1, 0, 1, 0, -8, 12, 0, -2,
0, 0, 0, 0, -2, 1, -2, 0, 0, 0, 0, 0, -1, 1, 0, 0, -1, 0, 0, 0, 0, 1, 0,
0, 0, 0, 0, 0 },
      { 58, 59, -46, -5, -6, -1, -3, 0, 55, -41, -16, 9, -1, 1, 0, 1, -37, -17, 22, 4,
1, 1, 1, 0, -5, 7, 5, -4, 0, 0, 0, 0, -7, -1, 2, 0, -1, 1, 1, 0, -2, -1, 1,
1, 0, 0, 0, 0 },
      { 0, 83, -23, -17, -4, -3, -1, -1, -87, 7, 6, 5, 6, 1, 2, 0, 22, -5, -2, 4,
-1, 0, 0, 0, 12, -8, -3, 1, -1, 0, 0, 0, 6, -6, 1, 1, 3, -2, 0, 0, 1, -2, 0,
0, 1, -1, 0, 0 },
      { -33, -24, -30, 23, 1, 5, 0, 2, -30, -78, 40, 21, 1, 3, 1, 1, -22, 35, 35,
-15, -4, -3, 0, -1, 18, 18, -13, -10, 0, -1, 0, 0, 2, 2, -3, 0, 4, 3, -3, -1, 0,
1, 0, 1, 2, 1, -1, 0 },
      { 7, 23, 87, -34, -6, -6, -1, -2, -12, -16, 13, -20, 4, 1, 1, 0, -69, 6, -2, 3,
10, 1, 2, 0, 20, 18, -12, 0, 0, -2, 0, 0, 4, -3, -10, 4, 4, 0, -2, 2, 0, -1,
-2, 0, 2, 0, -1, 0 },
      { 24, 28, 15, 3, -10, 0, -2, 0, 33, -16, 57, -20, -8, -1, -1, -1, 46, 50, -39,
-36, 5, -2, 0, -1, -7, -22, -32, 15, 11, 1, -1, 0, -9, -4, 5, 9, -2, -1, -2, 1, -2,
0, 1, -1, -1, -1, -1, -1 },
      { -16, 7, -47, 21, 0, 3, 0, 1, 6, 72, 23, -22, -7, -4, -1, -2, -69, 30, 0, -19,
7, -1, 2, 0, 19, -12, -17, 9, 4, 0, 0, 0, 4, -9, 3, 4, 4, -5, 0, 1, 0, -1, 1,
-1, 2, -2, 0, 0 },
```

```
        { -3, -11, -18, -63, 17, -1, 5, 0, 9, -5, -59, 6, 22, -2, 2, 0, 8, 71, -4, 16,
-5, -7, -1, -2, 34, -7, -20, 4, -7, 1, 1, 0, -5, -16, 5, 10, 1, -1, 5, 0, -3, -2,
2, -1, 0, -1, 2, -2 },
        { -10, -14, -24, 7, -7, 3, -1, 1, -16, -45, -12, -41, 9, 4, 4, 1, -25, -16, -71,
22, 28, 1, 4, 1, 2, -32, 21, 42, -7, -1, 0, 0, -2, 10, 22, -7, 3, 3, 2, 0, 0,
4, 3, -7, 1, 1, 1, 0 },
        { -15, -17, -27, -89, 12, 4, 7, 2, 3, 3, 51, -13, 9, -3, -2, -1, -7, -22, 15, 2,
0, -1, 0, 0, -54, -5, 1, 4, 8, 1, -2, 0, 0, 13, 1, 7, 0, 0, -5, 1, 4, 2, -1,
-1, 0, 0, -2, -1 },
        { 6, -14, -17, -20, -3, 4, 1, 2, 20, 3, 36, -19, -1, 1, -1, 0, 27, -48, -2, 19,
7, 1, -1, 1, 94, 20, -15, -2, -10, -4, 1, 0, 6, -7, -11, -3, -7, -2, 1, 4, -6, 1,
1, 0, -3, 1, 0, 1 },
        { -3, -1, -14, 2, -27, 6, -1, 2, -10, -5, -33, -82, -7, 15, 4, 4, 21, 10, 24, -23,
30, 2, -1, -1, -19, 57, -3, -2, 13, -12, -2, -1, 4, -2, -23, 9, -1, -3, 3, 10, 2, -3,
-1, 3, -1, -1, 1, -1 },
        { 4, 13, 4, 9, -3, 0, -2, 1, 9, 10, 33, -28, 17, -4, 1, -1, 9, 47, 18, 55,
-5, -14, -3, -3, -2, 6, 62, -11, -42, 0, 7, 0, -8, 15, -8, -40, 1, -4, -11, 2, -1, 0,
-4, 3, 0, -2, -3, 6 },
        { 2, 9, -12, 8, 58, -11, 1, -3, 4, 5, 7, 19, 22, -16, -1, -2, -4, 5, -59, -3,
-2, -3, 4, 1, -14, 79, -4, 0, -4, -4, -1, 3, 23, 16, -16, -3, -3, -11, -2, 4, 4, -4,
3, -9, -1, -3, 1, -2 },
        { -7, -5, -10, -23, -87, 19, 2, 5, 2, 11, 2, 49, -31, 13, -1, 0, -6, 16, -39,
14, 15, 2, -1, -1, -4, 31, 8, -13, 5, -3, -2, 0, 10, 12, -3, -8, -1, -8, -3, -1, 2,
-2, 2, 5, 0, -2, 0, 3 },
        { -2, -2, -1, 25, -17, 5, -3, 1, 1, 3, 11, 6, 40, 0, -1, -2, 0, -9, 3, 66,
22, -20, -3, -3, -34, 2, -64, 0, -14, -6, 7, 0, -14, -40, -17, 18, 0, 2, 18, 3, 2,
0, 2, 1, 0, 1, 3, -8 },
    },
  },
  { // 1
    {
        {-108, 49, 5, 4, 1, 1, 1, 43, -4, -10, -1, -2, 0, -1, 0, 10, -14, -1, 2,
0, 0, 0, 0, 3, -2, 3, 0, 0, 0, 0, 0, 2, -2, 0, -1, 1, 0, 0, 0, 1, -1, 0,
0, 0, 0, 0, 0 },
        { 44, 17, -20, 1, -4, 0, -2, 0, 91, -49, -13, 2, -2, 1, -1, 0, -37, -21, 20, 4,
2, 1, 1, 0, -13, 12, 11, -4, 0, -1, 0, 0, -9, 5, 0, -3, -3, 4, -1, 0, -4, 1, 0,
1, -2, 1, 0, 1 },
        { -23, 13, -4, 2, -1, 1, 0, 0, -34, -56, 37, 4, 5, 1, 2, 0, -59, 51, 30, -13,
2, -3, 1, -1, 20, 34, -26, -12, 1, -2, 0, 0, 6, -3, -15, 6, 8, -1, -3, 3, 2, -1,
-1, 2, 3, 0, -1, -1 },
        { 31, 101, -50, -4, -9, -2, -3, -1, -39, 12, -10, 4, 1, 1, 0, 0, -16, -1, 8,
0, 1, 0, 0, 13, -13, -1, 4, -2, 1, 1, 0, 1, -11, 6, 2, 2, -4, 4, 0, 0, -3, 3,
0, 1, -1, 1, 0 },
        { 13, 7, -9, -2, -1, 0, -1, 0, 47, 13, 9, -13, -1, -3, 0, -1, 14, 66, -39, -19,
0, -3, 0, -1, 26, -33, -52, 16, 5, 3, 2, 0, -8, -33, 8, 25, -1, -7, 15, 4, -4, -2,
6, 0, -2, -1, 1, -5 },
        { 1, -3, -19, 7, -2, 2, -1, 1, -11, -80, 35, 13, 2, 3, 1, 1, 83, -5, 2, -8,
-5, -2, -2, 0, -5, -20, 2, -4, 2, 0, -1, -1, -10, 5, 16, -1, -4, 9, 0, -6, -3, 4,
0, 1, -2, 3, -1, 0 },
        { -17, -19, -27, 19, -1, 5, 0, 2, -12, -16, 11, -1, 2, 0, 1, 0, -53, 5, -37, 16,
5, 2, 1, 1, 4, -56, 33, 39, -6, 5, -2, 0, -6, 18, 51, -14, 6, 12, -1, -19, -1, 6,
0, -10, 3, 3, -3, 0 },
        { -10, -38, -37, 21, 1, 5, 1, 2, -5, -11, -60, 28, 0, 5, 0, 2, 6, -4, 27, 22,
-7, 1, -2, 0, 68, 0, 2, -10, -14, 0, 4, 0, 7, -38, 1, -1, -3, -6, 24, 1, -3, 3,
8, 1, -2, 2, 3, 1 },
        { 14, 20, 84, -38, 5, -10, 1, -4, -13, -45, -27, 4, 5, 3, 2, 1, -8, -18, -36,
24, 5, 4, 1, 2, 29, -4, -2, 12, -5, 0, 2, 0, 3, -19, 11, 7, -1, 3, 13, -3, -2,
2, 1, -4, 0, 3, 1, -2 },
        { 12, 7, 13, 3, -5, 0, -2, 0, 21, 17, 57, -23, -5, -5, -2, -2, 8, -7, -1, 9,
-3, 1, -1, 1, 80, -1, 29, -12, -16, -2, 0, 2, 3, 9, -16, -45, -5, -12, -26, 0, -7, -1,
-3, 1, -2, -2, -5, 14 },
        { -6, -16, -2, 1, 1, 2, 0, 0, -2, 9, 50, -16, -2, -2, -1, -1, -21, -79, 21, -14,
6, 3, 2, 2, 14, -16, -42, 8, 17, 1, 0, -2, -2, -29, 10, 34, -3, 6, 31, 3, 0, 10,
5, 3, -1, 5, -1, -8 },
        { 4, 13, 37, -13, -2, -3, 0, -1, 3, 21, -2, 21, -7, 2, -2, 0, -3, 24, 76, -13,
-18, -2, -4, -1, 0, -49, 7, -21, -1, 4, 1, -3, -30, -3, 32, -6, 0, 28, 3, -26, -4, 6,
-17, 5, 0, 3, -7, 1 },
        { 7, 4, 3, 1, -1, -2, 0, -1, 13, 12, 10, 28, -9, 0, -3, -1, 13, 0, 9, -10,
-4, -1, -1, -1, 9, 43, -13, 31, -1, -2, -3, 5, 66, 4, 45, 2, 4, -1, -6, -57, -1, -11,
-19, -37, -4, -2, -3, -10 },
        { 7, 14, 26, 66, -18, 3, -6, 1, 2, 7, 30, 15, -10, -1, -2, 0, -2, 12, -11, 23,
-6, -1, -1, -1, -35, 16, 26, -10, -24, 1, 10, 2, 0, -55, 0, -11, -14, -3, 43, -3, 4,
16, 6, -2, -3, 3, -6, 3 },
        { 10, 11, 32, 82, -26, 7, -9, 3, -6, -7, -29, 9, -7, 3, -1, 1, -4, -15, -13, -53,
9, 2, 3, 1, 21, -12, -13, -9, 21, 0, -7, -2, -1, 32, -5, 8, 11, 1, -19, 2, -2, -11,
-4, 7, 3, -2, 5, -5 },
        { -1, -3, 1, -18, 7, -4, 2, -2, 8, 4, 23, 89, -18, 3, -6, 0, -17, -10, -17, -1,
-21, 3, -2, 1, -10, -38, -10, -22, 3, 9, 2, 2, 31, 4, -20, -5, 2, -31, -14, 17, 3,
-9, 24, 8, 1, 1, 8, 7 },
```

-continued

```
    },
    {
        { 77, -50, 4, -3, 1, -1, 0, 0, -73, 38, 5, 0, 1, 0, 0, 0, 25, 1, -13, 2,
-2, 1, -1, 0, -6, -10, 7, 1, 0, 0, 0, 0, 2, 6, 0, -2, -2, -2, -1, 1, 1, 1, 0,
0, -1, -1, 0, 0 },
        { -61, -2, 20, 1, 3, 0, 1, 0, -12, 57, -26, 0, -3, 0, -1, 0, 57, -56, 0, 8,
-2, 2, -1, 1, -24, 10, 21, -10, 2, -2, 0, 0, 9, 6, -16, 1, -2, -5, 5, 3, 3, 1,
-1, 1, -1, -1, 1, -1 },
        { 54, -27, 10, -4, 0, -1, 0, -1, 51, -4, -27, 2, -3, 1, -1, 0, -24, -47, 37, 2,
2, 1, 1, 0, -32, 54, -1, -16, 4, -3, 1, 0, 7, -7, -23, 12, -5, -1, 13, 1, 0, 1,
-4, 0, -3, 0, 2, -2 },
        { -39, -35, 35, -4, 5, -1, 2, 0, -38, 18, -8, 3, 1, 0, 0, 0, -33, 29, 22, -7,
1, -2, 1, -1, 21, 39, -48, -1, 0, 0, 3, -1, 20, -46, 5, 21, -2, 10, 18, -15, 3, -1,
-12, -5, 1, 0, 3, -1 },
        { -15, -71, 32, 7, 5, 1, 2, 0, 52, 32, 1, -20, -1, -4, 0, -2, -35, 14, -39, 18,
0, 3, 0, 1, 22, -24, 28, 5, -7, 2, -1, -1, -12, 11, -1,-17, 1, 1, -6, 9, -2, 0,
2, 5, 0, 0, -1, 1 },
        { -28, -17, -8, 12, 0, 3, 0, 1, -40, -31, 41, -8, 5, -1, 2, 0, -30, 9, 7, 5,
2, 0, 1, 0, -15, 38, 30, -21, 0, -4, -2, 3, 4, 42, -55, -6, 13, -27, -4, 26, 3, 5,
10, 6, 3, -2, -5, -5 },
        { -17, -58, 13, 2, 5, 1, 2, 1, 21, -47, 28, 12, -2, 2, 0, 1, 55, 18, 5, -29,
1, -5, 0, -2, -51, 1, -22, 18, 5, 1, 0, 0, 10, 12, 23, -2, -7, 7, -15, -10, 1, 0,
2, -8, -2, 3, -1, 4 },
        { 10, 7, -26, 14, -4, 2, -2, 1, 32, 22, 31, -26, 1, -5, 0, -2, 32, 30, -41, -1,
-1, -1, -1, -1, -9, 7, -21, -3, 1, 0, 3, 3, 17, -29, -37, 32, 3, -37, 51, 4, -7, 17,
-3, -2, -2, -7, -3, -9 },
        { 1, 25, -12, -12, 4, -2, 1, -1, 1, 43, 17, -3, -9, -1, -2, -1,-38, 1, -26, -21,
17, -3, 4, -1, -46, 25, -7, 46, -10, 3, 2, -2, 44, -4, 14, -34, -15, -6, -30, 12, 12,
-7, 14, -7, -2, -2, -2, 15 },
        { 17, 32, 71, -37, 1, -8, 0, -3, 12, 8, -22, -3, 4, -1, 0, -1, 21, 45, -1, -9,
-5, -2, -1, -1, -2, 6, -24, -13, 5, -1, -2, 3, -11, 22, -30, 4, 10, -21, -30, 24, 2,
-19, 23, 5, 0, 2, 0, -3 },
        { -2, -20, -53, 17, 4, 4, 1, 2, 20, 35, 8, 20, -14, 1, -4, 0, 26, 9, 37, -32,
2, -3, 0, -1, 50, 18, -19, -10, -2, -3, -1, -1, -16, -4, -18, -21, -6, 1, -34, 29, 6,
-21, 20, 8, -3, 3, 1, 6 },
        { -11, -6, -29, 6, -3, 3, 0, 1, 1, 41, -10, 4, 3, -2, 0, -1, -36, 10, 19, -20,
-7, 0, 0, 0, -44, -29, -26, -5, 29, -1, -3, 6, -34, 43, 9, 45, 32, -7, -1, -18, -5,
-7, 2, -11, 7, 3, 3, -14 },
        { 11, 25, 25, 14, -12, 0, -3, 0, 11, 29, 60, -34, -2, -5, 0, -2, 10, 6, 17, -7,
-2, -2, -1, -1, 5, 26, 9, -23, 1, -3, -2, -2, -13, 17, 7, -8, 0, 37, -19, -38, -5, -2,
-55, -3, 4, -12, 7, 5 },
        { 0, 2, 26, -5, 1, -2, 0, -1, -10, -10, 45, -23, -10, 1, -1, 0, -9, -62, -19, -28,
25, 1, 5, 1, 9, -8,-32, 21, 6, -1, 2, -2, -50, -17, -3, 16, 9, 15, 11, 33, 5, -
10, 22, 11, -3, 11, -3, -9 },
        { 6, 3, 27, -15, -2, -1, 0, -1, 10, 9, 34, 36, -10, -1, -4, -1, -6, -27, 20, -28,
-11, 5, -1, 2, 45, -15, 8, 14, 16, -4, -1, 8, 35, 24, 7, 1, 10,-48, 14, -28, -13,
25, 13, -32, -1, 3, -23, 6 },
        { -3, 6, 8, -31, 9, -3, 2, -1, 3, 16, 27, 32, -12, 0, -3, 0, -14, 19, 31, -17,
-12, 0, -2, 0, -32, -41, 21, -31, 2, 5, -2, -6, -7, -26, -11, -9, -38, 24, 27, 29, 11,
32, -4, 29, -5, -4, -22, -1 },
    },
    },
    { // 2
        { 120, -33, -6, -5, -2, -2, -1, -1, 5, 0, -1, 0, 0, 0, 0, 0, -26, 5, 1, 1, 0,
0, 0, 0, -7, 1, 1, 0, 0, 0, 0, 0, -4, 1, 0, 0, -2, 1, 0, 0, -2, 1, 0, 0, -
1, 0, 0, 0 },
        { -3, -1, -1, 0, 0, 0, 0, 0, 118, -23, -9, -3, -3, -1, -1, -1, 23, 1, -3, 0,
-1, 0, 0, 0, -32, 6, 3, 0, 1, 0, 0, 0, -16, 2, 1, 0, -5, 1, 0, 0, -1, 0, 0,
0, -2, 0, 0, 0 },
        { -23, 18, -4, 2, -1, 1, 0, 0, 20, 1, -2, -1, -1, 0, 0, 0,-117, 15, 9, 2,
4, 1, 2, 0, -23, -1, 4, 0, 1, 0, 0, 0, 19, -4, -1, 0, 7, -1, -1, 0, 3, -1, 0,
0, 2, 0, 0, 0 },
        { -3, 4, -1, 0, 0, 0, 0, 0, -36, 13, -1, 1, 0, 1, 0, 0, 13, 5, 0, -1, -1,
0, 0, 0,-112, 12, 11, 2, 4, 1, 0, 0,-39, -3, 5, 1, 16, -3, -1, 0, 10, 0, -1,
1, 3, 0, 0, 0 },
        { -29,-105, 47, -10, 12, -2, 5, 0, -4, -23, 10, -1, 2, 0, 1, 0, -7, 30, -10, 3,
-2, 1, -1, 0, -6, 11, -3, 1, -1, 0, 0, 0, 11, 1, -3, 1, 6, 2, -2, 0, 3, 2, -1,
-1, 0, 0, 0, 0 },
        { -5, -14, 0, 1, 0, 0, 0, 0, 17, 99, -35, 6, -8, 0, -3, -1, 7, 55, -10, 0,
-2, -1, -1, -1, 9, -27, 10, -3, 2, 0, 0, 0, -5, -22, 5, 0, -8, -8, 2, 0, -1, -1, 0,
1, 0, -2, 1, 0 },
        { 9, 5, -3, 1, -1, 0, 0, 0, 5, 7, -5, 1, -1, 0, 0, 0, 27, -7, 1, -2, 0,
-1, 0, 0, -33, -9, 5, 0, 2, 0, -1, 0, 113, -11, -11, -1, 35, 1, -5, 0, -2, 1, -1,
-3, -4, 1, 0, -1 },
        { 8, 31, -20, 4, -5, 1, -2, 0, -10, -45, 4, 0, 3, 1, 1, 1, 12, 97, -21, 0,
-4, -1, -2, -1, 8, 41, -2, 0, -1, -1, 0, 0, 7, -28, 7, -1, 1, -6, 1, -1, -4, 0, 1,
1, -2, 0, 0, 0 },
```

-continued

```
    { 3, 1, 0, -1, 0, 0, 0, 0, 9, -1, 1, 0, -1, 0, 0, 0, -1, 0, -1, 0, -1,
0, 0, 0, 26, -10, 0, -1, -1, 0, 0, -1, -28, -14, 5, 0, 110, -8, -12, -1, 45, 4, -6,
1, 5, 1, -1, -3 },
    { -17, -48, -96, 31, -13, 12, -3, 5, -6, -13, -42, 12, -3, 4, 0, 1, 0, -5, 22, -8,
6, -2, 2, -1, 3, 10, 14, -3, 1, -1, -1, 0, 1, 15, 4, -1, 4, 4, 2, -1, 0, 2, 2,
0, 0, 1, 1, 0 },
    { 1, 6, 9, -3, 2, -2, 0, 0, 6, 40, -11, -1, -4, 0, -1, -1, -3, -6, -12, 2, -1,
0, 0, 0, 8, 93, -21, -1, -3, -2, -2, -1, 7, 65, -4, -4, 22, -6, 2, -1, -11, -9, 3,
-2, -11, -6, 2, 0 },
    { 3, 1, -2, 0, -1, 0, -1, 0, 2, 4, -1, 1, -1, 0, 0, 0, 3, 0, -4, 1, 0,
0, 0, 0, 1, 15, -7, 0, 0, 0, -1, 0, 17, 10, -1, -1, -37, -6, 5, 0, 101, -9, -10,
-1, 61, 0, -7, 1 },
    { -4, -13, -33, 6, -5, 3, -1, 1, 12, 31, 95, -24, 9, -8, 1, -3, 7, 17, 50, -10,
5, -4, 1, -1, -3, 3, -29, 6, -5, 2, 1, 0, 0, -1, -13, 2, 0, -3, -6, 1, -2, -1, 0,
-2, 1, -1, -2, -1 },
    { -2, -13, -2, 3, 1, 1, 0, 1, 3, 12, 0, 1, 0, 0, 0, 0, -5, -44, 0, 4, 1,
2, 1, 1, 5, 54, -3, -1, -1, -1, 2, 2, 1, -89, 21, 0, -10, -51, 3, 3, -5, 6, -2,
3, -1, 3, 0, 1 },
    { 4, 9, 32, -12, 6, -5, 2, -2, -1, -5,-17, -1, -1, -1, 0, 0, 8, 13, 87, -21,
8, -5, 1, -3, 11, 23, 71, -11, 3, -3, 0, 1, -2, 2,-12, 4, -3, -9, -13, 3, 3, -7,
-6, -3, 1, -2, -3, -1 },
    { 0, 1, 1, 4, -1, 1, 0, 0, -1, -1, 1, 1, 1, 1, -1, 0, -1, 1, 2, -1, 0,
0, 0, 0, -1, -1, -2, 1, 0, 1, 0, 0, 4, 1, 1, 0, -18, -4, 0, 1, 59, 5, -8, 0,
-111, 3, 12, 1 },
    },
    {
    { -78, 44, -4, 4, -1, 1, 0, 1, 76, -35, -1, -2, -1, -1, 0, 0, -33, 7, 7, -1,
1, 0, 1, 0, 9, 3, -5, 0, 0, 0, 0, 0, -3, -3, 1, 0, 1, 1, 0, 0, -1, -1, 0,
0, 1, 0, 0, 0 },
    { 74, -6, -11, 0, -3, 0, -1, 0, 23, -34, 11, -3, 2, -1, 1, 0, -71, 36, 0, 0,
1, 0, 1, 0, 46, -11, -8, 2, -2, 0, 0, 0,-18, -3, 7, -1, 5, 3, -2, 0, -5, 0, 1,
1, 1, 1, -1, 0 },
    { 36, -45, 23, -7, 4, -2, 1, -1, 76, 20, -26, 2, -5, 0, -2, 0, -13, -34, 13, 1,
1, 1, 1, 0, -43, 29, 3, -4, 2, -1, 1, 0, 30, -8, -9, 4, -16, 0, 7, -1, 5, 2, -3,
-2, -4, -1, 1, 1 },
    { 46, 59, -40, 6, -8, 1, -3, 0, 7, -57, 24, 0, 3, 1, 1, 0, 39, -5, 5, -8,
1, -2, 1, -1, -52, 17, -5, 4, 1, 1, 0, 0, 21, -3, 0, 0, -7, -1, 0, 0, 1, 0, 1,
-1, -1, 0, 0, 0 },
    { -12, 24, -3, 0, -1, 0, 0, 0, -54, 4, -9, 7, 0, 2, 0, 1, -60, -18, 30, -5,
4, 0, 2, 0, 6, 50, -19, -2, -1, -1, 1, 0, 48, -38, -5, 7, -27, 7, 12, -4, 10, 2,
-6, -2, -3, -2, 2, 1 },
    { -22, -38, 7, 1, 3, 0, 2, 0, -10, -19, 29, -9, 4, -2, 1, -1, -19, 65, -37, 5,
-3, 0, -1, 0, -43, -26, 11, 9, -2, 3, -1, 0, 58, 2, 2, -8,-27, -2, -1, 3, 9, 4,
0, 0, -1, -2, -1, 1 },
    { 3, -14, 25, -15, 5, -4, 2, -1, 16, -24, -12, 10, -1, 2, 0, 1, 63, 31, 7, -7,
-4, -1, -2, -1, 52, 9, -31, 2, -2, 0, 1, -1, 11, -49, 15, 4, -41, 22, 6, -6, 18, -1,
-7, -1, -6, 0, 3, 2 },
    { 2, 10, 61, -37, 11, -9, 3, -3, -24, -42, -50, 31, -2, 5, 0, 2, -9, 26, 29, -6,
-6, 1, -2, 0, -40, -9, -8, -6, 9, -1, 0, 0, -15, 14, 4, 9, 30, 0, -5, -5, -10, -5,
2, -3, 3, 4, 0, -1 },
    { 21, 60, 8,-12, -1, -3, -1, -1, 10, 35,-38, 15, -5, 2, -2, 0, 1, 3, -5, 3,
-5, 2, -1, 1, 26,-54, 24, -6, 5, -1, -2, 1, 45, 29,-12, -4, -37, -13, 1, 3, 11, 2,
1, -2, -2, -2, -1, 1 },
    { -2, -18, 8, -2, 2, 0, 0, 0, 1, -32, 6, -2, 2, 0, 1, 0, 20, -9, 2, 4, -2,
1, -1, 0, 47, 20, 7, -10, 1, -3, 0, 1, 63, 20, -34, 7, 52, -36, 10, 1, -36, 14,
4, -4, 18, -3, -6, -3 },
    { 1, 2, -29, 8, -7, 4, -1, 1, 13, 46, -8, 11, -5, 1, -2, 0, 5, 26, 25, -27,
6, -5, 1, -1, -8, -19, -47, 22, -2, 3, 1, -2, 39, -12, 38, -3, 52, 14, -25, -8, -20,
-19, 8, -4, 6, 6, 0, 2 },
    { 13, 43, 32, -10, 5, -5, 0, -2, 7, 30, -2, -18, 2, -4, 2, -1, 0, 20, -61, 32,
-9, 5, -3, 1, -7, 29, 20, -7, -5, 0, 0, -1, -1, -56, 3, -3, 36, 12, 2, 1, -24, 0,
-3, 5, 8, -3, 0, -2 },
    { 2, 0, 23, -11, 9, -5, 2, -2, -5, -26, 13, -3, -2, 0, 0, 1, -6, -48, -24, 7,
3, 2, 1, 1, 18, 0, 12, 14, -5, 2, -3, -1, 28, 18, 28, -22, 26, 39, -43, 5, 47,
-39, 5, 3, -28, 10, 6, 0 },
    { 4, 3, 2, 45, -26, 10, -6, 3, 0, 4, -30, -33, 16, -4, 3, -1, 7, 34, 18, 12,
-2, -3, 1, -2, -2, 7, 0, -12, -3, 1, 0, 0, 1, 3, -27, 11, 40, -7, 17, 0, 67, -3,
-17, 2, -40, -5, 9, -5 },
    { -3, -1, -38, -55, 32, -11, 7, -3, 8, 19, 26, 53,-25, 6, -4, 0, -2, 19, -16,
-16, -3, 5, -2, 2, 2, 20, 6, -11, 12, -6, 2, 1, -6, -1,-18, 14, 25,-17, 10, -3,
44, 7, -7, -7, -26, -7, 2, 0 },
    { 7, 25, 56, -6, 1, -4, 0, -2, 5, 23, 40, -21, 4, -3, 1, -2, 0, 6, -5, -22,
10, -6, 2, -2, 1, 27, -48, 35, -11, 5, 1, 0, -8, 35, 11, -12, -10, -50, 0, 2, 15,
19, 2, -5, -8, -7, -4, 5 },
    },
    },
    { // 3
    {
```

-continued

{ 112, −38, −12, −2, −3, −1, −1, 0,−17, 33, −7, −1, −1, 0, −1, 0,−24, 7, 11, −1, 1, 0, 0, 0, −2, −4, 2, 2, 0, 0, 0, 0, −4, 0, 0, 1, −1, −1, 0, 0, −2, 0, 0, 0, 0, 0, 0, 0 },
{ 8, 48, −20, −1, −3, −1, −1, 0,−88, 13, 39, −5, 5, −1, 2, 0, 23,−55, 5, 11, 0, 2, 0, 1, 11, 4,−17, 1, 0, 0, 0, 0, 3, −1, 1, −2, 3, 1, −2, 0, 1, −1, 0, 0, 1, 0, −1, −1 },
{ 34, −17, 9, −6, 2, −2, 1, −1, −6, −74, 17, 17, 0, 4, 0, 1, 39, 4, −64, 10, 0, 2, −1, 1,−14, 46, −6,−21, 3, −3, 0, 0, −1, 0, 11, −3, −3, 6, 1, −2, 0, 0, 2, −1, −1, 2, 0, 0 },
{ −24, −84, 27, 11, 5, 2, 2, 1, −7, 8, 1, −4, 1, 0, 0, 0, 1, −44, 9, 25, −3, 4, −1, 1, 15, 3, −59, 5, 9, 1, −1, 0, −3, 24, −1, −25, 4, 0, 4, 0, −1, 5, 1, 1, 1, 0, 1, −4 },
{ −27, −46, 22, 2, 3, 2, 1, 1, −78, 4, −35, 13, 4, 3, 2, 1, 20, 35, −8, −37, 3, −4, 1, −1, 8, −8, 42, −2, −12, 0, −1, 0, 8, −9, −6, 16, 2, 2, −1, −1, 2, 0, −1, −1, 1, 0, 0, 2 },
{ −12, −15, −58, 19, −2, 5, −1, 2, 16, 53, −22, −26, 2, −5, 1, −2, 58, 1, −3, −6, −4, −1, −1, 0, −18, 47, 2, −18, 1, −4, −1, 0, −3, −7, 37, −3, −2, −4, 1, 9, −1, −2, 5, −4, −1, −2, 0, −1 },
{ 19, −3, 14, −2, −3, −1, −1, 0, 15, −23, 4, −18, 5, −2, 1, 0, 78, 0, 50, −9, −22, 0, −6, 0, −20, −15, 3, 57, −5, 4, 0, 0, −7, 3, −36, 4, −6, 6, 0, −5, −1, 0, −4, 11, −2, 2, 0, 1 },
{ 7, 37, −1, 18, −7, 1, −2, 0, −22, −12, −65, 12, 11, 3, 3, 1, 1, 31, 1, 0, −2, −5, 0, −2, −19, −6, −41, 6, 30, −1, 2, 1, 3, 20, 0, −62, 4, −5, 30, 1, 1, 0, −1, 3, 1, −1, 7, −13 },
{ 14, 15, −7, 1, −3, 3, −1, 1, 18, −18, −45, 9, 10, 0, 3, 0, 6, −45, −2, −53, 7, 5, 2, 2, 63, 12, −2, −3,−40, 2,-b, 0,−14, 40, 2, 15, 1, −1, 11, −1, −4, 4, 1, 0, 0, 0, 2, 3 },
{ 13, 28, 93, −26, −2, −6, −1, −3, 12, 52, −8, 19, −8, −1, −2, −1, 30, −12, −8, 2, 8, −1, 0, 0, −8, 12, 0, −14, 0, 2, 0, 0, −4, −4, 24, 0, −1, −11, 0, 18, −4, −1, −6, −9, 0, −3, −1, −1 },
{ −5, 2, −14, 1, 0, 1, −1, 1, 11, 42, −4, 50, −9, −2, −3, −1, 14, −9, −44, 8, 24, −1, 4, 0, −7, −2, −2, 14, 3, −1, −1, 7, −16, 0, −56, 0, 0, 12, 3, −58, 3, −2, 15, 36, 0, 1, 2, 3 },
{ 8, −6, −17, 4, 6, 1, 0, 0, 14, −3, −5, 11, −4, 2, 0, 0, 37, −17, −9, 2, 32, −2, 4, −1, −8, −75, −2, −49, 3, 22, 2, −11, 35, 5, −12, −2, −8, 18, −1, 14, 3, 3, −2, −46, −2, 5, 1, −2 },
{ 0, 3, −11, −30, 6, −5, 1, −1, −2, 15, 28, −7, −26, 1, −5, 0, 28, 62, −4, 28, −6,−13, −2, −4, 72, −7, −9, −3, 11, −1, −3, −1, −5, 43, 1, −1, −8, −4, 19, 1, −3, −4, 0, −3, −2, −2, 2, 10 },
{ −9, −14, −15, −65, 8, 1, 4, 0, 3, 9, 39, 3, 10, −4, 1, −2, −7, −1, −3, −49, 5, 13, 1, 3, −26, 1, 7, 3, −21, 3, 3, −1, 2, 13, −2, −41, 9, 0, 48, 6, 0, −3, −6, −2, 1, 0, 3, −41 },
{ −7, 4, 0, −4, 5, 1, 1, 0, −15, 3, 0, −5, −15, 1, 1, 0, −12, 14, 4, 5, 7, 5, −1, 1, −61, 4, −28, −5, −43, 9, −41, −3, −2, 56, 0, 36, −13, −8, 12, −3, 6, −8, 3, −6, −1, −2, 3, 48 },
{ 2, 8, 26, 54, −18, 1, −1, 0, 4, 23, 30, −32, 32, 3, 1, 0, −8, 19, −33, −23, −26, 14, 2, 2, 7, 9, −4, 1, −10, 3, 2, −36, −6, 11, −33, −7, −3, 37, 12, 4, 0, −9, 18, −35, 0, 0, 1, −4 },
},
{
{−110, 32, 9, 3, 2, 1, 1, 0, 39,−29, 0, −1, 0, 0, 0, 0, 24, 2, −7, 0, −1, 0, −1, 0, −4, 3, 1, 0, 0, 0, 0, 0, 3, −2, −1, 0, 0, 1, 0, 0, 2, 0, 0, 0, 0, 0, 0, 0 },
{ 25, −26, 5, −2, 1, 0, 0, 0, 94, −10, −21, 0, −5, 0, −2, 0, −33, 56, −5, −3, −1, −1, 0, 0, −31, 0, 19, −2, 2, −1, 1, 0, −2, −9, 3, 3, −4, −1, 0, 1, −1, 0, 0, 0, −2, 0, 0, 0 },
{ −30, 4, 4, 2, 1, 0, 0, 0, −2, 36, −9, −1, −2, −1, −1, 0, −78, −1, 36, −2, 6, −1, 2, 0, 31,−65, 1, 11, 0, 3, 0, −1, 18, 8,−27, 1, 1, 7, 0, −6, 2, 1, 1, −1, 1, 0, 0, 0 },
{ −3, −59, 16, 1, 4, 1, 2, 0, 36, −11, −9, 1, −1, 0, −1, 0, 4, −36, −1, 7, 0, 2, 0, 1, 47, 12, −51, 2, −4, 1, −3, 0, −18, 60, 0, −19, −6, −3, 23, −2, −3, 1, 2, 1, −2, −1, 1, −1 },
{ −15, −75, 31, −2, 7, 0, 3, 0, −36, −29, −9, 10, 0, 3, 0, 1, 32, 30, −12, −7, −2, −2, −1, −1, −6, −30, 21, 8, 0, 2, 2, −2, 21, −10, −40, 10, −4, 29, −9, −15, 2, 2, 8, 0, 0, 3, 0, 2 },
{ −40, −52, 11, 5, 4, 2, 2, 1, −21, 66, −23, −2, −3, −1, −1, 0, −5, 16, 4, −5, 1, −1, 0, 0, 30, 12, −15, 0, −3, 0, 2, −16, −21, 48, 4, 13, −34, −10, 21, −1, 5, −13, −2, 3, −3, 0, 0 },
{ 2, −28, 6, 3, 2, 1, 1, 0, 26, −16, 40, −6, 1, −2, 0, −1, −20, −63, 3, 21, 0, 5, 0, 2, 0, 4, −5, 0, −1, 0, 5, 1, 5,-Si, 2, 27, 12, 8, −62, 6, −5, 24, −5, −2, 3, 3, 2, 4 },
{ −7, 1, 11, −4, 2, −1, 1, 0, −35, −62, 8, 12, 2, 4, 1, 2, −69, 22, −46, 5, 1, 1, 0, 0, 27, 25, 0, −28, 1, −5, −1, 0, 15, 3, 29, −4, 2, −7, 4, 12, 1, −2, −5, −6, 1, 0, 0, −1 },
{ 13, 16, −2, −5, −1, −1, −1, 0, 15, −6, −9, 2, −3, 1, −1, 0, 25, 14, 2, −24, 1, −4, 1, −1, 89, −2, 48, −2, −14, −1, 3, 0, −27, −1, 2, 44, −14, −5, −22, 5, −6, 2, −5, −2, −2, 0, −1, 11 },
{ 13, 7, 43, −7, 0, −3, 0, −1, −6, −38, 1, 4, 3, 1, 1, 1, 14, 3, 40, −4, −4, −1, −1, −1, −14, −40, −5, 22, 1, 4, −1, 5, −5, 5, 6, 17, −6, 4, −54, −1, 41, 4, 12,

```
-58, -3, -2, 11, 5, -2 },
        { 5, -6, -18, 2, -2, 1, -1, 0, 14, 12, 4, -17, -1, -3, 0, 0, 25, -3, 2, 1,
-3, 0, -1, 0, 11, -19, 1, -29, 1, -2, -1, -1, 88, 12, 35, 1, -27, 24, 3, 45, -10,
-7, -7, -27, -4, -1, -2, 1 },
        { -14, -32, -96, 23, -4, 7, -1, 3, -10, -37, 14, -25, 7, -3, 2, 0, -4, 25, 41, -4,
-6, -2, -1, -1, 5, 4, -5, 16, 0, 1, 0, 1, -10, -2, 1, -4, 5, -12, -1, 3, 4, 3, -
8, 5, 0, 4, 0, -2 },
        { 6, 18, -15, 21, -6, 4, -3, 1, -6, -11, -88, 14, 5, 4, 1, 2, 4, -3, -8, -10,
1, -1, 1, 0, 1, 1, -32, -1, 5, 0, -1, 0, 10, -2, -2, -10, 9, 11, -44, 2, -6, 48,
0, -1, 2, -2, 35, 3 },
        { 2, -11, -6, -1, 0, 2, 0, 1, 4, -25, -41, 1, 8, 1, 2, 0, -10, -62, 15, -54,
9, -1, 3, 0, -14, 7, 47, -10, -18, 1, 0, -1, 8, -11, 5, -2, 32, 4, 38, 0, 2, -16,
4, -6, 1, 4, -20, -18 },
        { -6, -10, -44, 7, 3, 3, 1, 1, 3, 12, 1, 41, -8, 3, -2, 1, 0, -24, -57, 5,
20, 1, 5, 0, -27, -37, 14, -22, -6, 3, -3, 1, -13, 31, -12, 25, -16, -28, -6, -1, 16,
-4, -36, -2, -3, 21, 0, 16 },
        { 6, -1, -16, -12, 3, -1, 1, 0, 16, 12, 17, 12, -1, 0, -1, 0, 21, 11, -35, 1,
7, 0, 1, 0, 38, -33, -6, -13, 16, -1, 7, 3, 0, -43, -4, -51, 54, -4, 22, -3, -3, 21,
-15, 2, -1, 12, 2, -40 },
    },
  },
};
```

Figure 15:
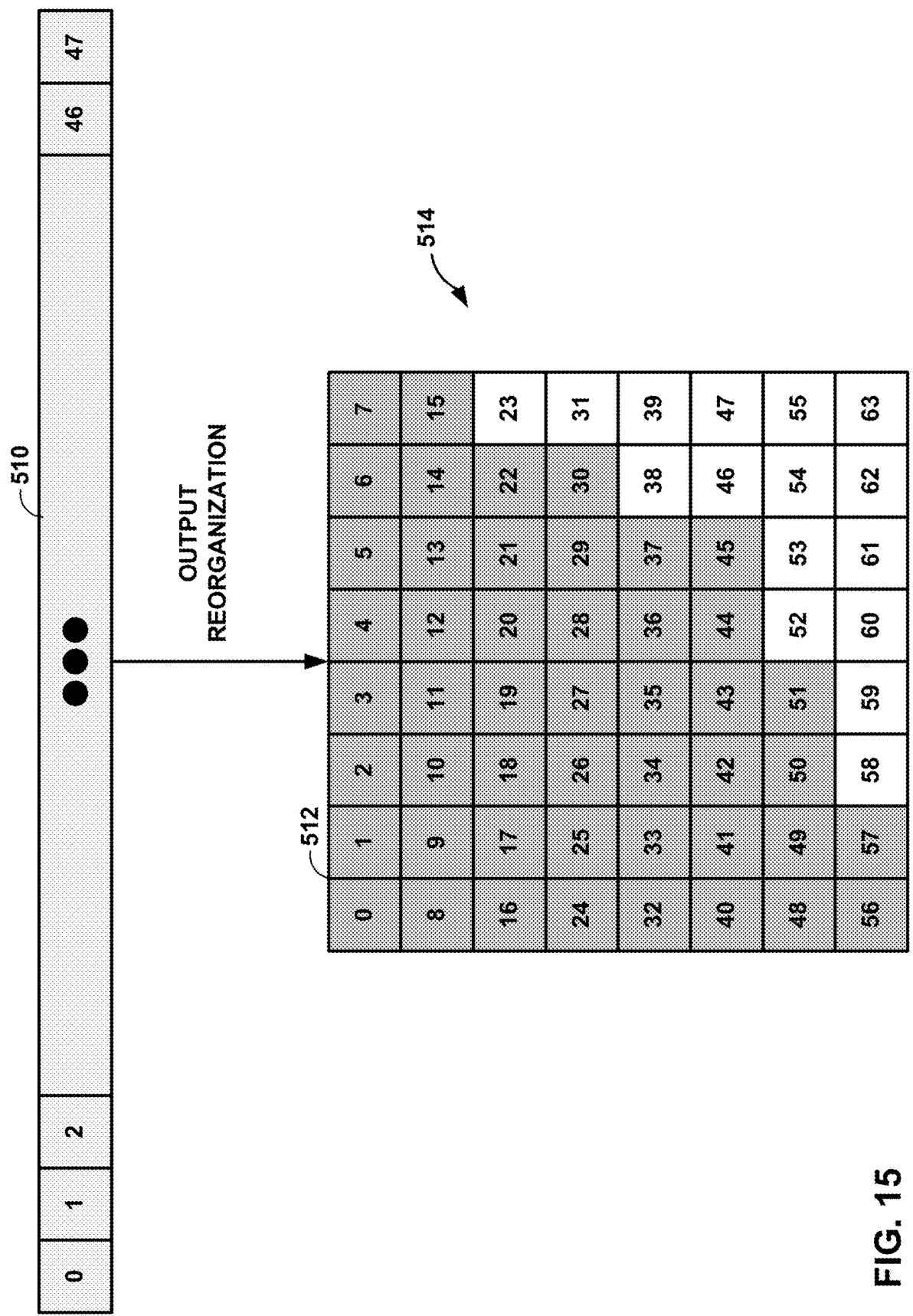
FIG. 15 is a conceptual diagram illustrating another variant of circular pattern with 48 samples in 8×8 LFNST.

FIG. 15 is a conceptual diagram illustrating another variant of a circular pattern with 48 samples for 8×8 LFNST. 1-D list 510 may be reorganized and output as shown, with the coefficients in 1-D list 510 being reorganized into the dark shaded portion 512 of 8×8 block 514. The remaining coefficients of 8×8 block 514 may be normatively zeroed out.

Figure 16:
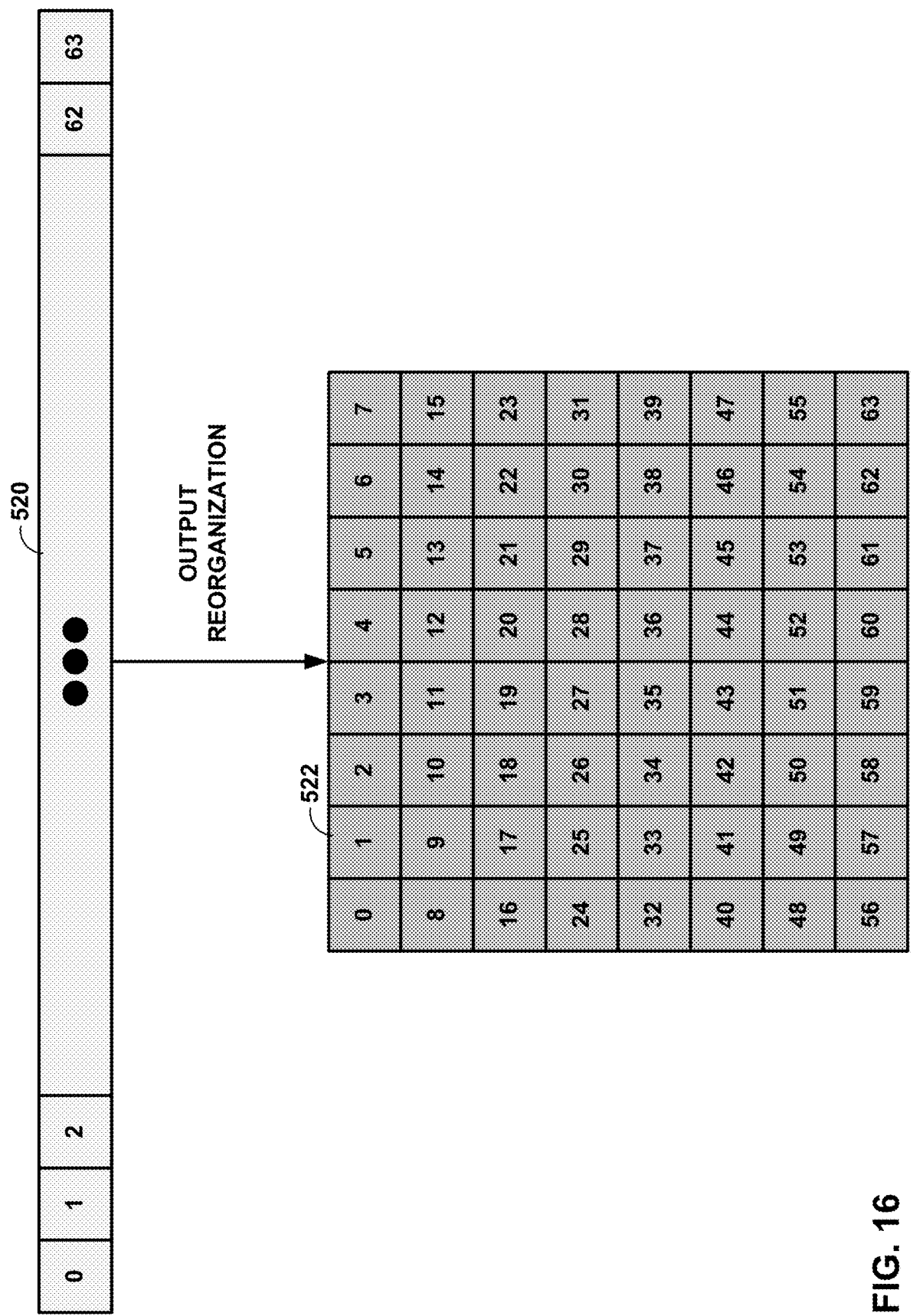
FIG. 16 is a conceptual diagram illustrating an 8×8 block pattern with 64 samples for 8×8 LFNST.

FIG. 16 is a conceptual diagram illustrating an 8×8 block pattern with 64 samples for an 8×8 LFNST. 1-D list 520 may be reorganized and output as shown, with the coefficients in 1-D list 520 being reorganized into 8×8 block 522. For the example of FIG. 16, a set of matrices may be as follows:

```
const int g_lfnstRGScan8x8 [64] =
{
        0, 1, 2, 3, 4, 5, 6, 7, 8, 9, 10, 11, 12, 13, 14, 15, 16, 17, 18, 19, 20, 21, 22, 23,
24, 25, 26, 27, 28, 29, 30, 31, 32, 33, 34, 35, 36, 37, 38, 39, 40, 41, 42, 43, 44, 45, 46,
47, 48, 49, 50, 51, 52, 53, 54, 55, 56, 57, 58, 59, 60, 61, 62, 63
};
const int g_lfnstRGTranScan8x8[64] =
{
        0, 8, 16, 24, 32, 40, 48, 56, 1, 9, 17, 25, 33, 41, 49, 57, 2, 10, 18, 26, 34, 42, 50,
58, 3, 11, 19, 27, 35, 43, 51, 59, 4, 12, 20, 28, 36, 44, 52, 60, 5, 13, 21, 29, 37, 45, 53,
61, 6, 14, 22, 30, 38, 46, 54, 62, 7, 15, 23, 31, 39, 47, 55, 63
};
where above scans correspond to raster scan and transposed order, specifically.
const int8_t g_lfnst8x8[4][2][16][64] =
{
  {
    {
        {-116, 28, 21, 1, 4, 1, 2, 0, 32,-19, -2, 0, -1, 0, 0, 0, 17, -1, -5, 0,
-1, 0, 0, 0, 1, 0, 0, 0, 0, 0, 0, 0, 4, 0, -1, 0, 0, 0, 0, 0, 1, 0, 0, 0,
0, 0, 0, 0, 1, 0, 0, 0, 0, 0, 0, 0, 0, 0, 0, 0, 0, 0, 0, 0 },
        { -24,-100, 50, 5, 9, 1, 3, 1, -34, 26, -15, 4, 0, 1, 0, 0, 28, 12, -10, -3,
-2, -1, -1, 0, -4, 3, 1, -1, 0, 0, 0, 0, 6, 3, -2, 0, 0, 0, 0, 0, -1, 1, 0,
0, 0, 0, 0, 2, 1, -1, 0, 0, 0, 0, 0, 0, 0, 0, 0, 0, 0, 0, 0, 0 },
        { 14, -41, 2, 10, 0, 2, 0, 1, 102, -7, -34, 0, -4, 0, -2, 0, -40, 32, 7, -6,
2, -1, 0, 0, -8, -4, 6, 0, 0, 0, 0, 0, -7, 3, 1, 0, 0, 0, 0, 0, -2, 0, 1,
0, 0, 0, 0, 0, -2, 1, 0, 0, 0, 0, 0, 0, -1, 0, 0, 0, 0, 0, 0, 0 },
        { 21, -10, 17, -2, -2, -1, -1, 0, -4,-106, 17, 23, 3, 5, 1, 2, 24, 24, -39, -1,
1, 0, 0, 0, -5, 22, 2, -8, 0, -1, 0, 0, -2, 3, 1, 0, -1, 0, 0, 0, -1, 5, 0, -
1, 0, 0, 0, 0, -1, 1, 0, 0, 0, 0, 0,-i, 2, 0, 0, 0, 0, 0, 0 },
        { 32, 40, 84, -49, 2, -11, 0, -4, 27, 26, -17, 11, -7, 1, -2, 0, 25, -21, -21,
11, 0, 2, 0, i,-23, 4, 5, -3, 2, 0, 1, 0, 0, -5, -3, 3, 0, 1, 0, 0, -5, 0,
0, 0, 0, 0, 0, 0, -2, -2, 1, 0, 0, 0, 0, -2, 0, 0, 0, 0, 0, 0, 0 },
        { 10, 2, -52, 18, -2, 4, 0, 1, 25, 18, -16, -8, 0, -1, 0, 0, 95, 7, -8, -7,
-5, -2, -2, -1, -48, 9, 15, 0, 2, 0, 1, 0, 3, -6, 4, 0, 0, 0, 0, 0, -9, 0, 2,
1, 0, 0, 0, 0, 1, -1, 1, 0, 0, 0, 0, 0, -3, 0, 1, 0, 0, 0, 0, 0 },
        { 2, -34, -6, -12, 7, 1, 2, 1, 41, 4, 83, -24, -10, -3, -3, -1, 13, -52, -5, 36,
-6, 4, -1, 1, 5, 13, -34, 2, 4, -1, 0, 0, -7, 8, 3, -4, 1, 0, 0, 0, -1, 1, -5,
1, 0, 0, 0, 0, -2, 2, 1, 0, 0, 0, 0, 0, -1, 1, -2, 0, 0, 0, 0, 0 },
```

```
        { 0, 13, 14, -14, 0, -1, 0, 0, -1, 20, 66, -26, -3, -4, -1, -2, 1, 90, -5, -3,
-7, -5, -1, -2, -16, -38, 12, 10, 1, 2, 0, 1, 2, -7, -9, 4, 1, 0, 0, 0, 0, -4,
-3, 1, 0, 0, 0, 0, 1, -1, -2, 0, 0, 0, 0, 0, 0, -2, -1, 1, 0, 0, 0, 0 },
        { 13, 19, 36, 92, -37, 8, -11, 1, 12, 21, 14, -2, 12, -7, 1, -2, 12, -2, -35,
-13, 10, 0, 2, 0, 37, -1, -8, -5, -4, 1, -1, 0, -16, 5, 3, -6, 2, -1, 1, 0, 4,
-3, -1, 0, -1, 0, 0, 0, -5, 1, 0, -2, 1, 0, 0, 0, 1, -1, 0, 0, 0, 0, 0, 0 },
        { -4, -1, 17, 43, -15, 3, -4, 0, -10, -11, 20, 6, 4, -1, 0, 0, -37, -30, 12, 1,
8, 2, 2, 1, -94, -8, 12, 2, 6, 2, 3, 1, 36, -8, -14, -2, -1, 0, 0, 0, -8, 5, 1,
-2, 0, 0, 0, 0, 9, 0, -3, -1, 0, 0, 0, 0, 0, 2, 0, 0, 0, 0, 0, 0 },
        { -15, -3, -32, -15, -1, 2, 2, 1, -4, 35, 8, 28, -7, -3, -2, -1, -35, 8, -85, 14,
22, 0, 5, 0, -14, 30, 20, -38, 2, -1, 0, 0, -2, -7, 21, 4, -4, 1, -1, 0, 2, -2,
-1, -1, 1, 0, 0, 0, 1, -2, 4, 1, 0, 0, 0, 0, 1, -1, 0, -1, 0, 0, 0, 0 },
        { -1, -5, -2, -8, -13, 7, -2, 2, -9, -20, -30, -87, 25, -1, 7, 1, -9, -19, -44, 33,
-7, 3, 1, 1, -4, -32, 36, 16, -5, 1, -2, 1, -10, 14, 1, -2, 2, -1, 0, 0, 6, -2,
3, 6, -1, 0, 0, 0, -1, 3, 0, -1, 1, 0, 0, 0, 1, 0, 1, 2, 0, 0, 0, 0 },
        { 0, -8, -17, -8, -15, 5, -1, 2, 6, -4, -5, 56, -9, -3, -2, -1, 14, -14, -21, 26,
17, -2, 1, -1, 10, -96, -12, 5, 6, 8, 1, 3, 13, 19, -20, -8, 0, -1, 0, 0, -2, 3,
4, -6, 0, 0, 0, 0, 1, 5, 0, -1, 0, 0, 0, 0, -1, 2, 1, -2, 0, 0, 0, 0 },
        { 8, 3, -4, 0, 10, -2, 1, -1, 11, 3, -1, -19, 3, 1, 0, 0, 2, 2, -18, -7, -3,
1, 1, 0, 38, 15, 2, -5, -7, -2, -2, 0, 106, 6, -30, 4, -5, -1, -2, 0, -33, 9, 9,
-2, 2, -1, 1, 0, 7, -3, 0, 1, -1, 0, 0, 0, -8, 1, 1, 1, 0, 0, 0, 0 },
        { -7,-12, -2,-39,-107, 29, -7, 8, 1, 0, 4, -1, 3, -11, 2, -1, 6, 3, 23, -3,
25, -6, 0, -1, 6, 22, 7, 0, -7, 1, -1, 0, 8, -4, -3, 8, 5, -2, 1, 0, -4, 0, 0,
0, 1, 1, 0, 0, 1, -1, -1, 2, 2, 0, 0, 0, -1, 0, 0, 0, 0, 0, 0, 0 },
        { -1, 12, 2, 12, -13, 4, -1, 1, -12, 3, -30, -11, -14, 2, 0, 1, -3, 37, 2, 69,
-4 , -10, -1, -3, -15, 22,-68, -4, 34, -3, 4, -1, 11, 17, 6,-34, 0, 2, -1, 0, -4,
-4, 10, 3, -2, 0, 0, 0, 1, -1, 1, -3, 0, 0, 0, 0, -1, -2, 3, 0, 0, 0, 0, 0 },
    },
    {
        { 103, -52, -9, 0, -1, -1, 0, 0, -49, 10, 11, 1, 1, 0, 1, 0, -9, 11, 1, -2,
0, 0, 0, 0, -2, 1, -2, 0, 0, 0, 0, 0, -1, 1, 0, 0, 0, 0, 0, 0, -1, 0, 0,
0, 0, 0, 0, 0, 0, 1, 0, 0, 0, 0, 0, 0, 0, 0, 0, 0, 0, 0, 0, 0 },
        { 57, 60, -45, -5, -6, -1, -3, 0, 56, -40, -17, 9, -1, 1, 0, 1, -37, -17, 22, 4,
1, 1, 1, 0, -6, 7, 5, -4, 0, 0, 0, 0, -7, -1, 1, 0, 1, 0, 0, 0, -1, 1, 1,
0, 0, 0, 0, 0, -2, -1, 1, 0, 0, 0, 0, 0, 0, 0, 0, 0, 0, 0, 0, 0 },
        { 1, -82, 25, 16, 3, 3, 1, 1, 88, -4, -8, -6, -6, -1, -2, 0, -22, 5, 1, -3,
1, 0, 0, 0, -13, 7, 3, 0, 1, 0, 0, 0, -6, 6, -1, -1, 0, 0, 0, 0, -3, 2, 0,
0, 0, 0, 0, 0, -1, 2, 0, 0, 0, 0, 0, 0, -1, 1, 0, 0, 0, 0, 0, 0 },
        { -32, -27, -30, 23, 1, 5, 0, 2, -27, -79, 39, 21, 1, 3, 1, 1, -24, 35, 35,
-15, -3, -3, 0, -1, 17, 19, -13, -10, 0, -1, 0, 0, 2, 2, -3, 0, 1, 0, 0, 0, 4,
3, -3, -1, 0, 0, 0, 0, 1, 0, 0, 0, 0, 0, 0, 1, 1, -1, 0, 0, 0, 0, 0 },
        { 7, 23, 88, -34, -6, -6, -1, -2, -13, -16, 11, -19, 4, 1, 1, 0, -69, 4, -1, 4,
10, 1, 2, 0, 20, 18, -11, 0, 0, -2, -1, -1, 4, -3,-b, 3, 0, 0, 0, 0, 4, 0,
-2, 2, 0, 0, 0, 0, -1, -2, 1, 0, 0, 0, 0, 2, 0, -1, 1, 0, 0, 0, 0 },
        { 28, 21, 37, -8, -9, -2, -2, -1, 26, -50, 40, -7, -3, 2, 0, 1, 72, 30, -33, -22,
1, -1, -1, -1, -15, -13, -20, 8, 7, 0, 1, 0, -10, 0, 3, 6, 0, -1, 0, 0, -4, 2,
-2, 0, 0, 0, 0, 0, -2, 0, 0, 1, 0, 0, 0, 0, -2, 1, -1, 0, 0, 0, 0, 0 },
        { -2, 20, -32, 19, -5, 3, -2, 1, 21, 54, 49, -29, -10, -4, -2, -2, -39, 51, -18,
-33, 9, -1, 2, -1, 14, -21, -30, 15, 9, 1, 0, 1, 0, -10, 5, 8, -1, -1, 0, 0, 2,
-5, -1, 2, -1, 0, 0, 0, -1, -1, 1, 0, 0, 0, 0, 0, 1, -2, -1, 1, 0, 0, 0, 0 },
        { -3, -11, -18, -61, 17, -1, 5, 0, 8, -5, -60, 5, 22, -1, 3, 0, 8, 72, -4, 16,
-5, -7, -1, -2, 34, -7, -19, 4, -7, 1, -1, 0, -5, -16, 5, 9, -1, 1, 0, 0, 1, -1,
5, 0, -2, 0, 0, 0, -3, -2, 2, 2, 0, 0, 0, 0, -1, 2, 0, -1, 0, 0, 0, 0 },
        { 12, 17, 28, 9, 3, -4, -1, -2, 15, 44, 4, 43, -10, -4, -4, -1, 26, 22, 68, -21,
-27, -2, -4, -1, 6, 32, -19, -42, 4, 1, 1, 0, 1, -11, -21, 4, 6, 0, 1, 0, -2, -3,
-1,-1, 0, 0, 0, 0, -4, -3, 1, 1, 0, 0, 0, -1, -1, 0, -1, 0, 0, 0, 0 },
        { 13, 14, 23, 90, -15, -3, -7, -1, -6, -10, -52, 7, -7, 4, 2, 1, 3, 18, -27, 1,
5, 1, 1, 0, 53, 0, 3, 3, -8, -1, -3, 0, -1, -11, 3, -8, -1, 2, 0, 1, 0, 0, 5,
-2, 1, 0, 0, 0, -4, -1, 1, -3, 0, 0, 0, 0, 0, 2, -1, 0, 0, 0, 0 },
        { -7, 14, 17, 20, 2, -4, -1, -2, -20, -3, -35, 20, 1, -1, 1, 0, -27, 48, 1, -18,
-6, -2, 1, -1, -94, -22, 16, 2, 9, 4, 3, 1, -6, 7, 11, 3, 0, -1, 0, 0, 7, 2,
-1, -4, -1, 0, 0, 0, 6, -1, -1, 0, 0, 0, 0, 3, -1, 0, 0, 0, 0, 0, 0 },
        { -2, 0, -13, 3, -26, 5, -2, 2, -10, -4, -32, -83, -7, 15, 4, 4, 20, 10, 25, -23,
28, 2, -1, -1, -20, 57, -2, -2, 12, -11, -1, -2, 3, -2, -22, 8, 3, -2, 2, 0, -1, -3,
3, 10, -1, -1, 0, 0, 2, -3, -1, 2, -1, 0, 0, 0, -1, -1, 1, 3, 0, 0, 0, 0 },
        { 4, 12, 3, 10, -1, -1, -2, 1, 9, 9, 33, -27, 18, -4, 1, -1, 9, 45, 15, 57,
-4, -13, -3, -4, -1, 6, 63, -9, -41, -1, -2, 0, -7, 15, -7, -39, 1, 6, 1, 1, 1, -4,
-11, 2, 5, 0, 0, 0, -1, 0, -3, -2, 0, 0, 0, 0, 0, -2, -3, 1, 1, 0, 0, 0 },
        { -2, -9, 12, -7, -53, 9, -1, 3, -4, -6, -6, -22, -21, 14, 1, 2, 4, -6, 62, 3,
1, 4, -4, 0, 14,-81, 5, 2, 3, 4, -1, 3, -23, -16, 15, 2, 8, 1, 1, 1, 3, 11,
2, -4, 2, -2, 0, 0, -3, 4, -3, -1, 3, -1, 0, 0, 1, 3, -1, 0, 1, -1, 0, 0 },
        { -7, -6, -11, -24, -91, 19, 2, 4, 2, 11, 2, 47, -33, 13, -2, -1, -5, 15, -34,
16, 18, 2, -1, -1, -4, 28, 8, -12, 5, -3, -1, 0, 8, 10, -1, -8, 5, -2, 0, 0, -1,
-7, -3, -1, 3, 0, 0, 0, 1, -1, 2, 1, 2, 0, 0, 0, 0, -2, 0, -1, 1, 0, 0, 0 },
        { -2, -2, -1, 24, -16, 4, -3, 2, 0, 3, 10, 4, 39, -1, -1, -1, 0, -9, 3, 67,
22, -19, -3, -3, -33, 2, -65, 0, -12, -5, 6, 1, -15, -40, -18, 16, 1, 7, 3, 1, 1,
2, 17, 3, -8, 0, -1, 0, 2, 0, 2, -4, -2, 0, 0, 1, 1, 3, -1, -1, 0, 0, 0 },
    },
},
```

-continued

```
{
  {
    {-108, 49, 5, 4, 1, 1, 1, 1, 43, -4,-b, -1, -2, 0, -1, 0, 10,-13, -1, 2,
0, 0, 0, 0, 4, -2, 3, 0, 0, 0, 0, 0, 2, -2, 0, -1, 0, 0, 0, 0, 1, 0, 0,
0, 0, 0, 0, 0, 1, -1, 0, 0, 0, 0, 0, 0, 1, 0, 0, 0, 0, 0, 0, 0, 0 },
    { 44, 17, -20, 0, -4, 0, -2, 0, 92, -50, -13, 2, -2, 0, -1, 0, -36, -20, 19, 3,
2, 1, 1, 0,-13, 11, 10, -3, 0, -1, 0, 0, -9, 5, 0, -3, 0, 0, 0, 0, -3, 4, -1,
0, 1, 0, 0, 0, -4, 1, 0, 0, 0, 0, 0, 0, -2, 1, 0, 0, 0, 0, 0, 0, 0 },
    { 22, -14, 6, -3, 1, -1, 0, 0, 36, 56, -36, -4, -5, -1, -2, 0, 61, -50, -30, 12,
-2, 3, -1, 1, -20, -34, 25, 11, 0, 2, 0, 1, -6, 3, 14, -5, -1, 0, 0, 0, -8, 1,
3,-3, 1, 0, 0, 0, -2, 1, 1, -1, 0, 0, 0, 0, -3, 0, 1, 0, 0, 0, 0, 0 },
    { -32,-101, 49, 4, 9, 2, 3, 1, 39, -12, 12, -5, -1, -1, 0, 0, -1, 16, 1, -8,
0, -1, 0, 0, -12, 13, 0, -3, 2, -1, 0, 0, -2, 11, -6, -1, 0, -1, 0, 0, -2, 4, -4,
0, 0, 0, 0, 0, 0, 3, -2, 1, 0, 0, 0, 0, -1, 1, -1, 0, 0, 0, 0, 0 },
    { 13, 8, -9, -2, -1, 0, -1, 0, 44, 11, 11, -13, 0, -3, 0, -1, 17, 67, -38, -19,
0, -3, -1, -1, 27, -33, -52, 15, 5, 3, 0, 1, -8, -33, 8, 24, 0, 1, 0, 1, -1, -7,
14, 4, -4, 0, -1, 0, -4, -2, 6, -2, -1, 0, 0, 0, -2, -1, 1, -1, 0, 0, 0, 0 },
    { 0, -5, -21, 9, -3, 3, -1, 1, -12, -79, 34, 14, 2, 3, 1, 1, 84, -7, 6, -8,
-5, -2, -2, 0, -4, -19, 3, -5, 2, 0, 1, 0, -9, 6, 14, -2, 1, -1, 0, 0, -4, 8, 0,
-5, 0, -1, 0, 0, -3, 4, 0, -2, 1, 0, 0, 0, -2, 3, -1, -1, 0, 0, 0, 0 },
    { 17, 19, 26, -18, 1, -4, 0, -2, 12, 17, -10, 1, -3, 0, -1, 0, 52, -4, 39, -17,
-5, -2, -1, -1, -3, 57, -33, -39, 6, -5, 1, -2, 6, -16, -51, 13, 9, 2, 2, 1, -5, -12,
-1, 18, 1, 0, 0, 0, 1, -6, 0, 6, -3, 0, 0, 0, -3, -3, 2, 1, -1, 1, 0, 0 },
    { -9, -38, -32, 19, 2, 4, 1, 2, -4, -10, -61, 28, -1, 5, 0, 1, 4, -7, 26, 23,
-7, 1, -2, 0, 70, 0, 1, -10, -13, 0, -3, 0, 8, -39, 1, 0, 1, 4, 0, 1, -3, -6,
24, 1, 1, 0, 0, 0, -3, 3, 8, -8, -1, -1, 0, 0, -2, 2, 3, -4, 1, 0, 0, 0 },
    { -14, -22, -87, 39, -5, 10, -1, 4, 13, 46, 22, 0, -5, -2, -2, -1, 5, 19, 33,
-22, -5, -4, -1, -1, -30, 5, 2, -12, 5, 0, 1, 0, -2, 17, -9, -6, 3, -1, 1, 0, 1,
-4, -11, 3, 2, 0, 0, 0, 2, -2, -1, 3, 0, 0, 0, 0, 1, -3, 0, 1, 0, 0, 0, 0 },
    { -12, -7, -9, -5, 5, -1, 2, 0, -20, -18, -58, 23, 5, 4, 1, 2, -7, 8, 1, -6,
2, -1, 1, -1,-79, 1,-31, 11, 15, 2, 4, 1, -5,-12, 15, 44, 0, 1, -1, 0, 5, 12,
28, 0, -13, -2, -2, 0, 7, 1, 4, -6, -4, 1, 0, 0, 1, 2, 5, -3, -1, 1, 0, 0 },
    { 4, 13, 1, -4, 0, -2, 0, 0, 1, -12, -52, 15, 3, 2, 1, 1, 20, 78, -23, 18,
-6, -3, -2, -2, -12, 16, 40, -7, -17, -1, -2, -1, 1, 29, -10, -33, -3, 1, 0, 0, 3, -7,
-31, -2, 8, 2, 1, 0, 0, -11, -5, 11, 3, 1, 0, 0, 1, -5, 2, 4, -1, 0, 0, 0 },
    { 4, 14, 36, -11, -3, -3, -1, -1, 4, 23, -1, 22, -8, 2, -2, 0, -2, 28, 74, -13,
-18, -2, -3, -1, -1, -46, 10, -23, -3, 4, 1, 1, -31, -3, 32, -8, 5, 1, 1, 0, 0, 28,
3, -26, 1, -2, 0, -1, -4, 6, -17, -9, 7, 0, 1, 0, 0, 3, -8, 0, 4, 0, 0, 0 },
    { -7, -5, -5, -7, 2, 1, 1, 0, -12, -11, -11, -24, 9, 0, 3, 0, -13, -3, -6, 6,
4, 1, 1, 1, -3, -46, 8, -29, 4, 2, 1, 1, -67, 0, -43, -2, 35, 2, 6, 1, -5, 0,
-2, 56, 11, -5, 0, -1, 1, 9, 19, 15, -15, -5, -1, -1, 5, 2, 5, -1, -7, 1, 1, 0 },
    { -5, -12, -19, -49, 13, -3, 4, -1, -1, -5, -31, 0, 7, 2, 1, 1, -1, -17, 12, -35,
6, 1, 1, 1, 35, -18, -35, 11, 26, -1, 3, 0, 7, 53, 8, 11, -2, -9, -1, -2, 13, 4,
-47, -6, 0, 0, 1, 0, -4, -18, -9, 28, 5, 1, 1, 0, 3, -3, 8, 9, -6, -1, -1, 0 },
    { -11, -13, -37, -94, 28, -8, 9, -3, 6, 7, 25, -11, 10, -3, 1, -1, 5, 11, 13,
45, -6, -2, -2, 0, -12, 11, 9, 8, -16, -1, -2, 0, -1, -21, 6, -5, -6, 5, 0, 1, -9,
1, 12, -1, 3, 2, 0, 0, 2, 9, 3, -6, -1, -1, -1, 0, -2, 2, -5, -2, 1, 0, 1, 0 },
    { -1, 1, -7, 13, -4, 3, -2, 2, -8, 0, -22, -77, 15, -3, 5, 0, 14, 5, 7, -1,
20, -2, 2, -1, 17, 45, 3, 13, 0, -8, -2, -2, -50, 5, 22, 6, -4, -3, 0, 0, 0, 38,
10, -17, -8, -3, 0, -1, -4, 7, -27, -12, 6, 2, 1, 0, 0, -2, -8, 10, 4, 0, 0, 0 },
  },
  {
    { -78, 50, -4, 3, -1, 1, 0, 0, 73, -38, -5, 0, -1, 0, 0, 0, -25, -2, 13, -2,
2, -1, 1, 0, 6, 10, -7, -1, 0, 0, 0, 0, -2, -6, 0, 2, 0, 0, 0, 0, 2, 2, 1,
-1, 0, 0, 0, 0, -1, -1, 0, 0, 0, 0, 0, 0, 1, 1, 0, 0, 0, 0, 0, 0 },
    { -63, -1, 19, 1, 3, 0, 1, 0, -15, 57, -25, 0, -3, 0, -1, 0, 59, -54, -2, 8,
-2, 2, -1, 1, -23, 7, 21, -9, 2, -1, 1, 0, 8, 7, -14, 0, 1, 0, 0, 0, -2, -5, 4,
3, -1, 0, 0, 0, 4, 1, -1, -2, 0, 0, 0, 0, -1, -1, 1, 0, 0, 0, 0, 0 },
    { 52, -27, 12, -4, 0, -1, 0, 0, 52, -2, -28, 2, -3, 1, -1, 0, -20, -50, 36, 2,
2, 1, 1, 0, -34, 52, 2, -16, 4, -3, 1, -1, 7, -5, -23, 10, 0, 1, 0, 0, -5, -2,
12, 1, -2, 0, 0, 0, 0, 2, -4, -2, 1, 0, 0, 0, -3, 0, 2, 1, 0, 0, 0, 0 },
    { -40, -39, 36, -3, 6, -1, 2, 0, -36, 19, -8, 2, 1, 0, 0, 0, -38, 28, 22, -6,
1, -2, 1, -1, 22, 41, -44, -3, -1, -1, -1, 0, 20, -43, 1, 20, -4, 3, -1, 1, -1, 9,
18, -12, -1, -1, 0, 0, 3, -1, -11, 0, 3, 0, 0, 0, 1, 0, 3, 2, -1, 0, 0, 0 },
    { -14, -68, 30, 6, 5, 1, 2, 0, 54, 32, 1, -20, -1, -4, 0, -1, -32, 13, -41, 18,
0, 3, 0, 1, 22, -28, 30, 6, -7, 2, -2, 1, -14, 13, 1, -18, 5, -1, 1, 0, 1, 1,
-7, 8, 1, -1, 0, 0, -2, 0, 2, -2, -2, 0, 0, 0, 0, -1, 1, 1, 0, 0, 0 },
    { 27, 19, 8, -12, 0, -3, 0, -1, 37, 32, -41, 8, -5, 1, -2, 0, 30, -6, -6, -5,
-2, 0, -1, 0, 17, -35, -34, 19, 0, 3, 0, 1, -2, -45, 53, 9, -6, 2, -1, 1, -13, 25,
6, -26, 4, -2, 1, -1, -3, -5, -11, 8, 3, 0, 0, 0, -3, 2, 5, -1, -1, 0, 0, 0 },
    { 18, 58, -13, -1, -5, -1, -2, -1, -20, 46, -27, -12, 2, -2, 0, 0, -54, -18, -6,
29, -1, 5, 0, 1, 51, -1, 23,-18, -5, -1, -1, 0, -9, -11, -25, 2, 8, 0, 2, 0, 7,
-8, 16, 10, -5, 1, -1, 0, -1, 1, -1, -9, 0, 0, 0, 0, 2, -3, 0, 4, 1, 0, 0, 0
  },
    { 8, 4, -25, 15, -3, 3, -1, 1, 30, 19, 32, -24, 1, -4, 0, -2, 33, 29, -39, -1,
0, -1, -1, -1, -8, 8, -20, -4, 1, 0, 0, 0, 17, -29, -36, 31, -1, 3, -1, 1, 3, -35,
51, 4, -10, 3, -2, 1, -6, 17, -3, -23, 6, -1, 1, -1, -2, -7, -5, 11, 2, -1, 0, 0 },
    { 4, 30, -4, -15, 4, -3, 1, -1, 5, 47, 14, -5, -7, -2, -2, -1, -34, 10, -27, -22,
15, -3, 3, -1, -46, 26, -12, 40, -8, 3, -1, 0, 42, -1, 7, -29, -7, 2, -2, 0, -13,
```

-continued

```
−11, −33, 14, 14, −2, 2, 0, 11, −10, 17, 14,-b, 1, −2, 0, −2, −2, 0, −8, 1, 1, 0,
0 },
    { 16, 24, 62, −30, 0, −6, 0, −3, 14, 6, −22, −2, 4, −1, 0, 0, 31, 48, 7, −8,
−8, −2, −2, −1, 12, 6, −24, −23, 6, −2, 1, −1, −19, 21, −37, 6, 7, −2, 2, −1, 11, −21,
−28, 24, −3, 3, −1, 1, 0,−19, 21, 11, −5, 2, −1, 1, 0, 2, 2, −8, −1, 0, 0, 0 },
    { 3, 24, 60, −22, −3, −5, 0, −2, −18, −30, −15, −18, 14, −1, 4, 0, −25, 0, −34,
28, −3, 3, 0, 1, −54, −20, 14, 8, 4, 4, 1, 1, 12, 10, 15, 23, −7, 0, −2, 0, 9,
−4, 29, −25, −8, 2, −1, 0, −5, 16, −15, −9, 12, −3, 2, −1, 3, −1, −3, 8, −3, −1, 0,
0 },
    { −9, −5, −31, 10, −4, 3, 0, 2, 4, 46, −1, 0, 2, −3, 0, −1, −31, 10, 22, −22,
−7, 0, 0, 0, −38, −25, −26, −10, 28, −1, 5, 0, −38, 43, 6, 43, −9, −3, 0, −1, 31, −3,
−4, −21, −12, 5, −3, 1, −6, −9, −6, 10, 11, −1, 1, 0, 7, 1, 6, 1, −6, 0, 0, 0 },
    { −11, −23, −22, −15, 11, −1, 3, 0, −10, −20, −50, 33, −2, 5, −1, 2, −15, −10, −10,
−3, 4, 2, 1, 0, −10, −30, −16, 24, 3, 3, 1, 1, −1, −11, −3, 15, 3, 2, 0, 0, 6,
−31, 20, 41,-b, 2, −2, 1, 7, −1, 58, −24, −14, 3, −3, 1, −5, 14, −10, −16, 11, −2,
1, 0 },
    { −4, −11, −37, 6, −1, 3, 0, 2, 6, −1, −56, 21, 14, 0, 2, 0, 6, 49, 7, 30,
−23, 0, −4, 0, −6, 0, 24, −18, −1, 1, −1, 0, 51, 9, −5, −8, −10, −2, −2, 0, −12, −25,
−11,−25, 12, 4, 2, 1, −6, 8,−12, 28, 9, −5, 1, −1, 5, −9, 12, 0,−13, 3, −1, 0
},
    { 5, 10, 18, −14, 5, −3, 1, −1, 13, 25, 21, 46, −17, 1, −5, 0, −1, 21, 42, −18,
−11, −1, −2, −1, 10, −7, 28, 2, −5, 0, −1, 0, 27, 23, 17, −16, −1, 0, −3, −2, −1, 8,
−9, 19, −17, −13, 2, −2, 0, −1, 19, 1, −55, 7, 2, 0, 0, −8, 4, −40, 6, 19, −5, 3,
−1 },
    { 4, −4, 18, 0, −9, 2, −1, 0, 3, −9, 20, 2, 2, −2, 0, 0, −3, −47, −8, −17, −3,
6, 1, 2, 50, −7, −15, 19, 21, −4, 2, −1, 33, 20, −1, 13, −35, 0, −4, 0, 12, −55,
−6, −28, 15, 11, 0, 3,−16, 7, 16, 27, 11, −10, 1, −2, 5, 2, 7, −11, −14, 3, 0, 0
},
  },
 },
 {
  {
    {−120, 33, 6, 5, 2, 2, 1, 1, −3, 0, 1, 0, 0, 0, 0, 0, 25, −5, −1, −1, 0,
0, 0, 0, 6, −1, −1, 0, 0, 0, 0, 0, 4, −1, 0, 0, 0, 0, 0, 0, 2, −1, 0, 0,
0, 0, 0, 0, 2, −1, 0, 0, 0, 0, 0, 0, 1, 0, 0, 0, 0, 0, 0, 0 },
    { 2, 1, 1, 0, 0, 0, 0, 0,−119, 23, 9, 3, 3, 1, 1, 1, −16, −1, 2, 0, 1,
0, 0, 0, 33, −5, −3, 0, −1, 0, 0, 0, 15, −2, −1, 0, 0, 0, 0, 0, 5, −1, 0, 0,
0, 0, 0, 0, 1, 0, 0, 0, 0, 0, 0, 0, 2, 0, 0, 0, 0, 0, 0, 0 },
    { 21, −17, 4, −2, 1, −1, 0, 0, −14, −2, 2, 1, 0, 0, 0, 0, 119, −15, −10, −2,
−4, −1, −2, 0, 18, 2, −3, 0, −1, 0, 0, 0, −21, 3, 1, 0, 0, 0, 0, 0, −7, 1, 1,
0, 0, 0, 0, 0, −2, 1, 0, 0, 0, 0, 0, 0, −2, 0, 0, 0, 0, 0, 0, 0 },
    { 2, −9, 4, −1, 1, 0, 0, 0, 35, −13, 1, −2, 0, −1, 0, 0, −10, −4, 0, 1, 0,
0, 0, 0, 113, −12, −11, −2, −4, −1, −2, 0, 37, 3, −4, −1, −1, 0, −1, 0, −15, 3, 1,
0, 0, 0, 0, 0, −10, 0, 1, 0, 0, 0, 0, 0, −3, 0, 0, 0, 0, 0, 0, 0 },
    { 30, 106, −46, 9, −12, 2, −5, 0, 6, 20, −8, 1, −2, 0, −1, 0, 7, −31, 10, −2,
2, 0, 1, 0, 11, −11, 2, 0, 0, 0, 0, 0, −8, −1, 2, −1, 1, 0, 0, 0, −6, −1, 1,
0, 0, 0, 0, 0, −3, −2, 1, 0, 0, 0, 0, 0, 0, 0, 0, 0, 0, 0, 0, 0 },
    { 5, 12, 1, −1, 0, 0, 0, 0, −16, −99, 34, −5, 8, 0, 3, 1, −4, −53, 10, 1,
2, 1, 1, 1, −12, 26, −9, 3, −2, 0, 0, 0, 20, 19, −6, 0, −1, 0, 0, 0, 12, 7,
−3, 0, −1, 0, 0, 0, 1, 0, 0, 0, 0, 0, 0, 0, 2, −1, 0, 0, 0, 0, 0, 0 },
    { 8, 2, −2, 1, −1, 0, 0, 0, 7, 20, −9, 1, −2, 0, −1, 0, 27, −1, 0, −2, 0,
−1, 0, 0, −31, −12, 6, 0, 2, 0, 1, 0, 112, −13, −10, −1, −3, 0, −1, 0, 31, 0, −4,
0, −1, 0, −1, 0, −3, 1, −1, 0, 0, 0, 0, 0, −3, 1, 0, 0, 0, 0, 0, 0 },
    { −7, −31, 18, −4, 5, −1, 2, 0, 9, 43, −4, 0, −3, −1, −1, −1, −13, −99, 21, 0,
5, 2, 2, 1, −7, −39, 2, 0, 1, 1, 1, 1, −8, 28, −6, 0, −1, 0, 0, 0, 1, 6, −1,
0, 0, 0, 0, 0, 5, 0, −1, 0, 0, 0, 0, 0, 2, 1, −1, 0, 0, 0, 0, 0 },
    { −3, −1, 2, 0, 0, 0, 0, 0, −9, 2, 0, 1, 1, 0, 0, 0, −1, 1, 0, 0, 0,
0, 0,−24, 9, 0, 1, 0, 0, 0, 0, 26, 14, −4, 0, −1, 0, 0, 0,−112, 7, 12, 1,
3, 1, 2, 0, −43, −4, 6, 0, 1, 0, 1, 0, −5, −1, 1, 0, 0, 0, 0, 0 },
    { 16, 46, 99, −31, 13, −12, 2, −5, 6, 13, 38, −10, 2, −3, 0, −1, −1, 4, −24, 7,
−5, 2, −1, 1, −2, −9, −12, 3, −1, 1, 0, 0, −1, −13, −4, 1, 0, 1, 0, 0, −2, −3,
−2, 1, 0, 0, 0, 0, 2, −2, −2, 0, 0, 0, 0, 0, 1, 0, −1, 0, 0, 0, 0, 0 },
    { 0, 5, 7, −4, 1, −1, 0, 0, 6, 40, −8, −1, −3, −1, −1, 0, −3, −6, −11, 2, −1,
0, 0, 0, 8, 95, −22, −2, −3, −2, −2, −1, 7, 63, −4, −4, −2, −2, −1, −1, 20, −6, 3,
−1, 0, 0, 0, 0, −8, −9, 2, 0, 0, 0, 0, 0, −8, −5, 2, 0, 0, 0, 0, 0 },
    { 3, 1, −4, −1, −1, 0, −1, 0, 2, 2, 1, 0, 0, 0, 0, 0, 3, 1, −2, 0, 0, 0,
0, 0, 1, 12, −6, 0, 0, 0, 0, 0, 16, 8, 0, −1, −1, −1, −1, 0, −37, −6, 5, 0, 1,
0, 1, 0, 104, −7, −10, 0, −3, −1, −1, 0, 59, 0, −7, 0, −2, 0, −1, 0 },
    { −4, −11, −30, 6, −4, 3, −1, 1, 12, 30, 98, −25, 8, −8, 1, −3, 6, 17, 48, −9,
3, −3, 0, −1, −3, 0, −28, 7, −4, 2, −1, 0, 0, −3, −12, 2, −2, 1, 0, 0, −3, −6,
1, −1, 0, 0, 0, −3, 0, 0, 0, 0, 0, 0, 0, −1, −2, −2, 0, 0, 0, 0, 0 },
    { 3, 13, 4, −1, −1, −1, 0, −1, −3,−12, −2, 1, 0, 0, 0, 0, 6, 43, 5, −5, −1,
−2, −1, −1, −5, −52, 4, 0, 1, 1, 0, 1, −1, 92, −21, −1, −3, −2, −1, −1, 10, 46, −3,
−3,−1,−1,0,−1,5,−9, 1, 0, 0, 0, 0, 0, −1, −3, 1, 0, 0, 0, 0, 0 },
    { −3, −8, −32, 10, −5, 4, −1, 2, 1, 4, 19, 2, 1, 0, 0, 0, −8, −12, −91, 23,
−8, 6, −1, 3, −10, −25, −66, 9, −2, 3, 0, 2, 2, 3, 13, −5, 3, −1, 1, 0, 2, 11,
11, −3, 1, 0, 0, 0, −1, 6, 4, −1, 1, 0, 0, 0, −2, 1, 2, 0, 1, 0, 0, 0 },
    { 0, 1, 0, 0, 0, 1, 0, 0, −2, 0, 0, 0, 0, 0, 0, 0, −1, 0, 2, 0, 0, 0,
0, 0, 0, 0, 1, 1, 0, 0, 0, 0, 3, 0, 1, 0, 0, 0, 0, 0, −17, −3, 0, 0, 0,
```

-continued

```
0, 0, 0, 57, 5, -7, 0, -2, 0, -1, 0,-112, 2, 11, 0, 3, 0, 1, 0 },
    },
    {
        { 79, -43, 4, -4, 1, -1, 0, -1, -76, 35, 2, 1, 1, 1, 0, 0, 32, -7, -7, 1, -1,
0, -1, 0, -8, -3, 4, 0, 0, 0, 0, 0, 2, 3, -1, 0, 0, 0, 0, 0, -1, -1, 0, 0,
0, 0, 0, 0, 1, 1, 0, 0, 0, 0, 0, 0, -1, 0, 0, 0, 0, 0, 0, 0 },
        { -75, 6, 10, 1, 3, 0, 1, 0, -27, 34, -10, 2, -2, 1, -1, 0, 72, -34, -1, 0,
-1, 0, -1, 0, -43, 9, 8, -2, 2, 0, 1, 0, 16, 4, -6, 1, -1, 0, 0, 0, -4, -3, 2,
0, 0, 0, 0, 0, 4, 0, -1, 0, 0, 0, 0, 0, -1, -1, 0, 0, 0, 0, 0, 0 },
        { 33, -46, 24, -7, 4, -2, 1, 0, 76, 23, -27, 1, -5, 0, -2, 0, -7, -35, 12, 1,
1, 1, 0, 0, -46, 27, 4, -3, 2, -1, 1, 0, 29, -5, -9, 3, -1, 0, -1, 0, -14, -1,
6, -1, 1, 0, 0, 0, 4, 2, -3, 0, 0, 0, 0, 0, -3, -1, 1, 0, 0, 0, 0, 0 },
        { 45, 59, -40, 6, -8, 1, -3, 0, 9, -56, 24, 0, 3, 1, 1, 0, 41, -7, -4, -8,
1, -2, 0, -1, -53, 17, -4, 3, 1, 0, 0, 0, 20, -2, -1, 1, -1, 0, 0, 0, -6, -1, 0,
0, 0, 0, 0, 0, 1, 0, 1, 0, 0, 0, 0, 0, -1, 0, 0, 0, 0, 0, 0, 0 },
        { 11, -23, 2, 1, 1, 0, 0, 0, 52, -4, 10, -7, 1, -2, 0, -1, 61, 19, -30, 5,
-4, 0, -2, 0, 0, -50, 18, 2, 0, 2, 0, 1, -51, 36, 6, -6, 2, -1, 1, -1, 27, -7,
-12, 3, -1, 0, 0, 0, -10, -2, 6, 0, 0, 0, 0, 0, 3, 2, -1, -1, 0, 0, 0, 0 },
        { 21, 39, -7, -1, -3, 0, -1, 0, 9, 20, -29, 9, -4, 2, -1, 1, 18, -66, 38, -5,
3, 0, 1, 0, 44, 26, -12, -9, 2, -3, 0, -1, -57, -2, -2, 8, 0, 1, 1, 0, 26, 2,
1, -2, -1, 0, -1, 0, -9, -4, 0, 0, 1, 0, 0, 0, 1, 2, 1, 0, 0, 0, 0, 0 },
        { -3, 13, -23, 15, -6, 3, -2, 1, -16, 23, 12, -11, 1, -2, 0, -1, -62, -29, -7, 6,
3, 1, 1, 1, -54, -10, 30, -1, 2, 0, 1, 0, -15, 50, -13, -4, 1, -1, 0, -1, 43, -21,
-7, 6, -2, 1, -1, 0, -18, 0, 7, -2, 1, 0, 0, 0, 6, 0, -2, 1, 0, 0, 0, 0 },
        { 3, 10, 62, -37, 11, -9, 3, -3, -23, -43, -51, 30, -2, 6, 0, 1, -7, 27, 28, -6,
-6, 1, -2, 0, -39, -9, -8, -6, 8, -1, 2, 0, -17, 14, 4, 8, -2, 0, 0, 0, 29, 1,
-5, -5, -1, 0, -1, 0, -10, -5, 2, 3, 1, 0, 0, 0, 2, 4, 0, -1, 0, 0, 0, 0 },
        { -21, -62, -9, 12, 1, 3, 1, 1, -10, -38, 38, -13, 5, -2, 2, 0, 0, -4, 8, -5,
5, -2, 2, -1, -22, 55, -25, 6, -5, 1, -1, 0, -44, -28, 11, 4, 1, 2, 0, 1, 36, 12,
-1, -3, -1, -1, 0, 0, -11, -2, -1, 0, 1, 0, 0, 0, 2, 2, 0, 1, 0, 0, 0, 0 },
        { 1, 17, -8, 2, -1, 0, 0, 0, 32, -4, 2, -1, 0, -1, 0, -19, 11, -2, -4, 1,
-2, 1, 0, -47, -17, -9, 9, -1, 3, 0, 1, -65, -24, 34, -6, 4, 0, 1, 0, -51, 36, -9,
-2, 3, -1, 1, -1, 35,-13, -4, 5, -3, 1, -1, 1,-17, 2, 5, -3, 1, 0, 0, 0 },
        { 5, 15, -19, 3, -4, 2, -1, 1, 15, 53, -7, 7, -4, 0, -2, -1, 5, 33, 5, -16,
2, -3, 0, -1, -9, -8, -39, 17, -3, 3, -1, 1, 36, -31, 35, -3, -2, 1, -1, 0, 62, 16,
-21, -7, 1, -2, -1, -1, -26, -17, 6, 6, 0, 1, 0, 0, 9, 5, 0, -3, 0, 0, 0, 0 },
        { 12, 38, 42, -11, 6, -6, 1, -2, 2, 12, 2, -22, 4, -4, 2, -1, -2, 8, -66, 39,
-10, 7, -2, 1, -3, 36, 33, -12, -5, -1, -2, -1, -12, -48, -9, -3, 6, 0, 1, 1, 20, 7,
8, 3, -2, -1, 0, 0, -14, 5, -4, 1, 0, 0, 0, 0, 4, -4, 0, 3, 0, 0, 0, 0 },
        { 1, -2, 22, -13, 9, -5, 2, -2, -4, -25, 15, -1, -2, 1, 0, 1, -6, -49, -22, 4,
3, 1, 1, 1, 17, -3, 8, 16, -6, 3, -2, 0, 28, 18, 30, -22, 3, -3, 0, -1, 24, 40,
-43, 4, 1, -2, 0, -1, 44, -39, 5, 9, -5, 2, -1, 1, -25, 9, 6, -6, 2, -1, 0, 0 },
        { 5, 3, 17, 62, -36, 13, -8, 3, -3, -3, -37, -50, 24, -5, 4, 0, 7, 24, 22, 15,
0, -5, 1, -2, -1, 0, -4, -4, -8, 3, -1, 1, 4, 4, -16, 2, 5, -1, 0, 0, 28, 1, 9,
2, -4, 0, -1, 0, 48, -7, -12, -3, 0, 0, -1, 0, -29, -3, 7, 2, 0, 0, 0, 0 },
        { -2, 0, -32, -36, 21, -7, 4, -2, 7, 18, 14, 37, -17, 4, -3, 0, 1, 28, -7, -9,
-4, 3, -2, 1, 2, 21, 7, -16, 9, -6, 2, -2, -6, 2, -29, 16, -5, 2, 0, 0, 37, -17,
14, -1, -2, 1, -1, 0, 67, 4,-12, -5, -1, -1, -1, 0,-40, -8, 5, 3, 1, 0, 1, 0 },
        { -7, -24, -55, 7, -2, 3, 0, 1, -5, -24, -43, 19, -3, 5, -1, 2, -1, -8, 3, 24,
-10, 5, -2, 1, -2,-28, 49,-33, 10, -4, 2, 0, 7, -37, -10, 11, 5, 0, 2, 0, 11,
48, 1, -2, -4, -1, -1, 0, -13, -16, -2, 1, 2, 1, 0, 1, 6, 5, 4, 0, -1, 0, 0, 0
    },
    },
    },
    {
        {-113, 37, 12, 2, 3, 1, 1, 0, 18, -32, 6, 1, 1, 0, 0, 0, 23, -6, -10, 1,
-1, 0, 0, 0, 2, 3, -2, -2, 0, 0, 0, 0, 4, 0, 0, -1, 0, 0, 0, 0, 1, 1, 0,
0, 0, 0, 0, 0, 2, 0, 0, 0, 0, 0, 0, 0, 0, 0, 0, 0, 0, 0, 0, 0 },
        { 7, 49, -19, -1, -3, -1, -1, 0, -89, 12, 39, -5, 5, -1, 2, 0, 23, -53, 5, 10,
0, 2, 0, 1, 11, 4, -16, 1, 0, 0, 0, 0, 3, -2, 1, -2, 0, 0, 0, 0, 3, 1, -2,
0, -1, 0, 0, 0, 1, -1, 0, 0, 0, 0, 0, 0, 1, 0, -1, 0, 0, 0, 0, 0 },
        { 32, -17, 10, -6, 2, -2, 0, -1, -6, -75, 17, 17, 1, 4, 0, 1, 41, 4, -63, 9,
-1, 2, -1, 1, -14, 46, -5, -19, 2, -3, 0, -1, -1, 0, 10, -3, -1, 0, 0, 0, -3, 6,
1, -2, 0, 0, 0, 0, 0, 2, 0, -1, 0, 0, 0, -1, 2, 0, 0, 0, 0, 0, 0, 0 },
        { 32, 95, -31, -11, -6, -3, -3, -1, 30, -11, 7, 0, -1, -1, 0, 0, -7, 33, -6, -14,
1, -2, 0, -1, -18, -2, 42, -4, -4, -1, 0, 0, -19, 1, 17, 0, 1, 0, 0, -4, -1,
-2, 0, 3, 0, 0, 0, 0, -4, 0, 2, 0, 0, 0, 0, -1, 0, 0, 0, 1, 0, 0, 0 },
        { -19, -20, 14, -1, 2, 1, 1, 0, -71, 3, -35, 14, 3, 3, 1, 1, 18, 49, -9, -42,
3, -5, 1, -2, 2, -10, 56, -3, -12, 0, -2, 0, 9, -16, -6, 21, -1, 0, 0, 0, 1, 1,
-2, -1, 2, 0, 0, 0, 3, -2, -1, 2, 0, 0, 0, 0, 1, 0, 0, -1, 1, 0, 0, 0 },
        { -9, -14, -57, 18, -2, 5, -1, 2, 18, 51, -21, -26, 2, -5, 1, -2, 67, 0, 0, -7,
-6, -1, -2, 0, -20, 45, 3, -13, 0, -3, 0, -1, -4, -7, 32, -2, -2, -1, 0, 0, -2, -3,
1, 8, -1, 0, 0, 0, -1, -2, 5, 0, 1, 0, 0, 0, -1, 0, 2, 0, 0, 0, 0, 0 },
        { 19, -1, 20, -3, -3, -1, -1, -1, 12,-27, 4,-16, 5, -1, 1, 0, 71, 0, 52, -8,
-21, 0, -5, 0, -19, -22, 1, 58, -4, 4, -1, 1, -6, 5, -39, 2, 11, 0, 2, 0, -6, 6,
0,-5, 1, 0, 0, 0, -1, 1, -5, -1, 1, 0, 0, 0, -2, 2, 0, -1, 0, 0, 0, 0 },
        { 6, 35, -2, 20, -7, 1, -2, 0, -21, -11, -68, 12, 11, 3, 3, 1, -1, 28, 0, 1,
-2, -4, 0, -2, -17, -5, -45, 4, 28, -1, 5, 0, 3, 23, 2, -60, 2, 1, 1, 0, 4, -5,
```

30, 1, −12, 0, −2, 0, 1, 1, 0, −2, 0, 0, 0, 0, 1, −2, 7, 0, −2, 0, 0, 0 },
    { −14, −13, 5, −1, 3, −2, 2, −1, −18, 17, 45, −10, −10, 0, −3, 0, −7, 45, 2, 52,
−7, −4, −2, −1, −67, −12, −1, 3, 38, −1, 6, −1, 14, −37, −2, −17, 0, 9, 0, 3, 0, 0,
−8, 1, −4, 1, 1, 0, 4, −4, −1, −3, 0, 0, 0, 0, 0, 0, −2, 0, −1, 0, 0, 0 },
    { 12, 28, 93, −26, −3, −6, −1, −3, 13, 54, −9, 20, −8, −1, −2, −1, 29, −13, −11,
3, 8, −1, 0, 0, −10, 12, 0, −12, 1, 1, 0, 0, −5, −5, 21, −1, −6, 0, −1, 0, −1,
−10, 0, 14, −1, 0, 0, 0, −3, −1, −5, 2, 3, 0, 0, 0, 0, −3, −1, 1, 0, 1, 0, 0
},
    { −4, 0,−19, 0, 1, 2, −1, 1, 11, 38, −3, 50, −9, −1, −3, −1, 14, −10, −44, 7,
24, −1, 4, 0, −7, −9, −2, 12, 3, 1, 0, 0, −14, 1, −59, −1, 32, 0, 5, 0, −1, 15,
4, −57, 2, 5, 0, 1, 2, −2, 14, −3, −11, 2, −1, 0, 0, 2, 2, −5, −2, 0, 0, 0 },
    { 8, −7, −10, 17, 3, 3, 0, 1, 12, −11, −17, 11, 5, 1, 2, 0, 23, −39, −4, −6,
30, 1, 4, 0, −32, −68, 3,−45, 0, 19, 2, 5, 38, −11, −5, 1, −41, 3, −3, 1, −5, 16,
−11, 16, −3, −8, 1, −1, 4, 5, −3, −3, 1, −2, 0, 0, −2, 5, 0, 1, 0, 0, 0, 0 },
    { 3, 0, −15, −31, 9, −4, 2, −1, 4, 14, 27, −3, −24, 1, −4, 0, 39, 52, −7, 24,
7, −11, 0, −3, 61, −35, −10, −21, 10, 7, −1, 2, 10, 41, −1, −5, −19, −2, −1, −1, −10,
2, 20, 9, 5, −5, 0, −1, −2, −2, −2, 5, 2, 2, −1, 0, −3, 0, 1, 0, 2, 0, 0, 0 },
    { −8, −14, −14, −56, 6, 1, 3, 0, 4, 6, 31, 5, 9, −4, 1, −1, −8, −10, −1, −47,
5, 12, 1, 3,−28, 0, 9, 3,−19, 3, −1, 0, 4, 7, −2,−41, −2, 5, 1, 1, 11, 0,
47, 7,−46, −1, −3, 0, −1, −2, −7, 37, 3,−12, 1, −1, 1, 1, 0, −1, 4, −1, −1, 0 },
    { −7, 2, −2, −12, 7, 0, 1, 0, −13, 3, 4, −4, −11, 1, 0, 0, −12, 11, 3, −3, 7,
6, 0, 1, −60, 5, −24, −5, −43, 9, 3, 2, −1, 60, 1, 33, −6, −38, 2, −7, −14, −8, 15,
−2, 46, −3, −4, 0, 6, −8, 2, −13, −1, 11, −1, 0, −2, −2, 4, 1, −1, 1, 1, 0 },
    { −4, −2, −10, 22, −34, 5, −3, 2, 3, 14, 13, 44, 2, −2, −1, −1, −6, 3, −17, −3,
−25, 3, 2, 1, 1, 8, −1, 31, −3, −11, −1, −2, 2, 6, −16, 2, −23, −3, 4, 0, −3, 26,
3, 50, 7, −41, −1, −5, −7, −5, −14, −4, 59, 2, −7, 0, 1, −2, 1, −18, −1, 12, −1, 0
},
    },
    {
    { 110, −32, −9, −3, −2, −1, −1, 0, −40, 29, 0, 1, 0, 0, 0, 0, −23, −2, 7, 0,
1, 0, 1, 0, 4, −3, −1, 0, 0, 0, 0, 0, −3, 2, 1, 0, 0, 0, 0, 0, 0, −1, 0,
0, 0, 0, 0, 0, −2, 0, 0, 0, 0, 0, 0, 0, 0, 0, 0, 0, 0, 0, 0, 0 },
    { 26, −26, 5, −2, 1, 0, 0, 0, 95, −10, −21, 0, −4, 0, −2, 0, −33, 54, −5, −2,
−1, −1, 0, 0, −31, 1, 18, −2, 2, −1, 1, 0, −2, −8, 3, 3, 0, 1, 0, 0, −4, −1, 0,
1, 0, 0, 0, 0, −1, 0, 0, 0, 0, 0, 0, −2, 0, 0, 0, 0, 0, 0, 0, 0 },
    { −30, 3, 4, 2, 1, 1, 0, 0, −1, 37, −9, −1, −2, −1, −1, 0, −80, −2, 36, −2, 6,
−1, 2, 0, 32, −64, 0, 10, 0, 3, 0, 1, 18, 7, −26, 1, −1, 0, 0, 0, 1, 6, 0,
−6, 0, −1, 0, 0, 2, 1, 1, −1, −1, 0, 0, 0, 1, 0, 0, 0, 0, 0, 0, 0 },
    { −4, −59, 16, 1, 4, 1, 2, 0, 34, −10, −9, 0, −1, 0, −1, 0, 5, −38, 0, 7, 0,
2, 0, 1, 47, 13, −51, 2, −4, 1, −2, 0, −19, 59, 1, −18, 1, −3, 0, −1, −6, −3, 22,
−1, −1, 0, 0, 0, −3, 1, 1, 4, 0, 0, 0, 0, −1, −1, 1, 1, 0, 0, 0, 0 },
    { 25, 86, −33, 0, −7, −1, −3, 0, 39, 12, 13, −9, 0, −3, 0, −1, −29, −33, 10, 8,
1, 2, 1, 1, 6, 23,−23, −5, 0, −1, 0, 0,−17, 15, 28, −11, 0, −2, 0, −1, 0, −20,
12, 9, −2, 1, 0, 0, −1, −3, −5, 4, 1, 0, 0, 0, −1, −2, 0, 0, 0, 0, 0 },
    { 34, 32, −3, −5, −2, −2, −1, −1, 11,−72, 20, 5, 3, 2, 1, 0, 11, −9, −6, 3,
−1, 1, −1, 0, −1, −37, −7, 16, 0, 3, 0, 1, 22, 19, −56, −2, 1, 0, 0, 0, −13, 40,
8, −23, 0, −3, 1, −1, 1, −4, 14, 1, −4, 0, −1, 0, −3, 4, 0, 2, 0, 0, 0, 0 },
    { 2, −26, 8, 2, 2, 0, 1, 0, 20, −25, 39, −4, 2, −1, 0, 0, −27, −59, −3, 21,
0, 5, 1, 2, 4, 8, −5, −3, 0, 0, 0, 0, 5, −49, 5, 26, −2, 4, −1, 1, 12, 6, −61,
8, 5, 1, 1, 0, −5, 24, −7,−22, 3, −1, 1, −1, 3, 3, 3, −5, −3, 0, −1, 0 },
    { 8, −4, −10, 4, −2, 1, −1, 0, 38, 61, −3, −13, −2, −4, −1, −2, 65, −30, 44, −2,
−1, −1, −1, 0, −26, −25, −1, 26, −1, 5, −1, 1, −13, −9, −29, 7, 5, 1, 1, 0, 0, 9,
−12, −11, 2, 0, 0, 0, −2, 5, 5, −5, −2, 0, 0, 0, −1, 0, 1, 1, −1, 0, 0, 0 },
    { −14, −18, −3, 5, 1, 1, 1, 0, −13, 10, 12, −4, 2, −1, 0, 0, −26, −17, −4, 24,
−1, 4, 0, 1, −87, 7, −46, −1, 13, 0, 4, 0, 31, 0, −2, −41, 1, −3, 1, −1, 12, 10,
23, −7, −10, 0, −2, 0, 6, −5, 11, 7, −3, −1, 0, 0, 3, −1, −1, 5, 0, 0, 0, 0 },
    { −11, −6, −42, 7, 0, 2, 0, 1, 8, 35, 0, −5, −3, −1, −1, −1, −12, −2, −38, 1,
3, 1, 1, 0, 24, 40, 11, −22, −3, −4, −1, −1, 1, −8, −16, 10, 3, 1, 1, 0, −4, 52,
−2,−40, 2, −5, 1, −1, −4, −11, 57, 3,-b, 0, −2, 0, 2,-b, −5, 17, 0, 0, 0, 0
},
    { −5, 7, 23, −3, 2, −1, 1, 0, −14, −11, −6, 16, 1, 3, 0, 1,−24, 2, −1, −1,
3, 0, 1, 0, −15, 17, −2, 28, −1, 3, 0, 0, −87, −11, −35, −2, 25, 1, 6, 0, 27, −22,
−2, −44, −1, 1, 0, 1, 11, 6, 8, −1, −13, 0, −2, 0, 4, 2, 2, 0, −1, −2, 0, 0 },
    { −14, −32, −94, 23, −3, 8, −1, 3, −10, −36, 16, −24, 6, −3, 2, 0, −4, 23, 42, −4,
−6, −2, −1, −1, 4, 4, −3, 18, −1, 1, 0, 0, −14, −2, 0, −3, 6, 0, 1, 0, 6, −13,
1, 1,−2, 1, 0, 1, 4, 1, −9, 3, 0, 0, 1, 0, 0, 4, −2, −4, 1, 0, 0, 0 },
    { −1, −16, 18, −18, 4, −3, 2, −1, 10, 2, 65, −11, −3, −3, −1, −1, −2, −16, 10, −3,
0, 1, 0, 0, 6, −3, 39, −1, −9, 0, −2, 0, −6, −16, 4, 7, −1, 1, 0, 1, 10, −7, 42,
1, −15, 0, −3, 0, 3, −36, −1, 58, −5, 2, −1, 0, −4, 3, −39, 8, 14, −1, 2, 0 },
    { −5, 2, 7, −9, 2, −3, 1, −1, −2, 27, 74, −6, −8, −2, −2, −1, 5, 54, −13, 46,
−6, 2, −2, 0, 7, −7, −27, 7, 12, 0, 2, 0, −15, 18, −5, 8, 4, 0, 1, 0, −36, −8,
−14, −2, 19, 0, 4, 0, 3, −9, −3,−25, 3, 3, 1, 1, 0, −1, 8, −6, −8, 1, −1, 0 },
    { 6, 11, 44, −2, −3, −2, −1, −1, −5, −15, −1, −42, 9, −3, 2, −1, 3, 29, 61, 1,
−20, −1, −5, −1, 23, 29, −21, 16, 7, −2, 1, −1, 11, −24, 19, −18, −2, 2, −1, 0, 8,
18, −5, −1, −9, 0, −2, 0, −8, 8, 40, −2, −11, −2, −1, −1, 2,−21, 3, 33, −2, 0, −1,
0 },

-continued

```
    { -6, -5, 13, 4, -1, 0, 0, 0, -13, -12, -7, -11, 3, 0, 1, 0, -22, -24, 33, -14,
-3, -1, 0, 0, -39, 28, 26, 6, -17, 1, -3, 0, -2, 43, 5, 47, -3, -5, -1, -2, -51, -2,
-5, 2, 35, -2, 5, -1, 7, -33, 13, -20, 0, 7, 0, 2, 2, -9, -6, 9, -7, 2, 0, 0 },
    },
  },
};
```

FIG. 17 is a table illustrating test results of the example of FIG. 13 over VTM-6.0 under common test conditions (CTC). FIG. 18 is a table illustrating test results of the example of FIG. 14 over VTM-6.0 under CTC. FIG. 19 is a table illustrating test results of the example of FIG. 13 without optimized 4×4 LFNST matrices over VTM-6.0 under CTC. FIG. 20 is a table illustrating test results of the example of FIG. 14 without optimized 4×4 LFNST matrices over VTM-6.0 under CTC. The techniques of this disclosure were implemented on top of VTM-6.0 and evaluated under CTC. Note that low-delay B results are omitted, since LFNST is disabled in CTC for low-delay B. The test results are shown in FIGS. 17-20.

Figure 21:
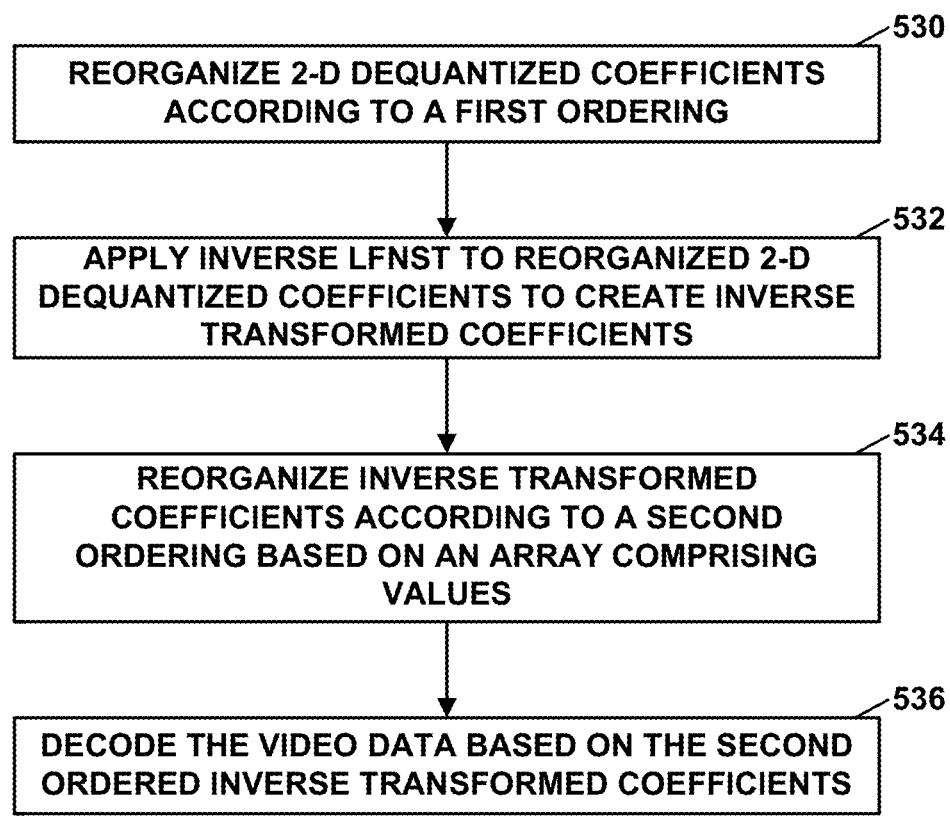
FIG. 21 is a flowchart illustrating an example of reorganizing coefficients in accordance with the techniques of this disclosure.

FIG. 21 is a flowchart illustrating an example of reorganizing coefficients in accordance with the techniques of this disclosure. Inverse transform processing unit 212 of video encoder 200 or inverse transform processing unit 308 of video decoder 300 may reorganize 2-D dequantized coefficients according to a first ordering (530). For example, inverse transform processing unit 212 of video encoder 200 or inverse transform processing unit 308 of video decoder 300 may perform an input reorganization such as in the examples of FIGS. 9 and 10. In some examples, the first ordering is a raster-scan ordering. In some examples, the first ordering is a column-major ordering. In some examples, the first ordering comprises a 1-D list. In some examples, the reorganized 2-D dequantized coefficients comprise one of 25 dequantized coefficients, 36 dequantized coefficients, 48 dequantized coefficients, or 64 dequantized coefficients. In some examples, the first ordering is based on block size and/or intra mode. In some examples, inverse transform processing unit 212 of video encoder 200 or inverse transform processing unit 308 of video decoder 300 determine which of the 2-D dequantized coefficients are not normatively zeroed out and only reorganize the 2-D dequantized coefficients that are not normatively zeroed out so that the first ordering includes only 2-D dequantized coefficients that are not normatively zeroed out.

Inverse transform processing unit 212 of video encoder 200 or inverse transform processing unit 308 of video decoder 300 may apply an inverse LFNST to the reorganized 2-D dequantized coefficients to create inverse transformed coefficients (532). For example, inverse transform processing unit 212 of video encoder 200 or inverse transform processing unit 308 of video decoder 300 may apply an inverse LFNST of the example of any of FIGS. 11-16. In some examples, the inverse LFNST includes an M×N matrix, wherein M denotes a number of basis vectors and denotes a number of rows and N denotes a number of reconstructed LFNST coefficients after applying the inverse LFNST. In some examples, the entries in the M×N matrix have one or more of 8-bit precision, 9-bit precision or 10-bit precision. In some examples, inverse transform processing unit 212 of video encoder 200 or inverse transform processing unit 308 of video decoder 300 may multiply a row in the M×N matrix by −1. In some examples, inverse transform processing unit 212 of video encoder 200 or inverse transform processing unit 308 of video decoder 300 may multiply all rows in the M×N matrix by −1.

Inverse transform processing unit 212 of video encoder 200 or inverse transform processing unit 308 of video decoder 300 may reorganize the inverse transformed coefficients according to a second ordering, the second ordering being based on an array including values (534). For example, inverse transform processing unit 212 of video encoder 200 or inverse transform processing unit 308 of video decoder 300 may reorganize the inverse transformed coefficients so that the inverse transformed coefficients are in a correct position for applying a separable transform. In some examples, each value in the array corresponds to a position in a 2-D block. In some examples, the values in the array denote indices of the 2-D block in a defined order. In some examples, an index value v points to a corresponding position in the 2-D block as follows: row index: r=floor (v/w), column index: c=mod (v,w) where w denotes a width of an LFNST subblock. In some examples, the second ordering is a raster-scan ordering. In some examples, the second ordering is a column-major ordering. In some examples, the reorganized inverse transformed coefficients are located in an upper left corner of the 2-D block.

Inverse transform processing unit 212 of video encoder 200 or inverse transform processing unit 308 of video decoder 300 may decode the video data based on the second ordered inverse transformed coefficients (536). For example, inverse transform processing unit 212 of video encoder 200 or inverse transform processing unit 308 of video decoder 300 may apply an inverse separable transform, such as an inverse DCT-2 transform, to the second ordered inverse transformed coefficients.

Figure 22:
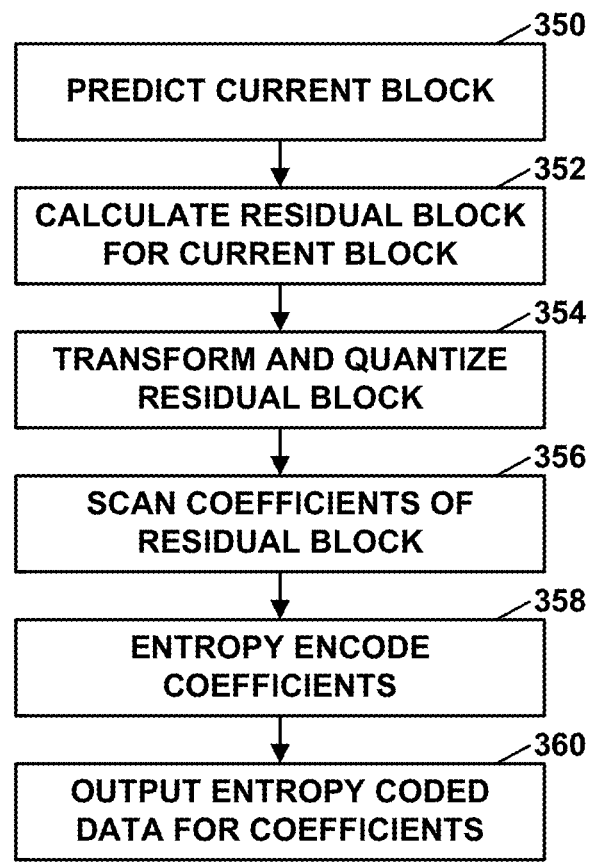
FIG. 22 is a flowchart illustrating a method of encoding in accordance with the techniques of this disclosure.

FIG. 22 is a flowchart illustrating an example method for encoding a current block. The current block may comprise a current CU. Although described with respect to video encoder 200 (FIGS. 1 and 3), it should be understood that other devices may be configured to perform a method similar to that of FIG. 22.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). In some examples, transform processing unit 206 may reorganize primary transform coefficients according to an ordering. Transform processing unit 206 may also apply a LFNST to the reorganized primary transform coefficients to create LFNST coefficients.

Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 23:
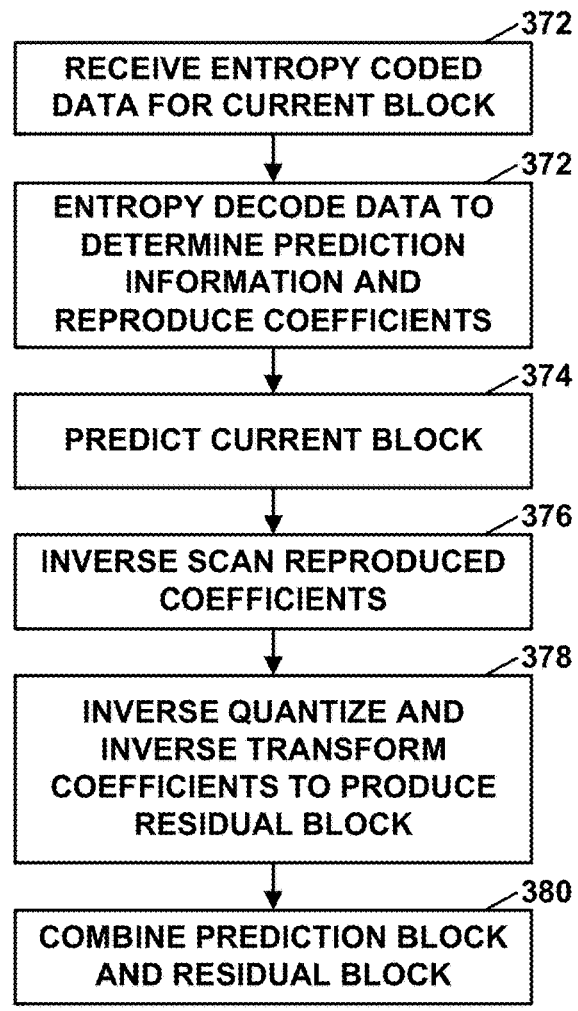
FIG. 23 is a flowchart illustrating a method of decoding in accordance with the techniques of this disclosure.

FIG. 23 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 23.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). When inverse transforming the coefficients to produce the residual block, video decoder 300 may perform the techniques of the example of FIG. 21. Video decoder 300 may ultimately decode the current block by combining the prediction block and the residual block (380).

According to the techniques of this disclosure, an 8×8 LFNST may be simplified and coefficients may be reorganized to efficiently apply the 8×8 LFNST. The 8×8 LFNSTs and reorganized coefficients of the current disclosure may reduce the number of multiplications required and reduce memory requirements as well. Additionally, the 8×8 LFNSTs and reorganized coefficients of the current disclosure may provide coding gains without increasing complexity when compared to other designs of LFNSTs.

This disclosure includes the following examples.

Example 1. A method of coding video data, the method comprising: reorganizing a list of 2-D dequantized coefficients according to a first ordering; applying an inverse low-frequency non-separable transform (LFNST) to the reorganized list of 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST; reorganizing the inverse transformed coefficients according to second ordering; and coding the video data based on the second ordered inverse transformed coefficients.

Example 2. The method of example 1, wherein the first ordering is a raster-scan ordering or a column-major ordering.

Example 3. The method of example 1, wherein the first ordering is based on block size or intra mode.

Example 4. The method of any combination of examples 1-3, further comprising: determining which of the 2-D dequantized coefficients is not zeroed out; and only reorganizing the 2-D dequantized coefficients that are not zeroed out so as to only apply the inverse LFNST to the 2-D dequantized coefficients that are not zeroed out.

Example 5. The method of any combination of examples 1-4, wherein entries in the M×N matrix comprise one or more of 8-bit precision, 9-bit precision or 10-bit precision.

Example 6. The method of any combination of examples 1-5, further comprising multiplying a row in the M×N matrix by −1.

Example 7. The method of any combination of examples 1-6, further comprising multiplying a plurality of rows in the M×N matrix by −1.

Example 8. The method of any combination of examples 1-7, further comprising multiplying all rows in the M×N matrix by −1.

Example 9. The method of any combination of examples 1-8, wherein the second ordering is based on an array and wherein each value in the array corresponds to a position in a 2-D block.

Example 10. The method of example 9, wherein the values in the array denote indices of the 2-D block in a defined order.

Example 11. The method of example 10, wherein the indices comprise index values and the index values point to a position in the 2-D block.

Example 12. The method of example 11, wherein an index value v points to a corresponding position in the 2-D block as follows: row index: r=floor (v/w); column index: c=mod (v,w), where w denotes a width of an LFNST subblock.

Example 13. The method of example 12, wherein the second ordering is a raster-scan ordering or a column-major ordering.

Example 14. The method of any of examples 1-13, wherein coding comprises decoding.

Example 15. The method of any of examples 1-14, wherein coding comprises encoding.

Example 16. A device for coding video data, the device comprising one or more means for performing the method of any of examples 1-15.

Example 17. The device of example 16, wherein the one or more means comprise one or more processors implemented in circuitry.

Example 18. The device of any of examples 16 and 17, further comprising a memory to store the video data.

Example 19. The device of any of examples 16-18, further comprising a display configured to display decoded video data.

Example 20. The device of any of examples 16-19, wherein the device comprises one or more of a camera, a computer, a mobile device, a broadcast receiver device, or a set-top box.

Example 21. The device of any of examples 16-20, wherein the device comprises a video decoder.

Example 22. The device of any of examples 16-21, wherein the device comprises a video encoder.

Example 23. A computer-readable storage medium having stored thereon instructions that, when executed, cause one or more processors to perform the method of any of examples 1-13.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    reorganizing, by one or more processors, 2-D dequantized coefficients according to a first ordering;
    applying, by the one or more processors, an inverse low-frequency non-separable transform (LFNST) to the reorganized 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST;
    reorganizing, by the one or more processors, the inverse transformed coefficients according to a second ordering, the second ordering being based on an array comprising values, wherein each value in the array corresponds to a position in a 2-D block and the values in the array denote indices of the 2-D block in a defined order; and
    decoding, by the one or more processors, the video data based on the second ordered inverse transformed coefficients.

2. The method of claim 1, wherein the first ordering is a raster-scan ordering or a column-major ordering.

3. The method of claim 1, wherein the second ordering is a raster-scan ordering or a column-major ordering.

4. The method of claim 1, wherein the first ordering comprises a 1-D list.

5. The method of claim 1, wherein the reorganized 2-D dequantized coefficients comprise one of 25 dequantized coefficients, 36 dequantized coefficients, 48 dequantized coefficients, or 64 dequantized coefficients.

6. The method of claim 1, wherein the reorganized inverse transformed coefficients are located in an upper left corner of the 2-D block.

7. The method of claim 1, wherein the first ordering is based on block size or intra mode.

8. The method of claim 1, further comprising:
    determining, by the one or more processors, which of the 2-D dequantized coefficients are not normatively zeroed out; and
    only reorganizing, by the one or more processors, the 2-D dequantized coefficients that are not normatively zeroed out so that the first ordering includes only 2-D dequantized coefficients that are not normatively zeroed out.

9. The method of claim 1, wherein entries in the M×N matrix comprise one or more of 8-bit precision, 9-bit precision or 10-bit precision.

10. The method of claim 1, further comprising multiplying, by the one or more processors, a row in the M×N matrix by −1.

11. The method of claim 1, further comprising multiplying, by the one or more processors, all rows in the M×N matrix by −1.

12. The method of claim 1, wherein an index value v points to a corresponding position in the 2-D block as follows:

row index: $r=\text{floor}(v/w)$ column index: $c=\text{mod}(v,w)$ where w denotes a width of an LFNST subblock.

13. A device for decoding video data, the device comprising:
a memory configured to store the video data; and
one or more processors implemented in circuitry and communicatively coupled to the memory, the one or more processors being configured to:
reorganize 2-D dequantized coefficients according to a first ordering;
apply an inverse low-frequency non-separable transform (LFNST) to the reorganized 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST;
reorganize the inverse transformed coefficients according to a second ordering, the second ordering being based on an array including values, wherein each value in the array corresponds to a position in a 2-D block and the values in the array denote indices of the 2-D block in a defined order; and
decode the video data based on the second ordered inverse transformed coefficients.

14. The device of claim 13, wherein the first ordering is a raster-scan ordering or a column-major ordering.

15. The device of claim 13, wherein the second ordering is a raster-scan ordering or a column-major ordering.

16. The device of claim 13, wherein the first ordering comprises a 1-D list.

17. The device of claim 13, wherein the reorganized 2-D dequantized coefficients comprises one of 25 dequantized coefficients, 36 dequantized coefficients, 48 dequantized coefficients, or 64 dequantized coefficients.

18. The device of claim 13, wherein the reorganized inverse transformed coefficients are located in an upper left corner of the 2-D block.

19. The device of claim 13, wherein the first ordering is based on block size or intra mode.

20. The device of claim 13, further comprising:
determining which of the 2-D dequantized coefficients are not normatively zeroed out; and
only reorganizing the 2-D dequantized coefficients that are not normatively zeroed out so that the first ordering includes only 2-D dequantized coefficients that are not normatively zeroed out.

21. The device of claim 13, wherein entries in the M×N matrix comprise one or more of 8-bit precision, 9-bit precision or 10-bit precision.

22. The device of claim 13, further comprising multiplying a row in the M×N matrix by −1.

23. The device of claim 13, further comprising multiplying all rows in the M×N matrix by −1.

24. The device of claim 13, wherein an index value v points to a corresponding position in the 2-D block as follows:

row index: $r=\text{floor}(v/w)$ column index: $c=\text{mod}(v,w)$ where w denotes a width of an LFNST subblock.13.

25. A non-transitory computer-readable storage medium having instructions stored thereon which, when executed by one or more processors, cause the one or more processors to:
reorganize 2-D dequantized coefficients according to a first ordering;
apply an inverse low-frequency non-separable transform (LFNST) to the reorganized 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST;
reorganize the inverse transformed coefficients according to a second ordering, the second ordering being based on an array including values, wherein each value in the array corresponds to a position in a 2-D block and the values in the array denote indices of the 2-D block in a defined order; and
decode the video data based on the second ordered inverse transformed coefficients.

26. The non-transitory computer-readable storage medium of claim 25, wherein the first ordering is a raster-scan ordering or a column-major ordering.

27. The non-transitory computer-readable storage medium of claim 25, wherein the second ordering is a raster-scan ordering or a column-major ordering.

28. The non-transitory computer-readable storage medium of claim 25, wherein the first ordering comprises a 1-D list.

29. The non-transitory computer-readable storage medium of claim 25, wherein the reorganized 2-D dequantized coefficients comprises one of 25 dequantized coefficients, 36 dequantized coefficients, 48 dequantized coefficients, or 64 dequantized coefficients.

30. A device for decoding video data, the device comprising:
means for reorganizing 2-D dequantized coefficients according to a first ordering;
means for applying an inverse low-frequency non-separable transform (LFNST) to the reorganized 2-D dequantized coefficients to create inverse transformed coefficients, the inverse LFNST comprising an M×N matrix, wherein M denotes a number of basis vectors and denotes a number of rows and N denotes a number of reconstructed LFNST coefficients after applying the inverse LFNST;
means for reorganizing the inverse transformed coefficients according to a second ordering, the second ordering being based on an array including values, wherein each value in the array corresponds to a position in a 2-D block and the values in the array denote indices of the 2-D block in a defined order; and
means for decoding the video data based on the second ordered inverse transformed coefficients.

* * * * *